(12) United States Patent
Stewart et al.

(10) Patent No.: US 10,591,301 B2
(45) Date of Patent: Mar. 17, 2020

(54) GRAPHICAL USER INTERFACE (GUI) WITHIN CRM SOLUTION ENABLING LAYER VIEWS FOR CONNECTED DEVICES

(71) Applicant: MAPANYTHING, INC., Charlotte, NC (US)

(72) Inventors: John Brian Stewart, Charlotte, NC (US); Benjamin Louis Brantly, Decatur, GA (US); Brian Kenneth Hubbard, Sandy Springs, GA (US); Alexander Levi Daniels, Charlotte, NC (US); Michael Christopher Brown, Charlotte, NC (US); Edward Wachira Mwangi, Sandy Springs, GA (US); Benjamin Daryl Bagley, Cumming, GA (US); Abraham Javier Reyes, Lawrenceville, GA (US); Justine Lee Horitski, Charlotte, NC (US)

(73) Assignee: MAPANYTHING, INC., Charlotte, NC (US)

( * ) Notice: Subject to any disclaimer, the term of this patent is extended or adjusted under 35 U.S.C. 154(b) by 362 days.

(21) Appl. No.: 15/784,076

(22) Filed: Oct. 13, 2017

(65) Prior Publication Data
US 2019/0113345 A1 Apr. 18, 2019

(51) Int. Cl.
| | |
|---|---|
| *G06F 3/048* | (2013.01) |
| *G01C 21/00* | (2006.01) |
| *G01C 21/36* | (2006.01) |
| *G06F 3/0481* | (2013.01) |
| *G06Q 30/02* | (2012.01) |

(52) U.S. Cl.
CPC ....... *G01C 21/005* (2013.01); *G01C 21/3664* (2013.01); *G06F 3/04812* (2013.01); *G06Q 30/0205* (2013.01); *G06Q 30/0281* (2013.01)

(58) Field of Classification Search
CPC .......... G06F 3/00; G06F 3/048; G06F 3/0481; G06F 3/04812; G01C 21/00; G01C 21/005; G01C 21/36; G01C 21/3664; G06Q 30/02; G06Q 30/0205; G06Q 30/0281
See application file for complete search history.

(56) References Cited

U.S. PATENT DOCUMENTS

| | | | |
|---|---|---|---|
| 8,484,355 B1* | 7/2013 | Lochhead | H04L 41/0806 709/226 |
| 2013/0054426 A1* | 2/2013 | Rowland | G06F 9/5011 705/27.2 |
| 2017/0006135 A1* | 1/2017 | Siebel | H04L 67/02 |

\* cited by examiner

*Primary Examiner* — Xiomara L Bautista
(74) *Attorney, Agent, or Firm* — Kwan & Olynick LLP

(57) ABSTRACT

A geo-analytical program is integrated into a customer relationship management (CRM) solution. Via the geo-analytical program, users are able to define layer configuration settings for a layer for plotting on a map-based GUI. Layer configuration settings for a respective layer comprise an indication of a data object type serving as a base object type for the respective layer. A method involves receiving from a user user-defined configuration settings for a first layer, electronically receiving, at a geospatial computer system, geospatial data for a plurality of connected devices; electronically receiving, at the geo-analytical program from the geospatial computer system, real-time geospatial data for the plurality of connected devices; and utilizing, by the geo-analytical program, the user-defined layer configuration settings for the first layer to plot the first layer on the map-based GUI based on the received real-time geospatial data for the plurality of connected devices.

20 Claims, 37 Drawing Sheets

GRAPHICAL USER INTERFACE (GUI) WITHIN CRM SOLUTION ENABLING LAYER VIEWS FOR CONNECTED DEVICES

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to asset mapping.

Customer relationship management (CRM) technology solutions are well known with perhaps the leading CRM computer system currently being provided by Salesforce.com Inc., which solution enables a business to store and manage prospect and customer information, like contact information, accounts, cases, work orders, leads, and sales opportunities, in a single online platform, i.e., in "the cloud", whereby the CRM solution easily scales and provides access to a user having a networked device when needed, wherever located, so long as there is network connectivity.

In conjunction with this technology solution, Salesforce.com Inc. also provides application program interfaces (APIs) to the Salesforce CRM computer system thereby enabling independent third-party software developers to create applications that enable businesses to further leverage and make use of the Salesforce CRM computer system. Indeed, Salesforce.com Inc. provides a marketplace that facilitates the marketing of such applications by such developers.

One such developer is MapAnything, Inc., which has developed and offers one or more applications that fully integrate with the Salesforce CRM computer system, and that enable users to map leads, contacts, and accounts based on geographical locations. The offering also utilizes geocoding, which is a feature that allows information to be obtained in real-time based on geographical location, and that can be used to assign cases to service professionals within a particular locale; to reallocate business resources to areas needing them most, providing solutions to problems as they arise; and to launch marketing campaigns based on target demographics in relevant geographical areas. In addition to being able to obtain real time information, the offering enables display of all relevant data, including both custom and standard objects, which can be saved and displayed within the Salesforce CRM solution as map overlays.

Even in view of the foregoing advancements, it is believed that one or more needs remain for continued improvement in CRM technology solutions. This, and other needs, are addressed by one or more aspects and features of the present invention.

SUMMARY OF THE INVENTION

The present invention includes many aspects and features. Moreover, while many aspects and features relate to, and are described in, the context of CRM systems, the present invention is not limited to use only in such systems and will find utility in more general telematics and asset-tracking applications, such as fleet management solutions, as will become apparent from the following summaries and detailed descriptions of aspects, features, and one or more embodiments of the present invention.

Accordingly, one aspect of the present invention relates to a computer-implemented method. This method includes displaying, to a user via an electronic display associated with an electronic device, a first graphical user interface (GUI) provided by geo-analytical software that is integrated into a customer relationship management (CRM) solution, the first GUI being accessible by users within the CRM solution, the first GUI being configured to allow the user to define layer configuration settings for a first layer for plotting on a map-based GUI accessible within the CRM solution, wherein one or more defined data object types are defined in the CRM solution or the geo-analytical program, defined data object types can be defined to include one or more fields and can be defined to be associated with one or more other defined data object types, layer configuration settings for a respective layer comprise an indication of a data object type serving as a base object type for the respective layer, and the first GUI comprises one or more user interface elements configured to allow a user to specify filter settings for the first layer. This method further includes receiving from the user, via the first GUI, user input corresponding to specification of filter settings for the first layer; displaying, to the user via the electronic display associated with the electronic device, an updated version of the first GUI which comprises one or more user interface elements configured to allow a user to specify marker settings for the first layer; receiving from the user, via the first GUI, user input corresponding to specification of marker settings for the first layer; storing in non-transitory computer readable medium user-defined configuration settings for the first layer including the specified filter settings, tooltip settings, and marker settings; electronically receiving, at a geospatial computer system, geospatial data for a plurality of connected devices; electronically receiving at the geo-analytical program, over the Internet from the geospatial computer system, real-time geospatial data for the plurality of connected devices; and displaying, to the user via the electronic display, the map-based GUI, and utilizing, by the geo-analytical program, the user-defined layer configuration settings for the first layer to plot the first layer on the map-based GUI based on the received real-time geospatial data for the plurality of connected devices, wherein the plotted first layer plots a plurality of markers for objects of the base object type for the first layer. The plotted objects are filtered based on the specified filter settings for the first layer, and markers for the plotted objects are based on the specified marker settings for the first layer.

In a feature of this aspect, the one or more user interface elements configured to allow a user to specify filter settings for the first layer include one or more GUI controls for defining a field filter for the first layer layer, the one or more GUI controls being configured to allow the user to indicate one or more fields of the base object type for the first layer to use for filtering. In accordance with one or more implementations, receiving from the user, via the first GUI, user input corresponding to specification of filter settings for the first layer comprises receiving, from the user via the one or more GUI controls for defining a field filter for the first layer, specification of a first field of the base object type for the first layer to use for filtering. In accordance with one or more implementations, the plotted objects are filtered based on field values for the first field.

In a feature of this aspect, the one or more user interface elements configured to allow a user to specify filter settings for the first layer include one or more GUI controls for defining a cross object filter for the first layer, the one or more GUI controls being configured to allow the user to indicate a first object type associated with the base object type, and further indicate one more fields of the first object type for the first layer to use for filtering. In accordance with one or more implementations, receiving from the user, via the first GUI, user input corresponding to specification of filter settings for the first layer comprises receiving, from the user via the one or more GUI controls for defining a cross object filter for the first layer, specification of a first object type associated with the base object type; and one more fields of the first object type for the first layer to use for filtering. In accordance with one or more implementations, the plotted objects are filtered based on the specified one or more fields of the first object type.

In a feature of this aspect, the one or more user interface elements configured to allow a user to specify filter settings for the first layer include one or more GUI controls for defining an activity filter for the first layer, the one or more GUI controls being configured to allow the user to specify that filtering for the first layer is to be performed based on the presence or absence of tasks for a base object instance. In accordance with one or more implementations, receiving from the user, via the first GUI, user input corresponding to specification of filter settings for the first layer comprises receiving, from the user via the one or more GUI controls for defining an activity filter for the first layer, specification that filtering for the first layer is to be performed based on the presence of tasks for a base object instance. In accordance with one or more implementations, the plotted objects are filtered based on the presence of tasks for a base object instance. In accordance with one or more implementations, receiving from the user, via the first GUI, user input corresponding to specification of filter settings for the first layer comprises receiving, from the user via the one or more GUI controls for defining an activity filter for the first layer, specification that filtering for the first layer is to be performed based on the absence of tasks for a base object instance. In accordance with one or more implementations, the plotted objects are filtered based on the absence of tasks for a base object instance.

In a feature of this aspect, the one or more user interface elements configured to allow a user to specify filter settings for the first layer include one or more GUI controls for defining an activity filter for the first layer, the one or more GUI controls being configured to allow the user to specify that filtering for the first layer is to be performed based on the presence or absence of events for a base object instance. In accordance with one or more implementations, receiving from the user, via the first GUI, user input corresponding to specification of filter settings for the first layer comprises receiving specification that filtering for the first layer is to be performed based on the presence of events for a base object instance. In accordance with one or more implementations, the plotted objects are filtered based on the presence of events for a base object instance. In accordance with one or more implementations, receiving from the user, via the first GUI, user input corresponding to specification of filter settings for the first layer comprises receiving specification that filtering for the first layer is to be performed based on the absence of events for a base object instance. In accordance with one or more implementations, the plotted objects are filtered based on the absence of events for a base object instance.

In a feature of this aspect, the one or more user interface elements configured to allow a user to specify filter settings for the first layer include one or more GUI controls for defining an owner filter for the first layer, the one or more GUI controls being configured to allow the user to specify that filtering for the first layer is to be performed based on an owner of a base object instance. In accordance with one or more implementations, receiving from the user, via the first GUI, user input corresponding to specification of filter settings for the first layer comprises receiving specification that filtering for the first layer is to be performed based on an owner of a base object instance. In accordance with one or more implementations, the plotted objects are filtered based on an owner of a base object instance.

In a feature of this aspect, the one or more user interface elements configured to allow a user to specify filter settings for the first layer include one or more GUI controls for defining a maximum number of records to plot. In accordance with one or more implementations, receiving from the user, via the first GUI, user input corresponding to specification of filter settings for the first layer comprises receiving specification of a maximum number of records to plot. In accordance with one or more implementations, the plotted objects are filtered based on the specified maximum number of records to plot.

In a feature of this aspect, the one or more user interface elements configured to allow a user to specify marker settings for the first layer include one or more GUI controls for specifying static assignment of a single icon as a marker for display on the map-based GUI. In accordance with one or more implementations, receiving from the user, via the first GUI, user input corresponding to specification of marker settings for the first layer comprises receiving specification of static assignment of a single icon as a marker for display on the map-based GUI. In accordance with one or more implementations, the one or more user interface elements configured to allow a user to specify marker settings for the first layer include one or more GUI controls for defining an icon for markers for display on the map-based GUI. In accordance with one or more implementations, receiving from the user, via the first GUI, user input corresponding to specification of marker settings for the first layer comprises receiving specification of a first icon for markers for display on the map-based GUI. In accordance with one or more implementations, each of the plotted markers comprises the first icon.

In a feature of this aspect, the one or more user interface elements configured to allow a user to specify marker settings for the first layer include one or more GUI controls for specifying dynamic assignment of icons for markers for base object instances to be plotted on the map-based GUI. In accordance with one or more implementations, receiving from the user, via the first GUI, user input corresponding to specification of marker settings for the first layer comprises receiving specification of dynamic assignment of icons for markers for base object instances to be plotted on the map-based GUI. In accordance with one or more implementations, the one or more user interface elements configured to allow a user to specify marker settings for the first layer include one or more GUI controls for specifying a field of the base object instance which is used for the dynamic assignment, and for further specifying icons to be used for specified field values. In accordance with one or more implementations, receiving from the user, via the first GUI, user input corresponding to specification of marker settings for the first layer comprises receiving specification of a first field of the base object instance which is used for the dynamic assignment, and icons to be used for specified field values. In accordance with one or more implementations, icons for use as markers for the plotted objects are determined based on a value of the specified first field.

In a feature of this aspect, the one or more user interface elements configured to allow a user to specify marker settings for the first layer include one or more GUI controls for specifying dynamic assignment of shapes and colors for markers for base object instances to be plotted on the map-based GUI. In accordance with one or more implementations, receiving from the user, via the first GUI, user input corresponding to specification of marker settings for the first layer comprises receiving specification of dynamic assignment of shapes and colors for markers for base object instances to be plotted on the map-based GUI. In accordance with one or more implementations, the one or more user interface elements configured to allow a user to specify marker settings for the first layer include one or more GUI controls for specifying a field of the base object instance which is used for the dynamic assignment of shapes, shapes to be used for specified field values, a field of the base object instance which is used for the dynamic assignment of colors, and colors to be used for specified field values. In accordance with one or more implementations, receiving from the user, via the first GUI, user input corresponding to specification of marker settings for the first layer comprises receiving specification of a first field of the base object instance which is used for the dynamic assignment of shapes, shapes to be used for specified field values for the first field, a second field of the base object instance which is used for the dynamic assignment of colors, and colors to be used for specified field values for the second field. In accordance with one or more implementations, a shape of markers for the plotted objects is determined based on a value of the specified first field and a color of markers for the plotted objects is determined based on a value of the specified second field.

In a feature of this aspect, the connected devices comprise a plurality of mobile phones and the geospatial data for the connected devices comprises geospatial data acquired by a plurality of mobile phones.

In a feature of this aspect, the connected devices comprise a plurality of smartphones, and the geospatial data for the connected devices comprises geospatial data acquired by the plurality of smartphones.

In a feature of this aspect, the connected devices comprise a plurality tablets, and the geospatial data for the connected devices comprises geospatial data acquired by the plurality of tablets.

In a feature of this aspect, the connected devices comprise a plurality of Android and iOS devices, and the geospatial data for the connected devices comprises geospatial data acquired by the plurality of Android and iOS devices.

In a feature of this aspect, the connected devices comprise a plurality of telematic devices, and the geospatial data for the connected devices comprises geospatial data acquired by the plurality of telematic devices. In accordance with one or more implementations, the telematic devices are attached to vehicles.

In a feature of this aspect, the connected devices comprise a plurality of electronic devices, and the geospatial data for the connected devices comprises geospatial data acquired by the plurality of electronic devices. In accordance with one or more implementations, the electronic devices are attached to assets to be tracked.

Another aspect relates to a computer-implemented method. This method includes displaying, to a user via an electronic display associated with an electronic device, a first graphical user interface (GUI) provided by geo-analytical software that is integrated into a customer relationship management (CRM) solution, the first GUI being accessible by users within the CRM solution, the first GUI being configured to allow the user to define layer configuration settings for a first layer for plotting on a map-based GUI accessible within the CRM solution. One or more defined data object types are defined in the CRM solution or the geo-analytical program. Defined data object types can be defined to include one or more fields and can be defined to be associated with one or more other defined data object types. Layer configuration settings for a respective layer comprise an indication of a data object type serving as a base object type for the respective layer. The first GUI comprises one or more user interface elements configured to allow a user to specify filter settings for the first layer. This method further comprises receiving from the user, via the first GUI, user input corresponding to specification of filter settings for the first layer; displaying, to the user via the electronic display associated with the electronic device, an updated version of the first GUI which comprises one or more user interface elements configured to allow a user to specify tooltip settings for the first layer; receiving from the user, via the first GUI, user input corresponding to specification of tooltip settings for the first layer; displaying, to the user via the electronic display associated with the electronic device, an updated version of the first GUI which comprises one or more user interface elements configured to allow a user to specify marker settings for the first layer; receiving from the user, via the first GUI, user input corresponding to specification of marker settings for the first layer; storing in non-transitory computer readable medium user-defined configuration settings for the first layer including the specified filter settings, tooltip settings, and marker settings; electronically receiving, at a geospatial computer system, geospatial data for a plurality of connected devices; electronically receiving at the geo-analytical program, over the Internet from the geospatial computer system, real-time geospatial data for the plurality of connected devices; and displaying, to the user via the electronic display, the map-based GUI, and utilizing, by the geo-analytical program, the user-defined layer configuration settings for the first layer to plot the first layer on the map-based GUI based on the received real-time geospatial data for the plurality of connected devices, wherein the plotted first layer plots a plurality of markers for objects of the base object type for the first layer. The plotted objects are filtered based on the specified filter settings for the first layer, and markers for the plotted objects are based on the specified marker settings for the first layer.

In a feature of this aspect, the one or more user interface elements configured to allow a user to specify tooltip settings for the first layer include one or more GUI controls for defining tooltips for markers for display on a map-based GUI, wherein the one or more GUI controls are configured to allow a user to indicate one or more fields of the base object type for display in a tooltip. In accordance with one or more implementations, wherein receiving from the user, via the first GUI, user input corresponding to specification of tooltip settings for the first layer comprises receiving specification of first and second fields of the base object type for display in a tooltip on the map-based GUI. In accordance with one or more implementations, the method comprises displaying a tooltip for a plotted marker for an object that includes values for the first and second fields of that object.

Another aspect relates to a computer-implemented method. This method includes displaying one or more graphical user interfaces (GUIs) provided by software that forms part of a customer relationship management (CRM)

solution, the one or more GUIs being accessible by users within the CRM solution, by which GUIs users are able to define layer configuration settings for one or more layers for plotting on a map-based GUI accessible within the CRM solution, the GUIs comprising one or more windows, pages, or the like, each comprising one or more GUI controls by which layer configuration settings are defined by the user, wherein one or more defined data object types are defined in the CRM solution or the geo-analytical program, defined data object types can be defined to include one or more fields and can be defined to be associated with one or more other defined data object types, and layer configuration settings for a respective layer comprise an indication of a data object type serving as a base object type for the respective layer. This method further includes receiving from a user, via the one or more GUIs, user-defined configuration settings for a first layer; storing in non-transitory computer readable medium the user-defined configuration settings for the first layer; electronically receiving, at a geospatial computer system, geospatial data for a plurality of connected devices; electronically communicating over the Internet from the geospatial computer system to the software that forms part of the CRM solution, real-time geospatial data for the plurality of connected devices; and displaying the map-based GUI, and utilizing, by the software that forms part of the CRM solution, the user-defined layer configuration settings for the first layer to plot the first layer on the map-based GUI based on the communicated real-time geospatial data for the plurality of connected devices.

In a feature of this aspect, the one or more GUI controls by which layer configuration settings are defined include one or more GUI controls for defining a filter for a layer.

In a feature of this aspect, the one or more GUI controls by which layer configuration settings are defined include one or more GUI controls for defining a field filter for a layer, the one or more GUI controls being configured to allow a user to indicate one or more fields of the base object type for a layer to use for filtering.

In a feature of this aspect, the one or more GUI controls by which layer configuration settings are defined include one or more GUI controls for defining a cross object filter for a layer, the one or more GUI controls being configured to allow a user to indicate a first object type associated with the base object type, and further indicate one more fields of the first object type for a layer to use for filtering.

In a feature of this aspect, the one or more GUI controls by which layer configuration settings are defined include one or more GUI controls for defining an activity filter for a layer, the one or more GUI controls being configured to allow a user to specify that filtering for a layer is to be performed based on the presence or absence of tasks for a base object instance.

In a feature of this aspect, the one or more GUI controls by which layer configuration settings are defined include one or more GUI controls for defining an activity filter for a layer, the one or more GUI controls being configured to allow a user to specify that filtering for a layer is to be performed based on the presence or absence of events for a base object instance.

In a feature of this aspect, the one or more GUI controls by which layer configuration settings are defined include one or more GUI controls for defining an owner filter for a layer, the one or more GUI controls being configured to allow a user to specify that filtering for a layer is to be performed based on an owner of a base object instance.

In a feature of this aspect, the one or more GUI controls by which layer configuration settings are defined include one or more GUI controls for defining a maximum number of records to plot.

In a feature of this aspect, the one or more GUI controls by which layer configuration settings are defined include one or more GUI controls for defining tooltips for markers for display on a map-based GUI, wherein the one or more GUI controls are configured to allow a user to indicate one or more fields of the base object type for display in a tooltip.

In a feature of this aspect, the one or more GUI controls by which layer configuration settings are defined include one or more GUI controls for specifying static assignment of a single icon as a marker for display on a map-based GUI.

In a feature of this aspect, the one or more GUI controls by which layer configuration settings are defined include one or more GUI controls for defining an icon for markers for display on a map-based GUI.

In a feature of this aspect, the one or more GUI controls by which layer configuration settings are defined include one or more GUI controls for specifying dynamic assignment of icons for markers for base object instances to be plotted on a map-based GUI. In accordance with one or more implementations, the one or more GUI controls by which layer configuration settings are defined include one or more GUI controls for specifying a field of the base object instance which is used for the dynamic assignment, and for further specifying icons to be used for specified field values.

In a feature of this aspect, the one or more GUI controls by which layer configuration settings are defined include one or more GUI controls for specifying use of a dynamic marker for base object instances plotted on a map-based GUI comprising text from a field of a base object instance.

In a feature of this aspect, the one or more GUI controls by which layer configuration settings are defined include one or more GUI controls for defining tooltips for markers for display on a map-based GUI, wherein the one or more GUI controls are configured to allow a user to indicate one or more fields of the base object type for display in a tooltip, and wherein the one or more GUI controls by which layer configuration settings are defined include one or more GUI controls for specifying use of a dynamic marker for base object instances plotted on a map-based GUI comprising a field defined to be part of a tooltip.

In a feature of this aspect, the one or more GUI controls by which layer configuration settings are defined include one or more GUI controls for specifying dynamic assignment of shapes and colors for markers for base object instances to be plotted on a map-based GUI. In accordance with one or more implementations, the one or more GUI controls by which layer configuration settings are defined include one or more GUI controls for specifying a first field of the base object instance which is used for the dynamic assignment of shapes, and for further specifying shapes to be used for specified field values. In accordance with one or more implementations, the one or more GUI controls by which layer configuration settings are defined include one or more GUI controls for specifying a second field of the base object instance which is used for the dynamic assignment of colors, and for further specifying colors to be used for specified field values.

In a feature of this aspect, the one or more GUI controls by which layer configuration settings are defined include one or more GUI controls for specifying configuration settings for a related list which provides access to additional field data for objects associated to a base object instance.

In a feature of this aspect, the one or more GUI controls by which layer configuration settings are defined include one or more GUI controls for specifying how often a layer refreshes.

In a feature of this aspect, the one or more GUI controls by which layer configuration settings are defined include one or more GUI controls for specifying how often a check is performed for location updates for the layer.

In a feature of this aspect, the geo-analytical program is configured to apply user-defined layer configuration settings to plot a layer on a map-based GUI comprising markers each representing an instance of the base object type.

In a feature of this aspect, the connected devices comprise a plurality of mobile phones and the geospatial data for the connected devices comprises geospatial data acquired by a plurality of mobile phones.

In a feature of this aspect, the connected devices comprise a plurality of smartphones, and the geospatial data for the connected devices comprises geospatial data acquired by the plurality of smartphones.

In a feature of this aspect, the connected devices comprise a plurality tablets, and the geospatial data for the connected devices comprises geospatial data acquired by the plurality of tablets.

In a feature of this aspect, the connected devices comprise a plurality of Android and iOS devices, and the geospatial data for the connected devices comprises geospatial data acquired by the plurality of Android and iOS devices.

In a feature of this aspect, the connected devices comprise a plurality of telematic devices, and the geospatial data for the connected devices comprises geospatial data acquired by the plurality of telematic devices. In accordance with one or more implementations, the telematic devices are attached to vehicles.

Another aspect relates to a computer-implemented method. This method includes displaying one or more graphical user interfaces (GUIs) provided by geo-analytical software that is integrated into a customer relationship management (CRM) solution, the one or more GUIs being accessible by users within the CRM solution, by which GUIs users are able to define layer configuration settings for one or more layers for plotting on a map-based GUI accessible within the CRM solution, the GUIs comprising one or more windows, pages, or the like, each comprising one or more GUI controls by which layer configuration settings are defined by the user, wherein one or more defined data object types are defined in the CRM solution or the geo-analytical program, defined data object types can be defined to include one or more fields and can be defined to be associated with one or more other defined data object types, and layer configuration settings for a respective layer comprise an indication of a data object type serving as a base object type for the respective layer. This method further includes receiving from a user, via the one or more GUIs, user-defined configuration settings for a first layer; storing in non-transitory computer readable medium the user-defined configuration settings for the first layer; electronically receiving, at a geospatial computer system, geospatial data for a plurality of connected devices; electronically receiving at the geo-analytical program, over the Internet from the geospatial computer system, real-time geospatial data for the plurality of connected devices; and displaying the map-based GUI, and utilizing, by the geo-analytical program, the user-defined layer configuration settings for the first layer to plot the first layer on the map-based GUI based on the received real-time geospatial data for the plurality of connected devices.

Another aspect relates to a computer-implemented method. This computer-implemented method includes providing one or more graphical user interfaces (GUIs) of a geo-analytical program that is integrated into a customer relationship management (CRM) solution, the one or more GUIs being accessible by users within the CRM solution, by which GUIs users are able to define layer configuration settings for one or more layers for plotting on a map-based GUI accessible within the CRM solution, the GUIs comprising one or more windows, pages, or the like, each comprising one or more GUI controls by which layer configuration settings are defined by the user, wherein one or more defined data object types are defined in the CRM solution or the geo-analytical program, defined data object types can be defined to include one or more fields and can be defined to be associated with one or more other defined data object types, and layer configuration settings for a respective layer comprise an indication of a data object type serving as a base object type for the respective layer. This method further includes receiving from a user, via the one or more GUIs, user-defined configuration settings for a first layer; storing in non-transitory computer readable medium the user-defined configuration settings for the first layer; electronically receiving, at a geospatial computer system, geospatial data for a plurality of connected devices; electronically receiving at the geo-analytical program, over the Internet from the geospatial computer system, real-time geospatial data for the plurality of connected devices; and displaying the map-based GUI, and utilizing, by the geo-analytical program, the user-defined layer configuration settings for the first layer to plot the first layer on the map-based GUI based on the received real-time geospatial data for the plurality of connected devices.

Another aspect relates to a system. This system includes hardware and software together configured to provide a customer relationship management (CRM) computer system for a CRM application; and hardware and software together configured to provide a geospatial computer system; a geo-analytical program integrated with the CRM application, the geo-analytical program being configured for communication with the geospatial computer system. The CRM application is accessible by users at a first set of one or more network IP addresses and provides access by the users to one or more graphical user interfaces (GUIs) of the geo-analytical program by which the users define configuration settings for layers for a map-based GUI accessible through the CRM application, the GUIs comprising one or more windows, pages, or the like, each comprising one or more GUI controls by which layer configuration settings are defined by the user. The geospatial computer system is accessible at a second set of one or more network IP addresses different from the first set of network IP addresses, wherein the CRM computer system and the geospatial computer system are configured for electronic communications with one another and wherein the geospatial computer system is configured to receive geospatial data for a plurality of connected devices. The geo-analytical program is configured to electronically receive over the Internet from the geospatial computer system real-time geospatial data for the plurality of connected devices, and apply user-defined layer configuration settings to plot a layer on the map-based GUI based on the received real-time geospatial data for the plurality of connected devices.

In a feature of this aspect, the CRM application is accessible by users over the Internet at the first set of network IP addresses.

In a feature of this aspect, the geospatial computer system is accessible over the Internet at the second set of network IP addresses.

In a feature of this aspect, user-defined configuration settings for a first layer are electronically communicated from the geo-analytical program to the geospatial computer system for storing and processing.

In a feature of this aspect, the system further comprises a plurality of mobile phones, wherein the geospatial data for the connected devices comprises geospatial data acquired by the plurality of mobile phones.

In a feature of this aspect, the system further comprises a plurality of smartphones, wherein the geospatial data for the connected devices comprises geospatial data acquired by the plurality of smartphones.

In a feature of this aspect, the system further comprises a plurality tablets, wherein the geospatial data for the connected devices comprises geospatial data acquired by the plurality of tablets.

In a feature of this aspect, the system further comprises a plurality of Android and iOS devices, wherein the geospatial data for the connected devices comprises geospatial data acquired by the plurality of Android and iOS devices.

In a feature of this aspect, the system further comprises a plurality of telematic devices, wherein the geospatial data for the connected devices comprises geospatial data acquired by the plurality of telematic devices. In accordance with one or more implementations, the telematic devices are attached to vehicles. In accordance with one or more implementations, the telematic devices are attached to shipping containers.

In a feature of this aspect, the geospatial computer system is configured to receive geospatial data acquired by the connected devices directly from the connected devices.

In a feature of this aspect, the geospatial computer system is configured to receive geospatial data acquired by the connected devices from the connected devices via Satellite communications.

In a feature of this aspect, the geospatial computer system is configured to receive geospatial data acquired by the connected devices from the connected devices via cellular telecommunications.

In a feature of this aspect, the geospatial computer system is configured to receive geospatial data acquired by the connected devices from the connected devices via wireless telecommunications.

In a feature of this aspect, the geospatial computer system is configured to receive geospatial data acquired by the connected devices from one or more gateways that receive the geospatial data acquired by the connected devices directly from the connected devices. In accordance with one or more implementations, the geospatial computer system is configured to electronically communicate with the one or more gateways over the Internet.

In a feature of this aspect, the geospatial computer system is configured to receive geospatial data acquired by the plurality of connected devices.

In a feature of this aspect, the geo-analytical program represents an optional feature of the CRM computer system.

In a feature of this aspect, the geo-analytical program is provided by a first party that maintains the geospatial computer system, and wherein the CRM application is provided by a second party that maintains the CRM computer system, the second party being unaffiliated with the first party.

In a feature of this aspect, users are customers of a provider of the CRM application. In accordance with one or more implementations, the CRM application is provided to the users under a subscription with the provider of the CRM application. In accordance with one or more implementations, the users also are customers of a provider of the geo-analytical program. In accordance with one or more implementations, the geo-analytical program is provided to the users under an additional subscription with the provider of the CRM application.

In a feature of this aspect, a provider of the CRM application is a customer of a provider of the geo-analytical program.

In a feature of this aspect, the CRM computer system is configured to store accounts comprising customer data, wherein each account corresponds to a business, wherein for each account one or more of the users are associated therewith, wherein layer configuration settings for a respective defined layer are associated with the account of the user defining the respective layer, and wherein the account association of each user-defined layer is communicated to, and stored in non-transient computer-readable medium by, the geospatial computer system. In accordance with one or more implementations, the customer data of each account in the CRM system comprises client contact info, client accounts, cases, work orders, leads, and sales opportunities of the business corresponding to the account.

In a feature of this aspect, the system comprises one or more defined data object types defined in the CRM computer system or the geo-analytical program, wherein defined data object types can be defined to include one or more fields and can be defined to be associated with one or more other defined data object types. In accordance with one or more implementations, layer configuration settings for a respective layer comprise an indication of a data object type serving as a base object type for the respective layer. In accordance with one or more implementations, the one or more GUI controls by which layer configuration settings are defined include one or more GUI controls for defining a filter for a layer. In accordance with one or more implementations, the one or more GUI controls by which layer configuration settings are defined include one or more GUI controls for defining a field filter for a layer, the one or more GUI controls being configured to allow a user to indicate one or more fields of the base object type for a layer to use for filtering. In accordance with one or more implementations, the one or more GUI controls by which layer configuration settings are defined include one or more GUI controls for defining a cross object filter for a layer, the one or more GUI controls being configured to allow a user to indicate a first object type associated with the base object type, and further indicate one more fields of the first object type for a layer to use for filtering. In accordance with one or more implementations, the one or more GUI controls by which layer configuration settings are defined include one or more GUI controls for defining an activity filter for a layer, the one or more GUI controls being configured to allow a user to specify that filtering for a layer is to be performed based on the presence or absence of tasks for a base object instance. In accordance with one or more implementations, the one or more GUI controls by which layer configuration settings are defined include one or more GUI controls for defining an activity filter for a layer, the one or more GUI controls being configured to allow a user to specify that filtering for a layer is to be performed based on the presence or absence of events for a base object instance. In accordance with one or more implementations, the one or more GUI controls by which layer configuration settings are defined include one or more GUI controls for defining an owner filter for a layer, the one or more GUI controls being configured to allow a user to specify that filtering for a layer is to be performed based on an owner of a base object instance. In accordance with one or more implementations, the one or more GUI controls by which layer configuration settings are defined include one or more GUI controls for defining a maximum number of records to plot. In accordance with one or more implementations, the one or more GUI controls by which layer configuration settings are defined include one or more GUI controls for defining tooltips for markers for display on a map-based GUI, wherein the one or more GUI controls are configured to allow a user to indicate one or more fields of the base object type for display in a tooltip. In accordance with one or more implementations, the one or more GUI controls by which layer configuration settings are defined include one or more GUI controls for specifying static assignment of a single icon as a marker for display on a map-based GUI. In accordance with one or more implementations, the one or more GUI controls by which layer configuration settings are defined include one or more GUI controls for defining an icon for markers for display on a map-based GUI. In accordance with one or more implementations, the one or more GUI controls by which layer configuration settings are defined include one or more GUI controls for specifying dynamic assignment of icons for markers for base object instances to be plotted on a map-based GUI. In accordance with one or more implementations, the one or more GUI controls by which layer configuration settings are defined include one or more GUI controls for specifying a field of the base object instance which is used for the dynamic assignment, and for further specifying icons to be used for specified field values. In accordance with one or more implementations, the one or more GUI controls by which layer configuration settings are defined include one or more GUI controls for specifying use of a dynamic marker for base object instances plotted on a map-based GUI comprising text from a field of a base object instance. In accordance with one or more implementations, the one or more GUI controls by which layer configuration settings are defined include one or more GUI controls for defining tooltips for markers for display on a map-based GUI, wherein the one or more GUI controls are configured to allow a user to indicate one or more fields of the base object type for display in a tooltip, and wherein the one or more GUI controls by which layer configuration settings are defined include one or more GUI controls for specifying use of a dynamic marker for base object instances plotted on a map-based GUI comprising a field defined to be part of a tooltip. In accordance with one or more implementations, the one or more GUI controls by which layer configuration settings are defined include one or more GUI controls for specifying dynamic assignment of shapes and colors for markers for base object instances to be plotted on a map-based GUI. In accordance with one or more implementations, the one or more GUI controls by which layer configuration settings are defined include one or more GUI controls for specifying a first field of the base object instance which is used for the dynamic assignment of shapes, and for further specifying shapes to be used for specified field values. In accordance with one or more implementations, the one or more GUI controls by which layer configuration settings are defined include one or more GUI controls for specifying a second field of the base object instance which is used for the dynamic assignment of colors, and for further specifying colors to be used for specified field values. In accordance with one or more implementations, the one or more GUI controls by which layer configuration settings are defined include one or more GUI controls for specifying configuration settings for a related list which provides access to additional field data for objects associated to a base object instance. In accordance with one or more implementations, the one or more GUI controls by which layer configuration settings are defined include one or more GUI controls for specifying how often a layer refreshes. In accordance with one or more implementations, the one or more GUI controls by which layer configuration settings are defined include one or more GUI controls for specifying how often a check is performed for location updates for the layer. In accordance with one or more implementations, the geo-analytical program is configured to apply user-defined layer configuration settings to plot a layer on a map-based GUI comprising markers each representing an instance of the base object type.

Another aspect relates to a system for integration with a customer relationship management (CRM) application of a CRM computer system, the system comprising hardware and software together configured to provide a geospatial computer system, and a geo-analytical program integrated into the CRM application, the geo-analytical program being configured for communication with the geospatial computer system. The CRM application is accessible by users over the Internet and provides access to one or more graphical user interfaces (GUIs) of the geo-analytical program by which the users define configuration settings for layers for a map-based GUI accessible through the CRM computer system, the GUIs comprising one or more windows, pages, or the like, each comprising one or more GUI controls by which layer configuration settings are defined by the user. The CRM computer system and the geospatial computer system are configured for electronic communications with one another. The geospatial computer system is configured to receive geospatial data for a plurality of connected devices. The geo-analytical program is configured to electronically receive over the Internet from the geospatial computer system real-time geospatial data for the plurality of connected devices, and apply user-defined layer configuration settings to plot a layer on a map-based GUI based on the received real-time geospatial data for the plurality of connected devices.

In a feature of this aspect, one or more defined data object types are defined in the CRM computer system or the geo-analytical program, wherein defined data object types can be defined to include one or more fields and can be defined to be associated with one or more other defined data object types, and wherein layer configuration settings for a respective layer comprise an indication of a data object type serving as a base object type for the respective layer. In accordance with one or more implementations, the one or more GUI controls by which layer configuration settings are defined include one or more GUI controls for defining a filter for a layer. In accordance with one or more implementations, the one or more GUI controls by which layer configuration settings are defined include one or more GUI controls for defining a field filter for a layer, the one or more GUI controls being configured to allow a user to indicate one or more fields of the base object type for a layer to use for filtering. In accordance with one or more implementations, the one or more GUI controls by which layer configuration settings are defined include one or more GUI controls for defining a cross object filter for a layer, the one or more GUI controls being configured to allow a user to indicate a first object type associated with the base object type, and further indicate one more fields of the first object type for a layer to use for filtering. In accordance with one or more implementations, the one or more GUI controls by which layer configuration settings are defined include one or more GUI controls for defining an activity filter for a layer, the one or more GUI controls being configured to allow a user to specify that filtering for a layer is to be performed based on the presence or absence of tasks for a base object instance. In accordance with one or more implementations, the one or more GUI controls by which layer configuration settings are defined include one or more GUI controls for defining an activity filter for a layer, the one or more GUI controls being configured to allow a user to specify that filtering for a layer is to be performed based on the presence or absence of events for a base object instance. In accordance with one or more implementations, the one or more GUI controls by which layer configuration settings are defined include one or more GUI controls for defining an owner filter for a layer, the one or more GUI controls being configured to allow a user to specify that filtering for a layer is to be performed based on an owner of a base object instance. In accordance with one or more implementations, the one or more GUI controls by which layer configuration settings are defined include one or more GUI controls for defining a maximum number of records to plot. In accordance with one or more implementations, the one or more GUI controls by which layer configuration settings are defined include one or more GUI controls for defining tooltips for markers for display on a map-based GUI, wherein the one or more GUI controls are configured to allow a user to indicate one or more fields of the base object type for display in a tooltip. In accordance with one or more implementations, the one or more GUI controls by which layer configuration settings are defined include one or more GUI controls for specifying static assignment of a single icon as a marker for display on a map-based GUI. In accordance with one or more implementations, the one or more GUI controls by which layer configuration settings are defined include one or more GUI controls for defining an icon for markers for display on a map-based GUI. In accordance with one or more implementations, the one or more GUI controls by which layer configuration settings are defined include one or more GUI controls for specifying dynamic assignment of icons for markers for base object instances to be plotted on a map-based GUI. In accordance with one or more implementations, the one or more GUI controls by which layer configuration settings are defined include one or more GUI controls for specifying a field of the base object instance which is used for the dynamic assignment, and for further specifying icons to be used for specified field values. In accordance with one or more implementations, the one or more GUI controls by which layer configuration settings are defined include one or more GUI controls for specifying use of a dynamic marker for base object instances plotted on a map-based GUI comprising text from a field of a base object instance. In accordance with one or more implementations, the one or more GUI controls by which layer configuration settings are defined include one or more GUI controls for defining tooltips for markers for display on a map-based GUI, wherein the one or more GUI controls are configured to allow a user to indicate one or more fields of the base object type for display in a tooltip, and wherein the one or more GUI controls by which layer configuration settings are defined include one or more GUI controls for specifying use of a dynamic marker for base object instances plotted on a map-based GUI comprising a field defined to be part of a tooltip. In accordance with one or more implementations, the one or more GUI controls by which layer configuration settings are defined include one or more GUI controls for specifying dynamic assignment of shapes and colors for markers for base object instances to be plotted on a map-based GUI. In accordance with one or more implementations, the one or more GUI controls by which layer configuration settings are defined include one or more GUI controls for specifying a first field of the base object instance which is used for the dynamic assignment of shapes, and for further specifying shapes to be used for specified field values. In accordance with one or more implementations, the one or more GUI controls by which layer configuration settings are defined include one or more GUI controls for specifying a second field of the base object instance which is used for the dynamic assignment of colors, and for further specifying colors to be used for specified field values. In accordance with one or more implementations, the one or more GUI controls by which layer configuration settings are defined include one or more GUI controls for specifying configuration settings for a related list which provides access to additional field data for objects associated to a base object instance. In accordance with one or more implementations, the one or more GUI controls by which layer configuration settings are defined include one or more GUI controls for specifying how often a layer refreshes. In accordance with one or more implementations, the one or more GUI controls by which layer configuration settings are defined include one or more GUI controls for specifying how often a check is performed for location updates for the layer. In accordance with one or more implementations, the geo-analytical program is configured to apply user-defined layer configuration settings to plot a layer on a map-based GUI comprising markers each representing an instance of the base object type. In accordance with one or more implementations, the system utilizes an EC2 Daemon, a Lambda compute service, an S3 bucket, DynamoDB, Kinesis Firehose, a Redshift Cluster, one or more Simple Queue Service (SQS) queues, an Internet of Things (IoT) device message ant farm, and an IoT rule processing ant farm.

Another aspect relates to a non-transitory computer-readable medium containing computer-executable instructions for performing a disclosed method.

Another aspect relates to software in a computer-readable medium and executable by a computer processor for performing a disclosed method.

Still additional aspects and features are disclosed in the Exhibit 1 submitted herewith, which is incorporated herein by reference.

In another aspect, a computer-readable medium contains computer-executable instructions for performing a method in accordance with any of the foregoing aspect and features.

In addition to the aforementioned aspects and features of the present invention, it should be noted that the present invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the present invention now will be described in detail with reference to the accompanying drawings, wherein the same elements are referred to with the same reference numerals.

FIG. 5 illustrates an exemplary field filters GUI configured to allow a user to specify configuration settings for a layer to be plotted on a map-based GUI.

DETAILED DESCRIPTION

Figure 1:
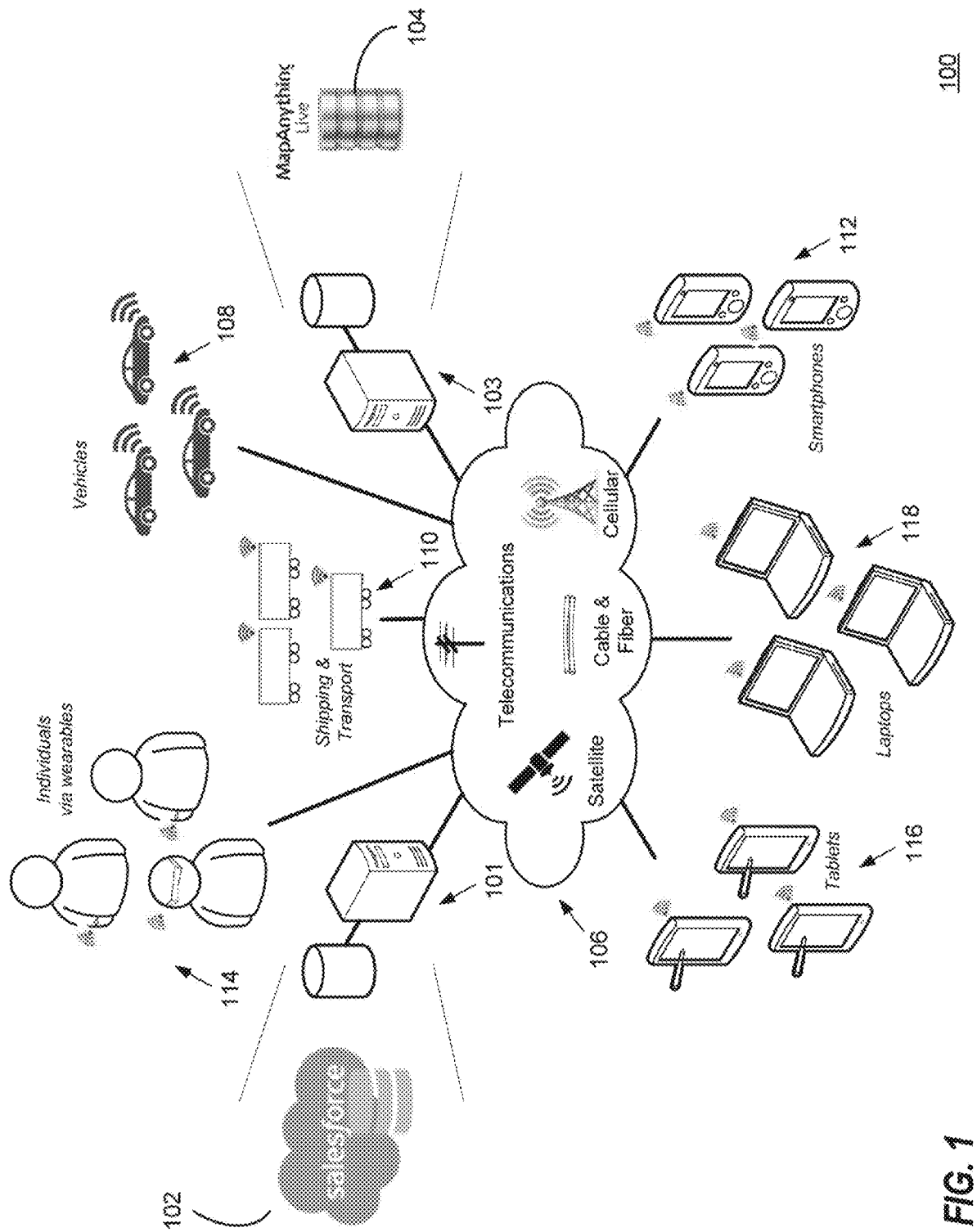
FIG. 1 is a schematic illustration of a preferred system in accordance with one or more preferred embodiments of the invention.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention, and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "a" and "an" each generally denotes "at least one", but does not exclude a plurality unless the contextual use dictates otherwise. Thus, reference to "a picnic basket having an apple" describes "a picnic basket having at least one apple" as well as "a picnic basket having apples". In contrast, reference to "a picnic basket having a single apple" describes "a picnic basket having only one apple".

When used herein to join a list of items, "or" denotes "at least one of the items", but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers". When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese".

Additionally, "IoT" and "Internet of Things" where used herein is intended to refer to the internetworking of physical objects each having hardware and software configured to collect and electronically communicate data over the Internet. Such objects may be referred to herein as "connected devices" and "smart devices". Examples of such objects include by way of example, and not limitation, vehicles, international shipping containers, mobile phones, watches, computer tablets, and laptops. A connected device may be tracked based on global positioning computer system (GPS) data, radio frequency identification (RFID) data, or both.

Furthermore, U.S. Patent Appl. Publ. No. 2009/0322510, which is hereby incorporated herein by reference, discloses the securing, monitoring and tracking of shipping containers and, in particular, international shipping containers such as the 20-foot and 40-foot ISO-standard containers. In this regard, a wireless communication device is attached to each container and is configured to electronically communicate over a network with a server, which network may comprise the Internet, cellular network, Satellite network, and combinations thereof. This U.S. patent application publication further incorporates other U.S. patent application publications and patents, each of which is incorporated herein by reference. The incorporated disclosures of these U.S. patent application publications and patents is exemplary of technologies that may be utilized in implementing preferred embodiments of methods and computer systems of the present invention.

Referring now to the drawings, one or more preferred embodiments of the invention are next described. The following description of one or more preferred embodiments is merely exemplary in nature and is in no way intended to limit the invention, its implementations, or uses.

A system 100 is illustrated in FIG. 1. The system comprises hardware and software, which is indicated generally at 101, and which hardware and software together are configured to provide a CRM computer system 102. The CRM computer system 102 preferably comprises a plurality of web servers and databases with geographic redundancy.

The system 100 additionally comprises hardware and software, which is indicated generally at 103, and which hardware and software together are configured to provide a geospatial computer system 104. The geospatial computer system 104 preferably comprises a plurality of web servers and databases with geographic redundancy. The geospatial computer system 104 is described in detail below.

The CRM computer system 102 and the geospatial computer system 104 in at least one or more preferred embodiments are maintained by different parties at separate physical or virtual locations. Furthermore, the CRM computer system 102 is accessible at a first set of one or more network IP addresses—or equivalently one or more URLs. Similarly, the geospatial computer system 104 is accessible at a second set of one or more network IP addresses—or equivalently one or more URLs, which are different from the first set of network IP addresses. Preferably, each computer system 102,104 thereby is enabled for electronic communications over a wide area computer network (WAN) or global computer network, which is indicated generally in FIG. 1 by cloud 106. The cloud 106 preferably comprises the Internet. As such, the CRM computer system 102 and the geospatial computer system 104 are configured for electronic communications with one another over the cloud 106 using one or more of the first set of network IP addresses and the second set of network IP addresses. Preferably the electronic communications between the two computer systems 102,104 are secured by encryption and may utilize one or more other technological and communication protocol safeguards.

The electronic communications between the two computer systems 102,104 preferably include the communication of configuration settings from the CRM computer system 102 to the geospatial computer system 104, which settings are received and stored in non-transitory computer-readable medium by the geospatial computer system 104, and preferably in a database of the geospatial computer system 104. The settings and creation thereof at the CRM computer system 102 is described in detail below.

The cloud 106 preferably represents an open and publicly accessible communications infrastructure such as the Internet. As such, the CRM computer system 102 preferably is accessible over the cloud 106 for authorized communications using one or more of the first set of network IP addresses. Similarly, the geospatial computer system 104 preferably is accessible over the cloud 106 for authorized communications using one or more of the second set of network IP addresses.

The CRM computer system 102—through a CRM application—enables users of the CRM computer system 102 having networked devices to store and manage prospect and customer information, like contact info, accounts, cases, work orders, leads, and sales opportunities, in a single online platform, i.e., in "the cloud". The CRM solution is scalable and provides access to a user when needed, wherever located, so long as the networked device has network connectivity.

The geospatial computer system 104 is configured to receive geospatial data acquired by a plurality of connected devices in the context of the "Internet of Things". With reference to FIG. 1, such connected devices include by way of example and not limitation: vehicles indicated generally at 108; shipping & transport vehicles and containers having telematic devices, indicated generally at 110; mobile phones, indicated generally at 112; individuals having wearables, including smartwatches like Apple watches, health devices like Fitbits, and eyewear like Google glass, all indicated generally at 114; computer tablets, indicated generally at 116; and laptops, indicated generally at 118. It will further be appreciated that connected devices of course could—and preferably do—comprise Android and iOS devices, and that the networked devices by which users access and make use of the CRM computer system 102 may comprise desktop computers as well as such connected devices, including laptops, tablets, and smartphones that are carried by users in the field.

Specifically, connected devices are configured to communicate geospatial data to the geospatial computer system 104 over the cloud 106 (e.g. using the one or more of the second set of network IP addresses). The geospatial data communicated to the geospatial computer system 104 from a connected device may comprise the coordinates for the connected device itself or coordinates from another connected device that has been communicated to such connected device. Moreover, the coordinates preferably are GPS coordinates obtained from a GPS system or coordinates provided by an RFID asset-tracking system. Such geospatial data further may include a timestamp representing the date and time the relevant connected device was located at the coordinates. Connected devices preferably communicate the geospatial data on demand upon receiving a request, at routine intervals of time, upon a detected location change, when such data is received, and any combination thereof. Pathways for communicating such geospatial data may comprise satellite communications, cellular communications, communications over telephone networks, and communications over fiber and cable networks, ultimately reaching geospatial computer system 104 (e.g. at one or more of the network IP addresses of such computer system), as graphically indicated within the cloud 106 in FIG. 1.

Communication of the geospatial data may be received directly from the connected devices, wherein the end points of the communications are connected devices on the one side, and the geospatial computer system on the other; however, it is also provided that the geospatial data may be collected and aggregated and, thereafter, collectively communicated to the geospatial computer system. Such collection and aggregation for later communication to the geospatial computer system may be done, for example, by an Internet service provider, a cellular provider, a cable provider, or a satellite communications provider. Furthermore, such communication from a provider may be done upon receiving a request, at routine intervals of time, upon a detected location change of a connected device, and any combination thereof. Pathways for such communication also may comprise satellite communications, cellular communications, communications over telephone networks, and communications over fiber and cable networks, ultimately reaching geospatial computer system 104 at one or more of the network IP addresses of such computer system, as graphically indicated within the cloud 106 in FIG. 1. Thus, the geospatial computer system may be configured to electronically communicate with and receive the collected and aggregated data over the Internet from one or more gateways of one or more third party providers.

In view of the foregoing, it will be understood that the geospatial computer system 104 preferably is configured to electronically receive over the Internet geospatial data that is acquired or provided by a plurality of connected devices.

In accordance with one or more preferred implementations, a geo-analytical program utilizing the geospatial computer system 104 is provided as an optional add-on or additional module for integration with and use within a CRM application.

Figure 2:
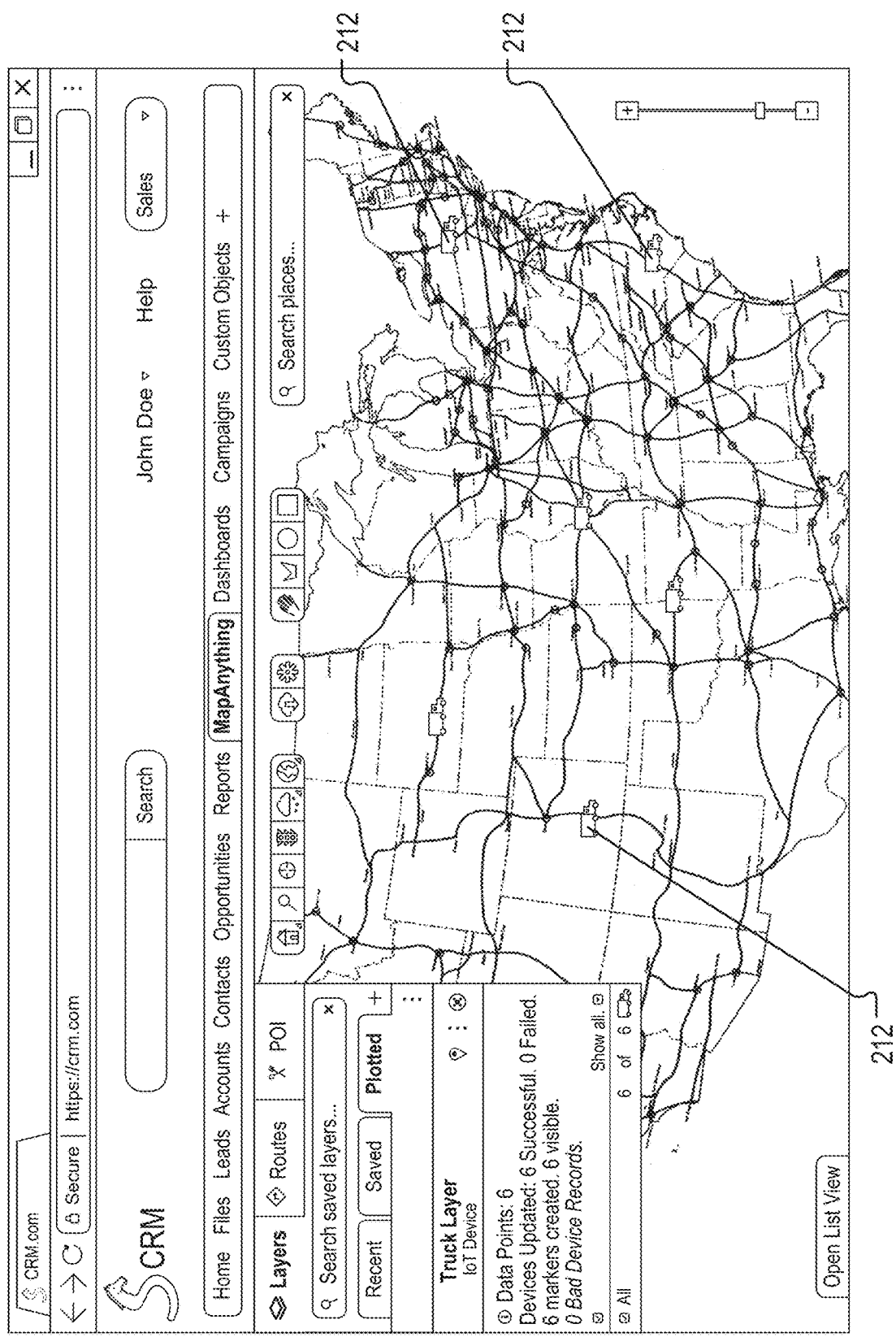
FIG. 2 illustrates tabbed pages that are provided as part of an interface for a CRM application, including a tabbed page for a geo-analytical application, and further illustrates an exemplary map-based graphical user interface (GUI) which maps connected devices onto a map based on geospatial information from a geospatial computer system.

An example of such integration is illustrated in FIG. 2, wherein a tab control includes tabbed pages that are provided as part of a primary interface for a CRM application. A geo-analytical program is seamlessly integrated into the CRM application through the addition of a tabbed page which has been selected and is in focus in FIG. 2. The tabbed page seen here is generated by an add-on program provided by MapAnything Inc., bears the tabbed page title "MapAnything", and is available for example through the Salesforce AppExchange marketplace.

In one embodiment, the GUI is implemented through a series of windows, pages, or the like that are launched by selection of a button or another element in a tabbed page. Each window, page, or the like of the GUI comprises one or more GUI elements and/or controls.

In accordance with one or more preferred implementations, a geo-analytical program integrated into a CRM application includes a map-based GUI. For example, FIG. 2 illustrates an exemplary map-based GUI which maps connected devices onto a map based on geospatial information from the geospatial computer system 104.

In accordance with one or more preferred implementations, a map-based GUI is utilized to map the current location of one or more connected devices, and/or past locations of one or more connected devices. In accordance with one or more preferred implementations, a map-based GUI is utilized to map events or actions associated with one or more connected devices.

In accordance with one or more preferred implementations, a geo-analytical program is configured to allow a user to define layers for a map-based GUI. In accordance with one or more preferred implementations, such layers allow a user to, for example, define or filter the connected devices that will be displayed or mapped for a particular layer, customize how information will be displayed or mapped for a particular layer, or otherwise customize what will be displayed or mapped, and how, for a particular layer.

In accordance with one or more preferred implementations, a geo-analytical program is configured to utilize data objects that are defined in the geo-analytical program and/or a CRM application the geo-analytical program is integrated into. For example, in accordance with one or more preferred implementations, there exists a defined data object type for IoT devices that represent connected devices. A particular customer or client (e.g. a concrete sales company), may have a plurality of connected devices that are associated with assets (e.g. employee vehicles). Preferably, a data object for each of these connected devices would be created in the CRM application or geo-analytical program as an object of the data object type "IoT device".

It will be appreciated that a data object type may define a data object of that type to include a number of fields. For example, an "IoT device" data object type may be defined to include a "name" field and an "owner" field. It will further be appreciated that a data object type may be defined to include or allow relationships or associations with other data object types. For example, a defined "owner" field may be defined to be an instance of an "entity" object. Similarly, an "IoT device" data object type may be defined to allow for association with objects of an "event" data object type. It will be appreciated that this style of object oriented relational object definition is well known. In accordance with one or more preferred implementations, the definition of data object types and their associations and relations is customizable, while in one or more preferred implementations such customization may be limited.

Figure 3:
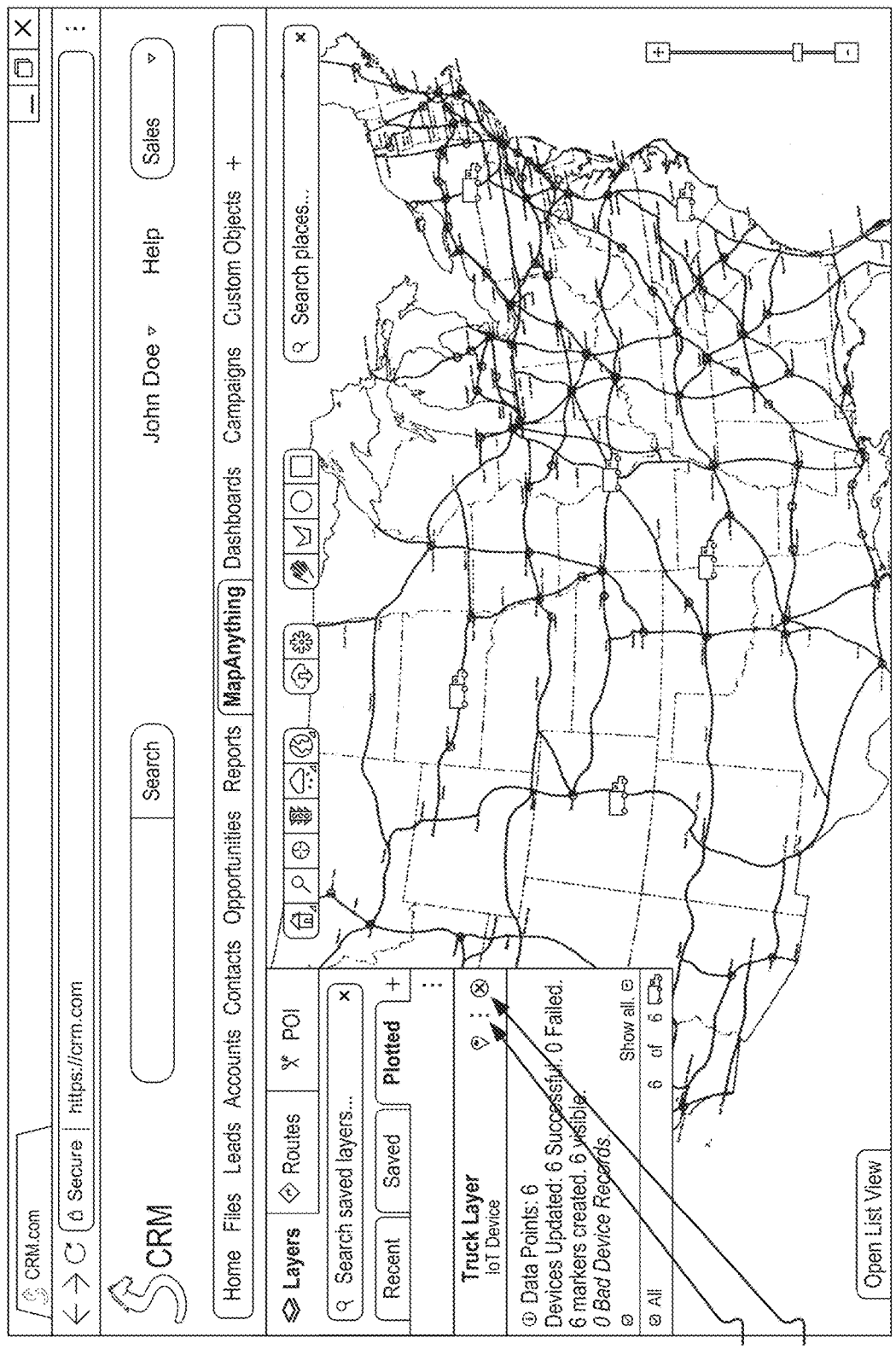
FIG. 3 illustrates an interface element configured to remove a layer of a map-based GUI.
Figure 4:
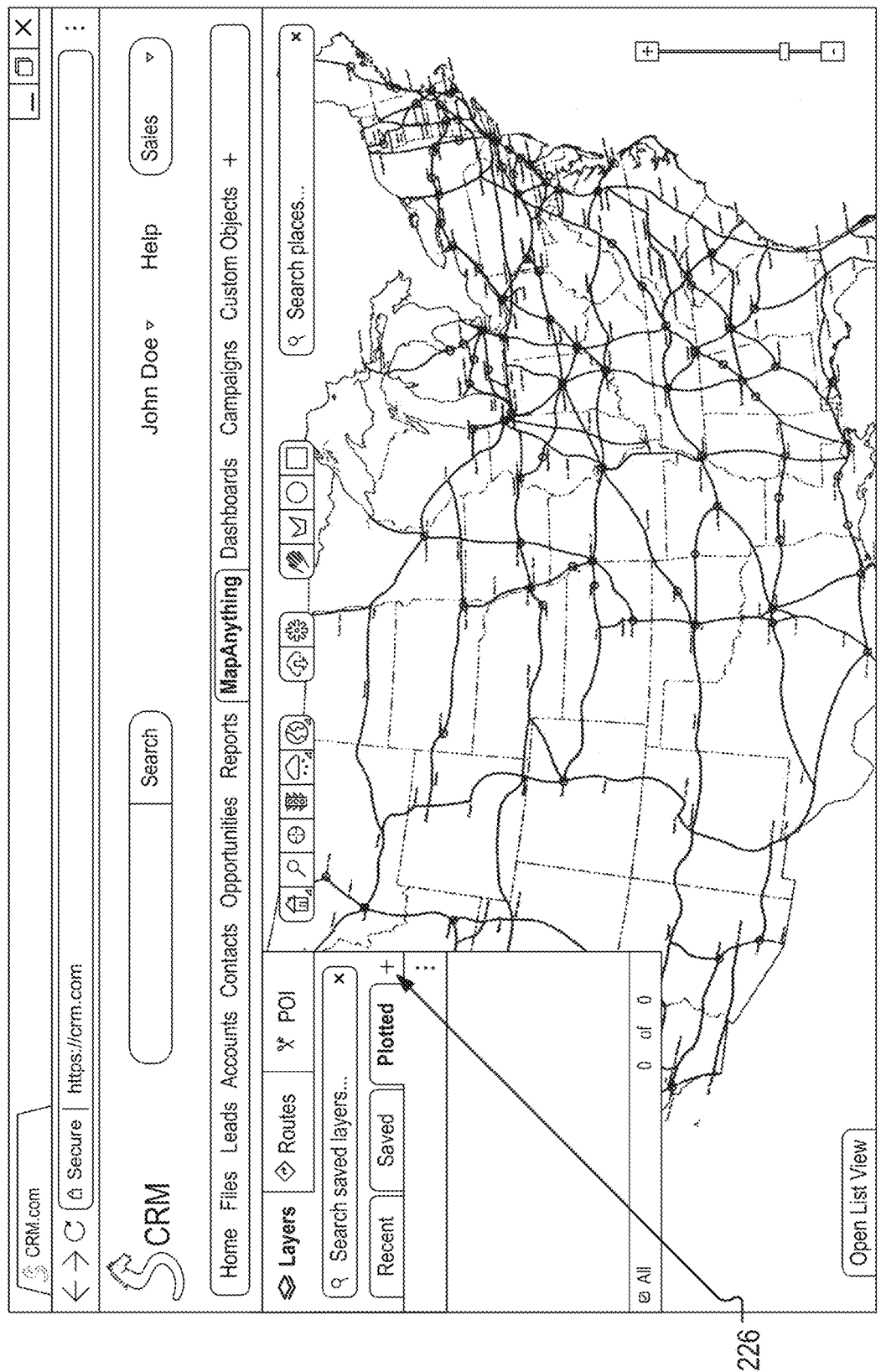
FIG. 4 illustrates updating of a map-based GUI to remove a layer.

In accordance with one or more preferred implementations, a geo-analytical program is configured to display a map-based GUI that includes one or more layers defined based on user provided layer configuration settings. For example, the map-based GUI illustrated in FIG. 2 is displaying a plotted layer named "Truck Layer" that plots markers 212 representing the real-time location of objects having an "IoT device" data object type in accordance with the configuration settings for the layer. In accordance with one or more preferred implementations, a user can edit configuration settings for this layer (e.g. by interacting with the depicted user interface element 222 comprising three dots) or remove this layer from display (e.g. by clicking on the user interface element 224 comprising an "x" displayed adjacent the name of the layer, as illustrated in FIG. 3). Preferably, removing the layer updates the map-based GUI to no longer display the layer (e.g. no longer display the markers for the layer), as illustrated in FIG. 4, but does not delete the configuration settings for the layer. In accordance with one or more preferred implementations, a user can subsequently reload the saved layer (as well as other saved layers) for display on a map-based GUI.

In accordance with one or more preferred implementations, a geo-analytical program includes a layer configuration GUI which is configured to allow a user to create or edit a layer for a map-based GUI. Such a layer configuration GUI might be accessed, for example, via a layer tab overlaid over a map-based GUI, as illustrated in FIG. 2. In accordance with one or more preferred implementations, a layer configuration GUI is accessible to edit previously defined layers, or create a new layer. For example, the user interface element 226 comprising a plus sign illustrated in FIG. 4 allows a user to access a layer configuration GUI to define configuration settings for a new layer.

In accordance with one or more preferred implementations, in order to create a new layer, a user must select or specify a base object type that the layer is going to be defined for. For example, a layer may be defined with the base object type being the defined data object type of "IoT device". In accordance with one or more preferred implementations, a GUI is displayed which allows a user to select an object type to utilize as the base object type for a new layer to be created. In accordance with one or more preferred implementations, the object types available for use as a base object type are determined based on accessing defined object types of the CRM application and/or geo-analytical program.

Figure 5:
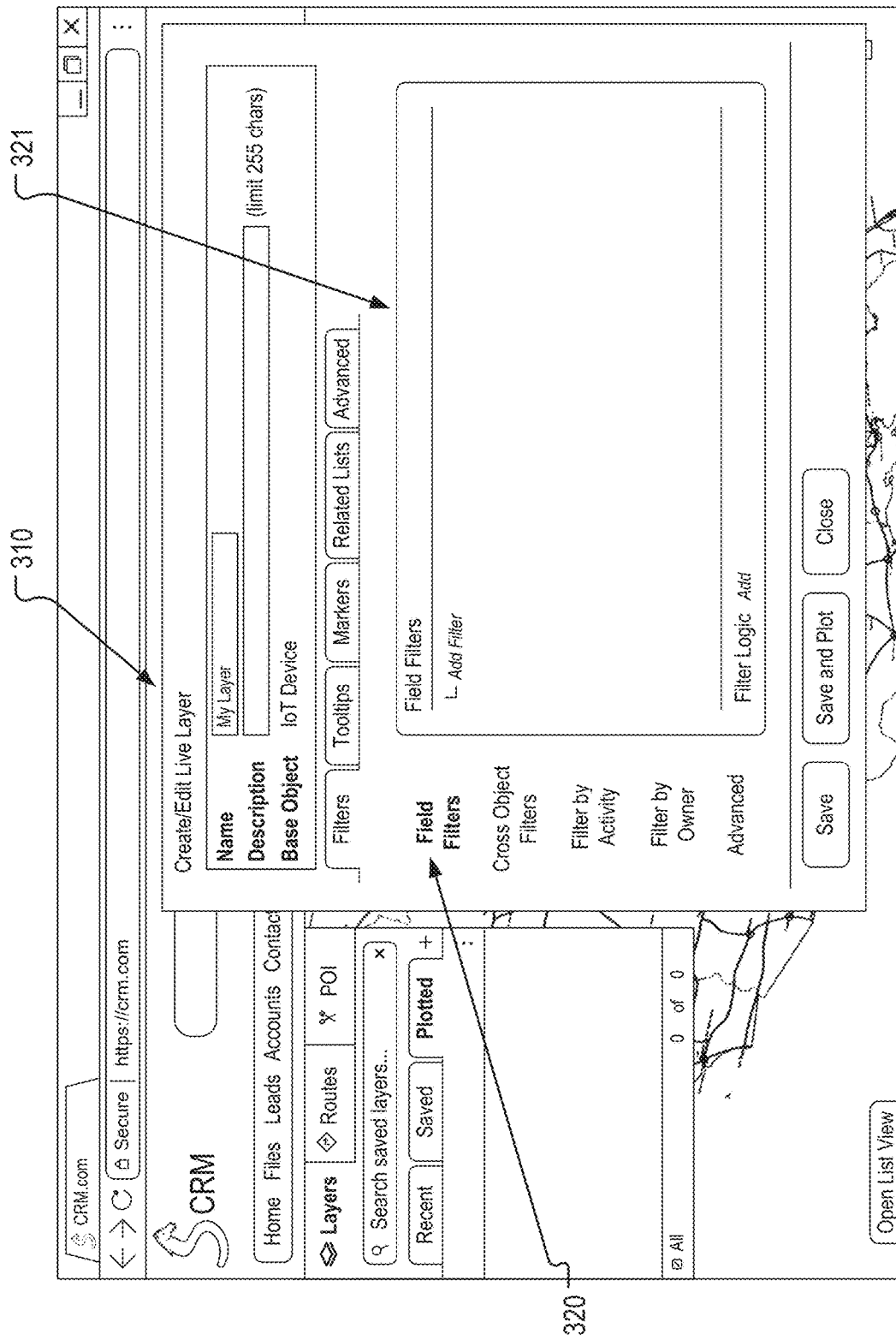
FIG. 5 illustrates an exemplary layer configuration GUI.

FIG. 5 illustrates an exemplary layer configuration GUI 310. The layer configuration GUI 310 includes a top section configured to allow a user to input a name for the layer and a description of the layer. In accordance with one or more preferred implementations or use cases, a user may further be able to specify a base object type that the layer is defined for. For example, a layer may be defined with the base object type being the defined data object type of "IoT device".

The layer configuration GUI further includes a middle section including a plurality of tabs configured to allow a user to customize the layer.

A first tab of the middle section of the layer configuration GUI is a filters tab which allows a user to customize filters for the layer.

Figure 6:
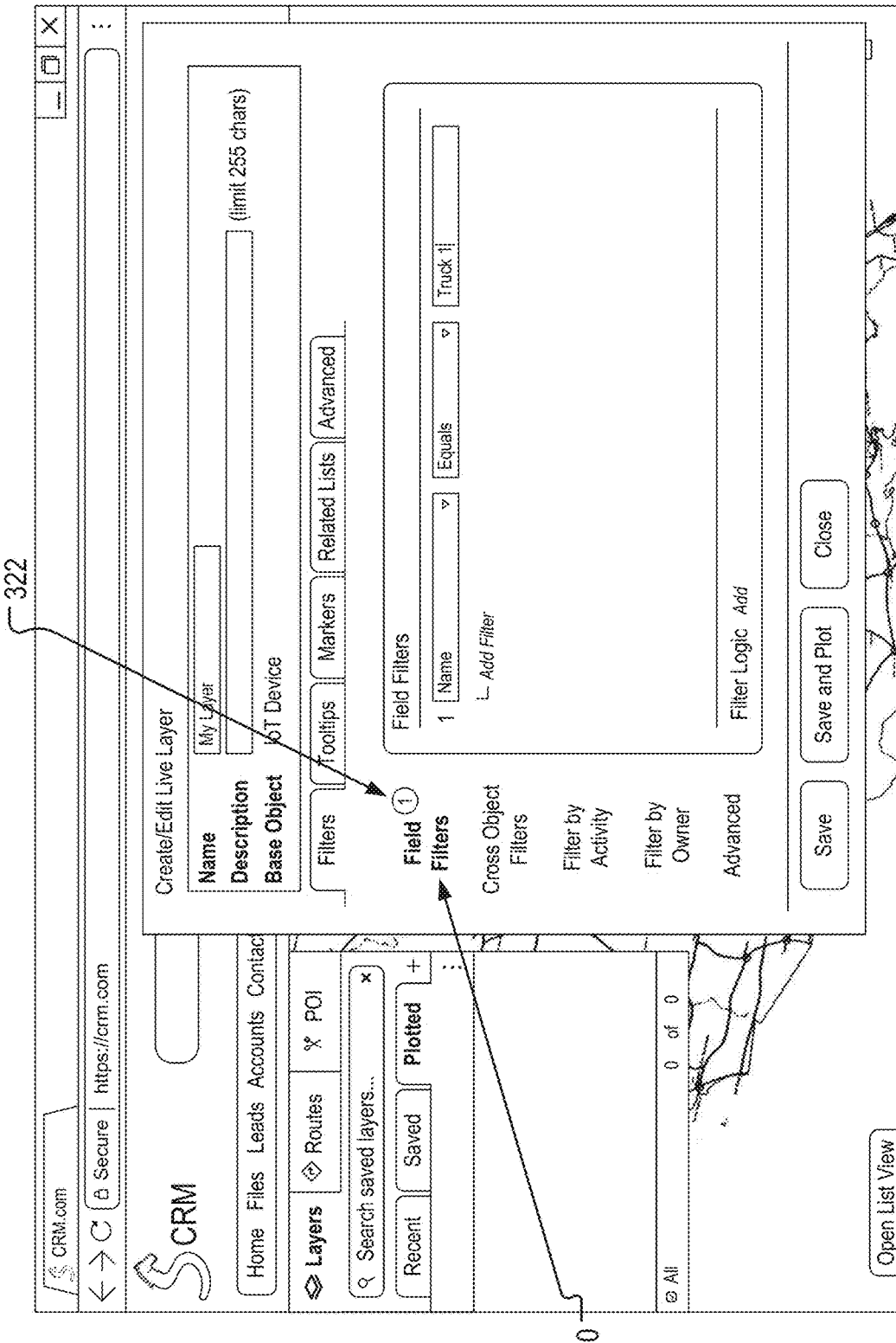
FIGS. 6-8 illustrate exemplary functionality for a field filters GUI configured to allow a user to specify configuration settings for a layer to be plotted on a map-based GUI.

The filters tab preferably includes a field filters interface element 320 which accesses a field filters GUI 321 which allows a user to add or edit field filters for the layer, as illustrated in FIG. 5. A user can utilize the field filters GUI 321 to add a field filter to filter what data objects of the base object type (i.e. base object type instances) mapping is performed for based on a field value of each object of that base object type. For example, as illustrated in FIG. 6, a user can specify to filter based on a "name" field of the "IoT device" object type such that mapping will only be done on the layer for "IoT device" data objects having a "name" value which equals "Truck 1". In accordance with one or more preferred implementations, once a field filter is created, a field filters indicator 322 is displayed adjacent the field filters interface element 320 which indicates a number of field filters which have been defined, as illustrated in FIG. 6.

Figure 7:
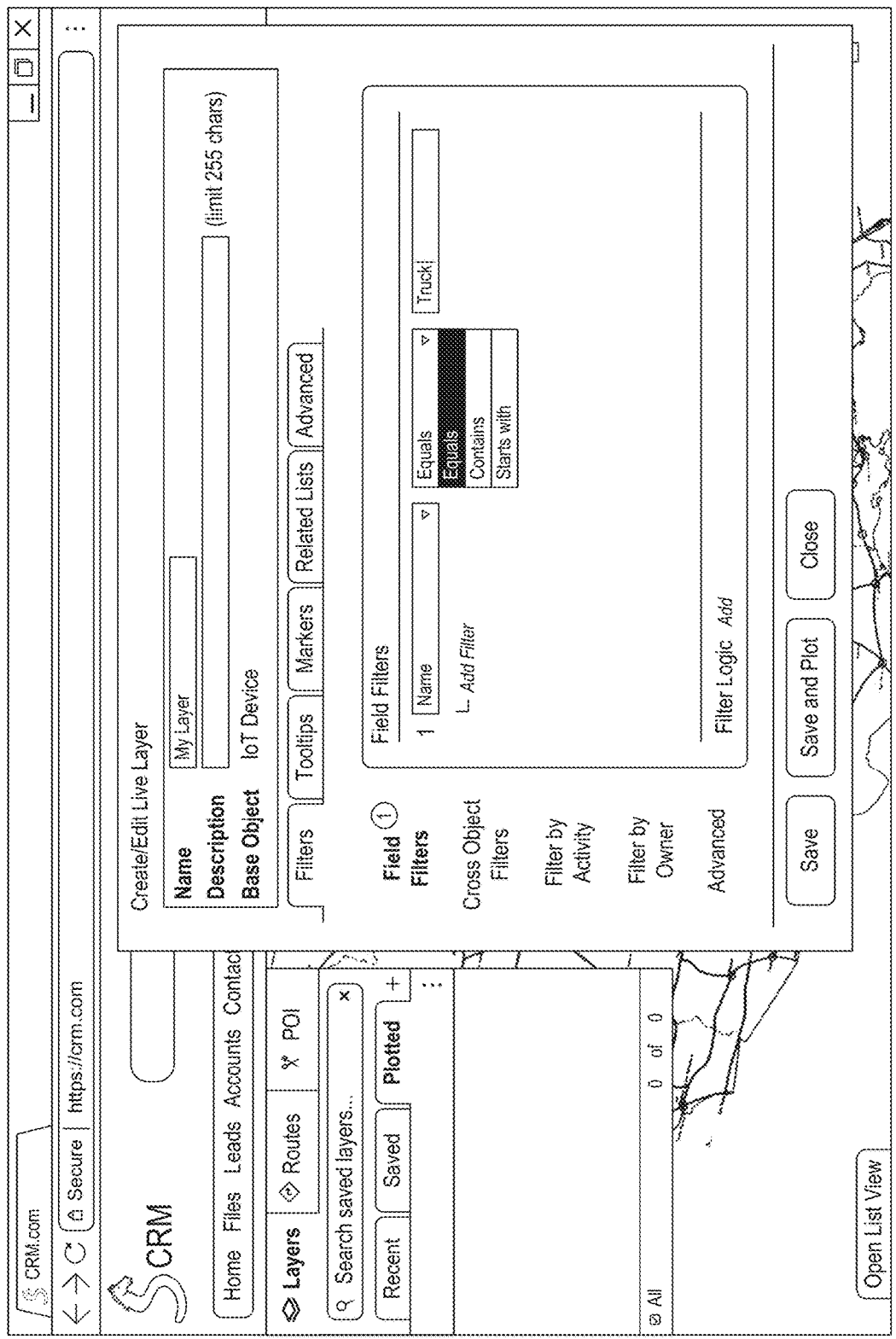

The field filters GUI preferably allows a user to customize field filters in a variety of ways. For example, rather than filtering for objects that have a "name" value that equals "Truck 1", a user could filter for objects that have a "name" value that "contains" "Truck" or "starts with" "Truck", as illustrated in FIG. 7.

Figure 8:
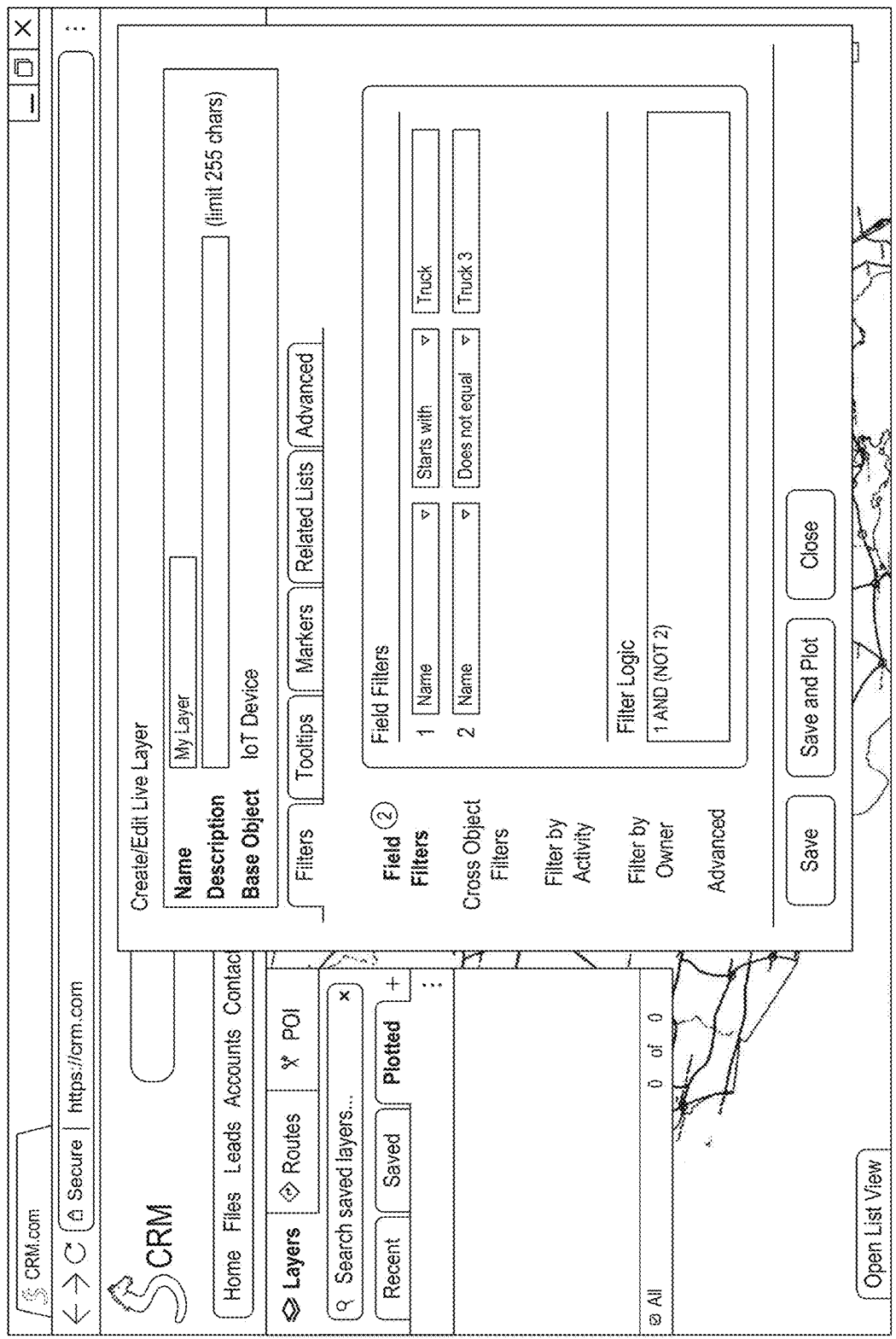

In accordance with one or more preferred implementations, a user can further customize filter logic for use with field filters. For example, after specifying a first filter rule labeled "1" and a second filter rule labeled "2", a user can indicate that filtering is desired for all objects that meet filter 1 but do not meet filter 2 by inputting the text string "1 AND (NOT 2)", as illustrated in FIG. 8.

Figure 9:
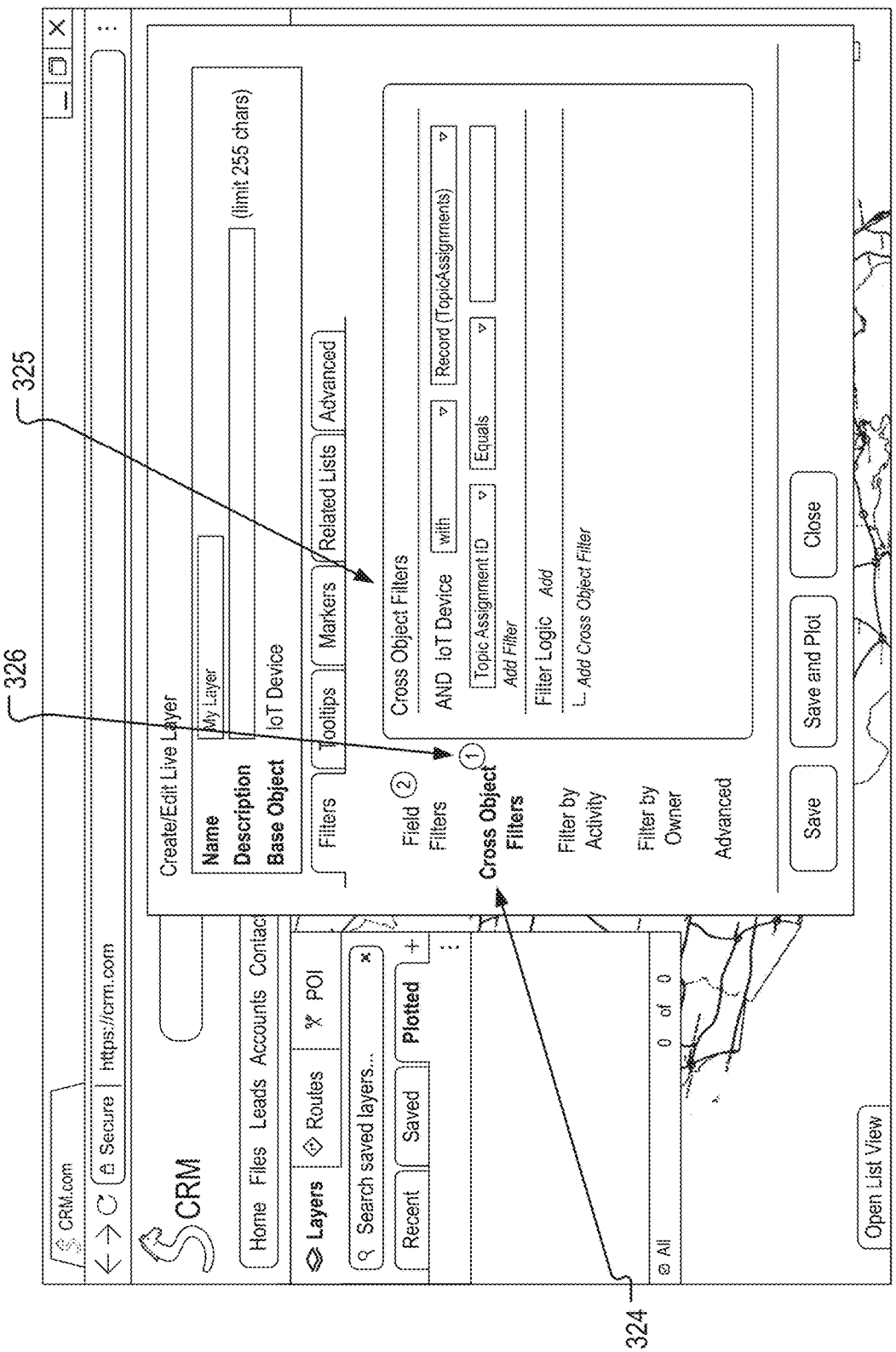
FIG. 9 illustrates an exemplary cross object filters GUI configured to allow a user to specify configuration settings for a layer to be plotted on a map-based GUI.

The filters tab preferably includes a cross object filters interface element 324 which accesses a cross object filters GUI 325 which allows a user to add or edit cross object filters for the layer, as illustrated in FIG. 9. A cross object filter allows a user to filter on fields in objects associated with objects of the base object type. For example, if data objects of the "IoT device" data object type can be associated with record data objects, including data objects of a "Record(TopicAssignments)" data object type, then a cross object filter could be created to filter on fields defined for the "Record(TopicAssignments)" data object type. FIG. 9 illustrates creation of a cross object filter to filter on a "Topic Assignment ID" field for data objects of the "Record(TopicAssignments)" data object type that are associated with data objects of the base object type. This would filter out any "IoT device" data object instances that are not associated with a "Record(TopicAssignments)" data object instance that has a "Topic Assignment ID" value meeting the filter criteria.

In accordance with one or more preferred implementations, once a cross object filter is created, a cross object filters indicator 326 is displayed adjacent the field filters interface element 324 which indicates a number of cross object filters which have been defined, as illustrated in FIG. 9.

Figure 10A:
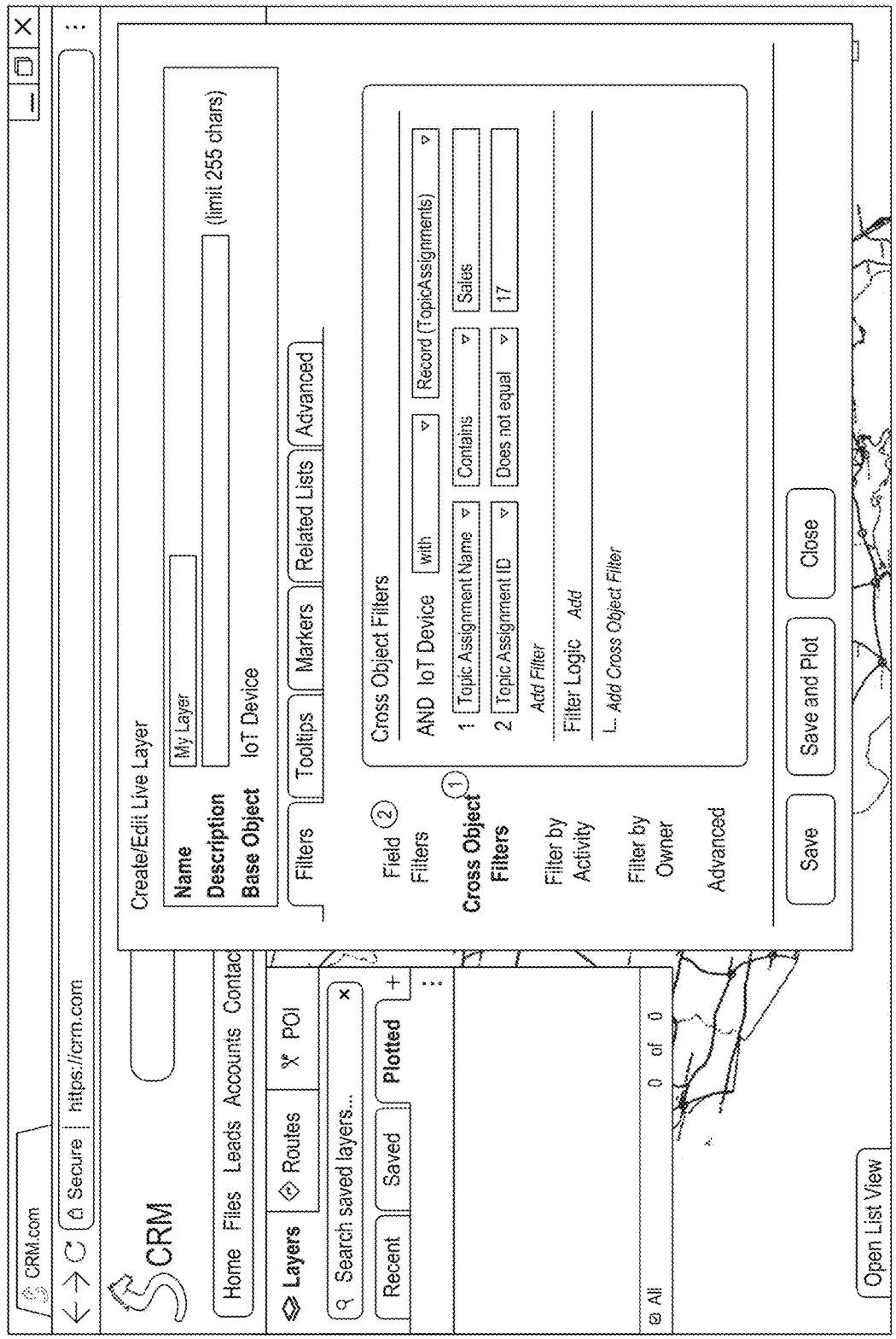
FIGS. 10A-B illustrate exemplary functionality for a cross object filters GUI configured to allow a user to specify configuration settings for a layer to be plotted on a map-based GUI.
Figure 10B:
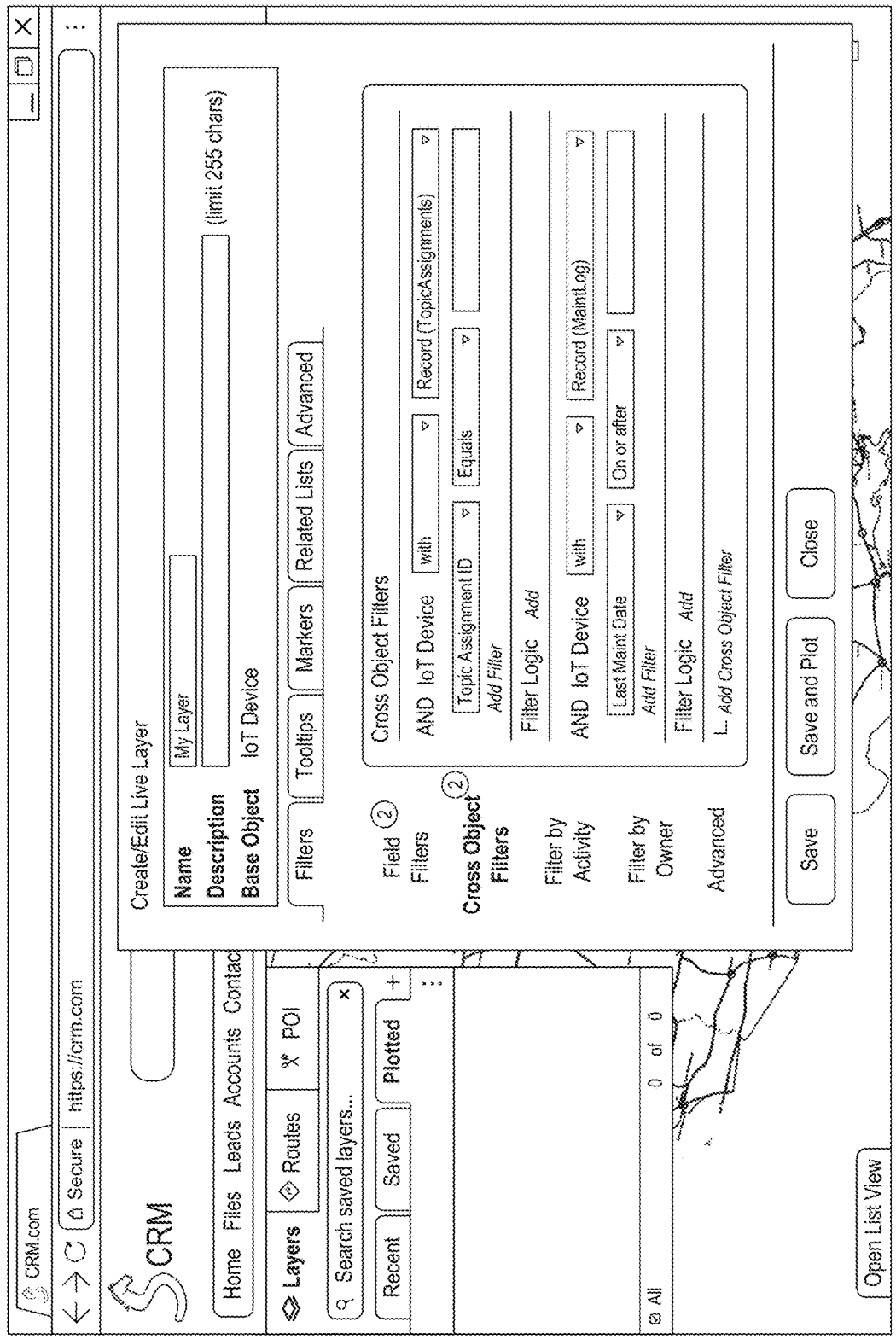

In accordance with one or more preferred implementations, a user can utilize a cross object filters GUI 325 to add additional filters with respect to the same object type within a cross object filter, as illustrated in FIG. 10A, or even add additional cross object filters which filter based on a different object type, as illustrated in FIG. 10B.

In accordance with one or more preferred implementations, a user can further customize filter logic for use with cross object filters, either in a similar manner as described above with respect to field filters, or in another manner.

Figure 11:
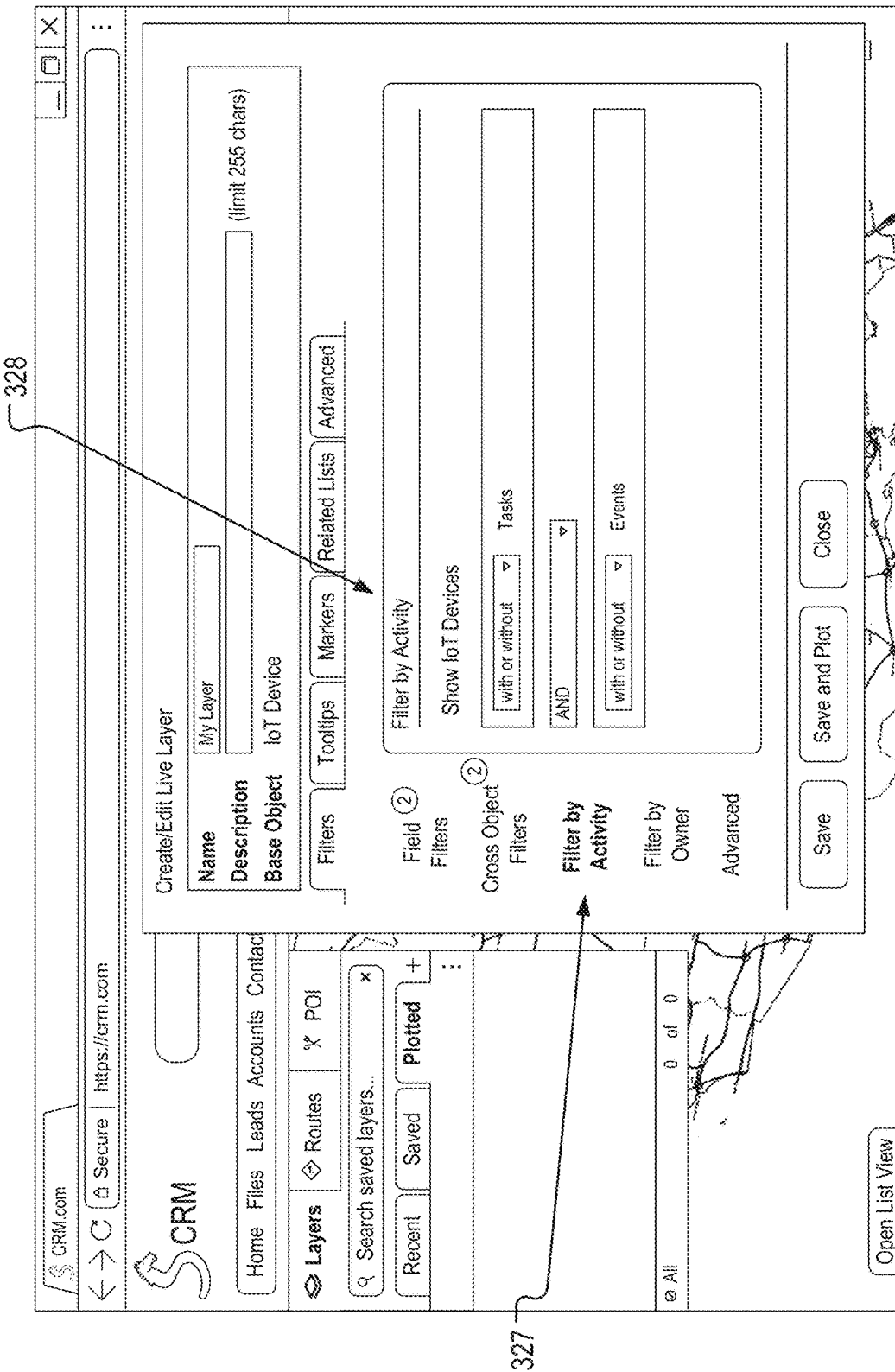
FIG. 11 illustrates an exemplary activity filters GUI configured to allow a user to specify configuration settings for a layer to be plotted on a map-based GUI.
Figure 12:
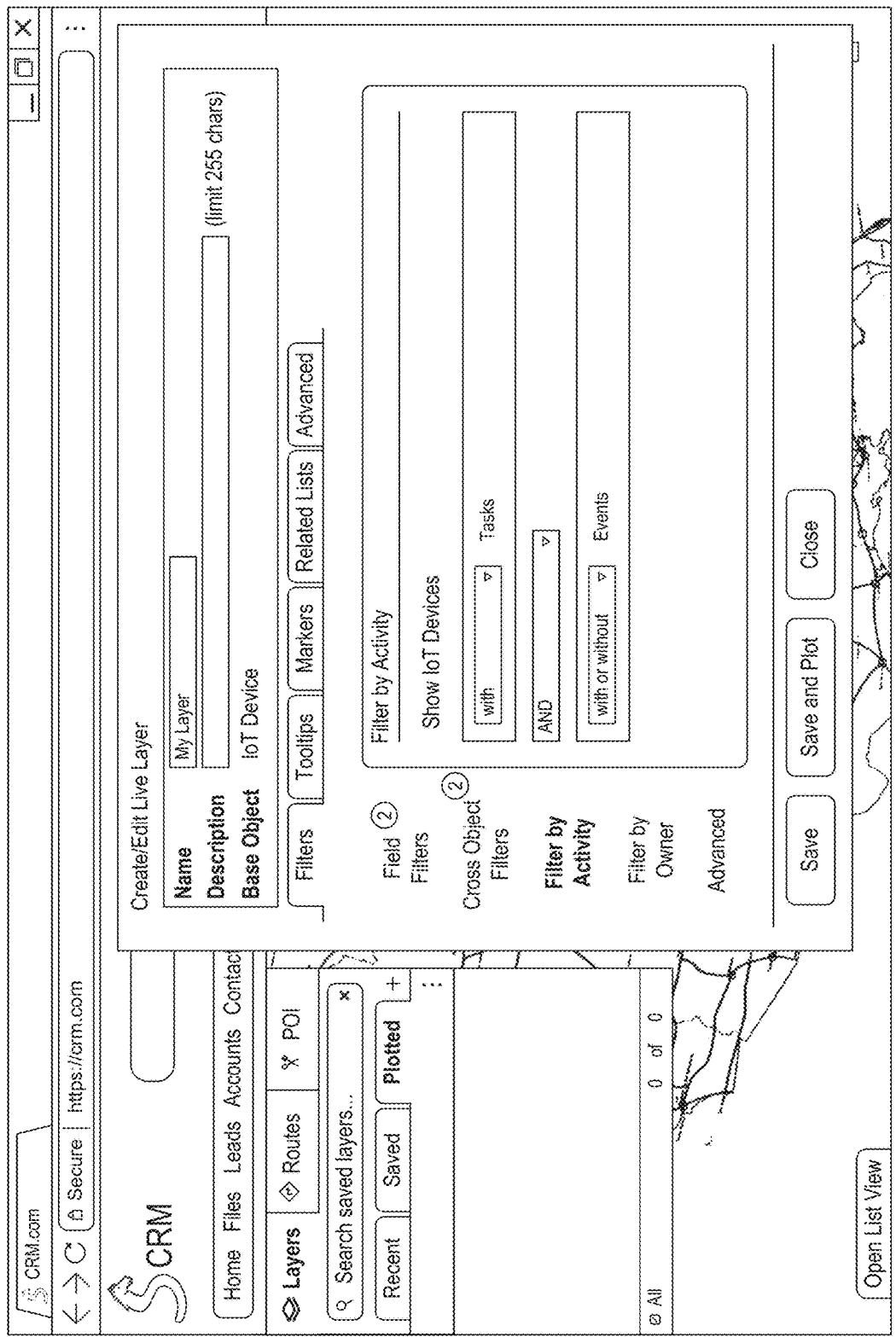
FIGS. 12-16 illustrate exemplary functionality for an activity filters GUI configured to allow a user to specify configuration settings for a layer to be plotted on a map-based GUI.
Figure 13:
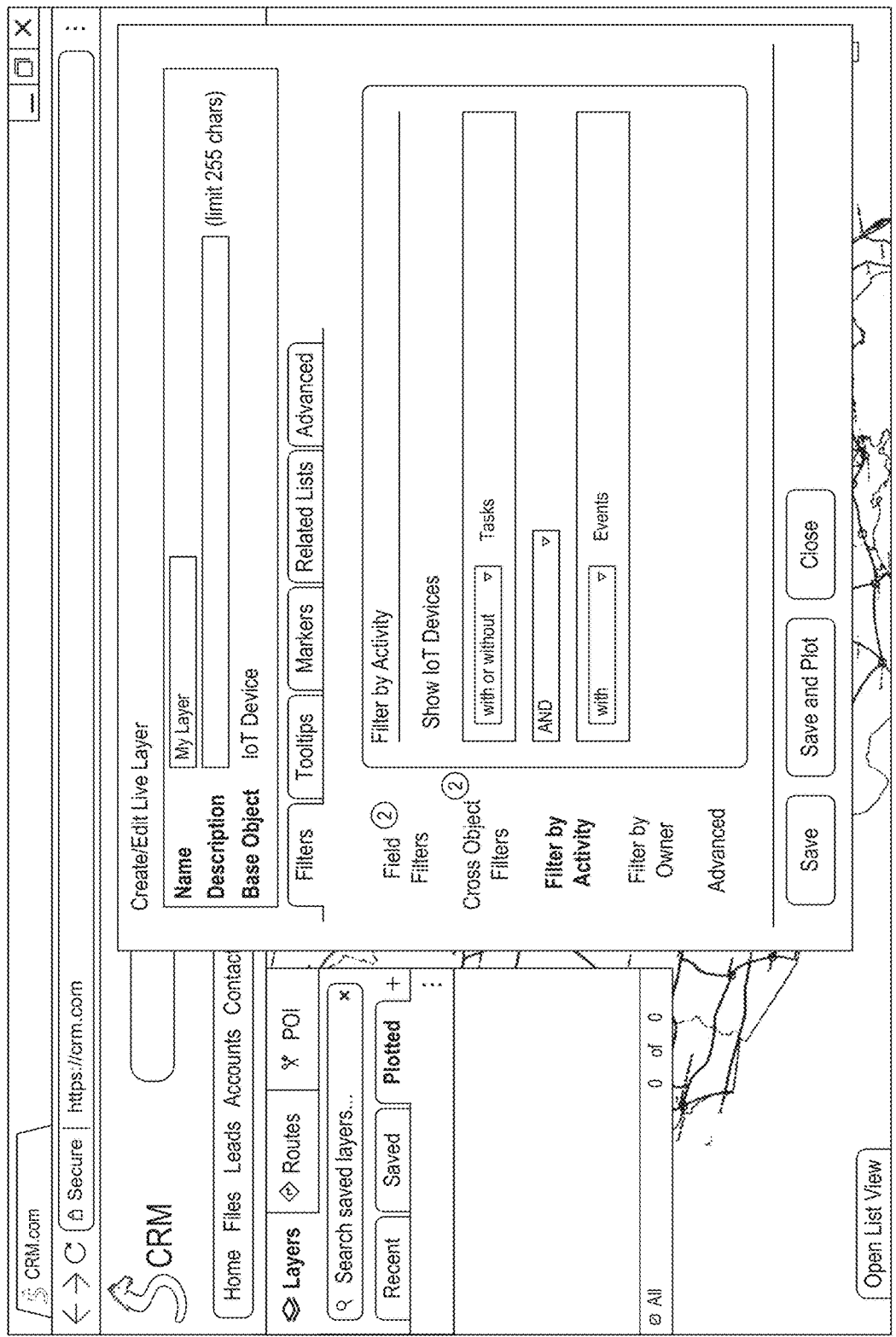
Figure 14:
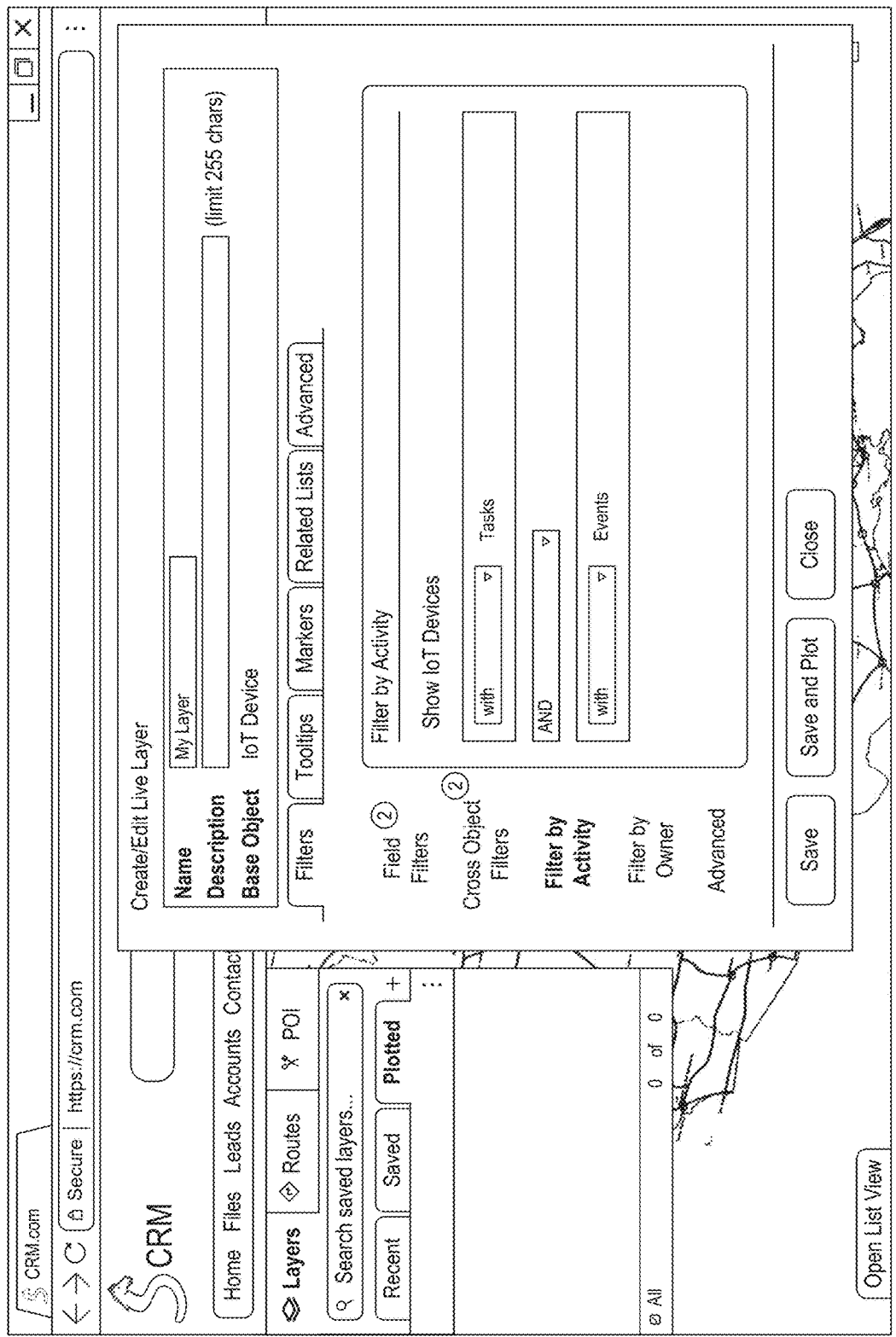
Figure 15:
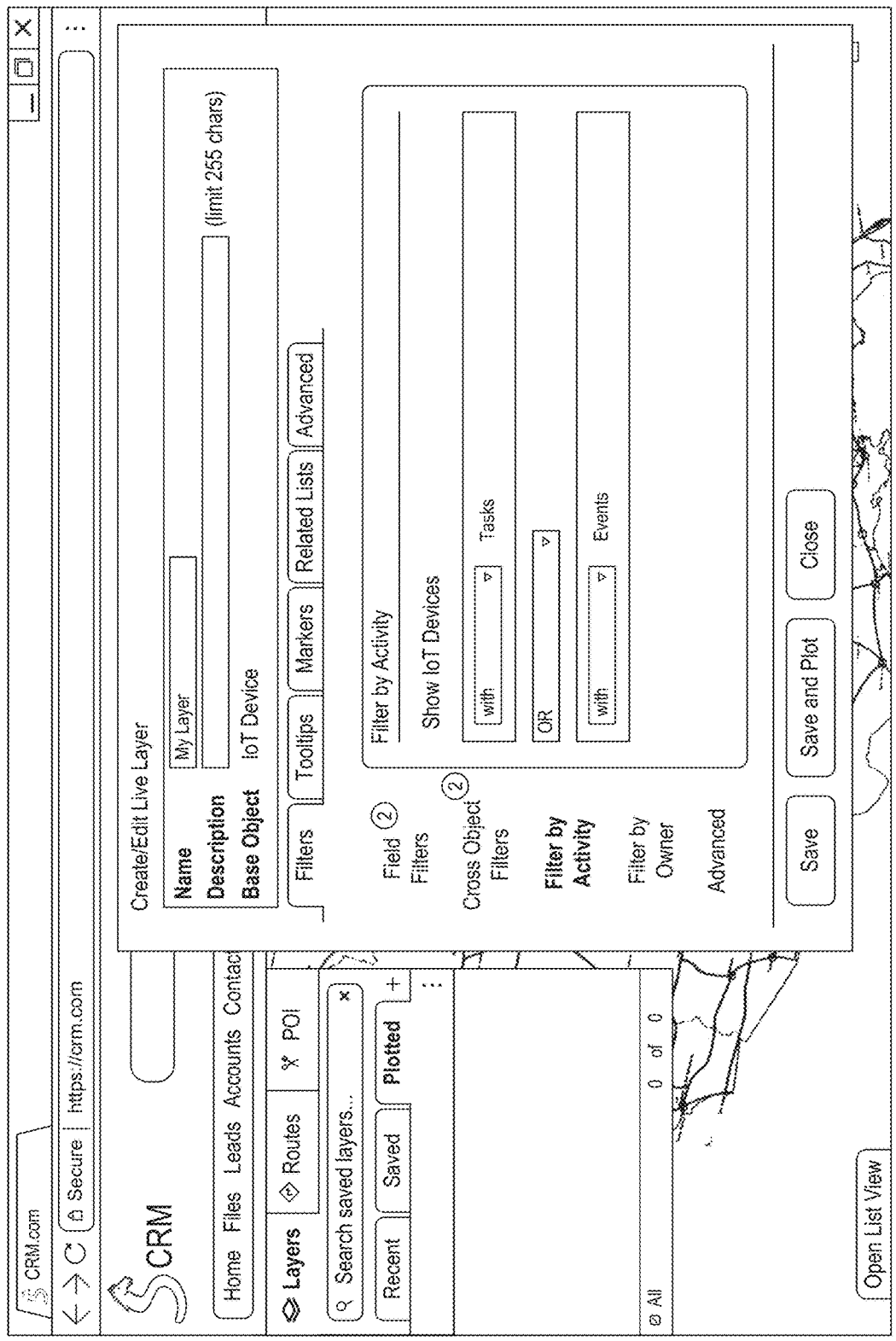
Figure 16:
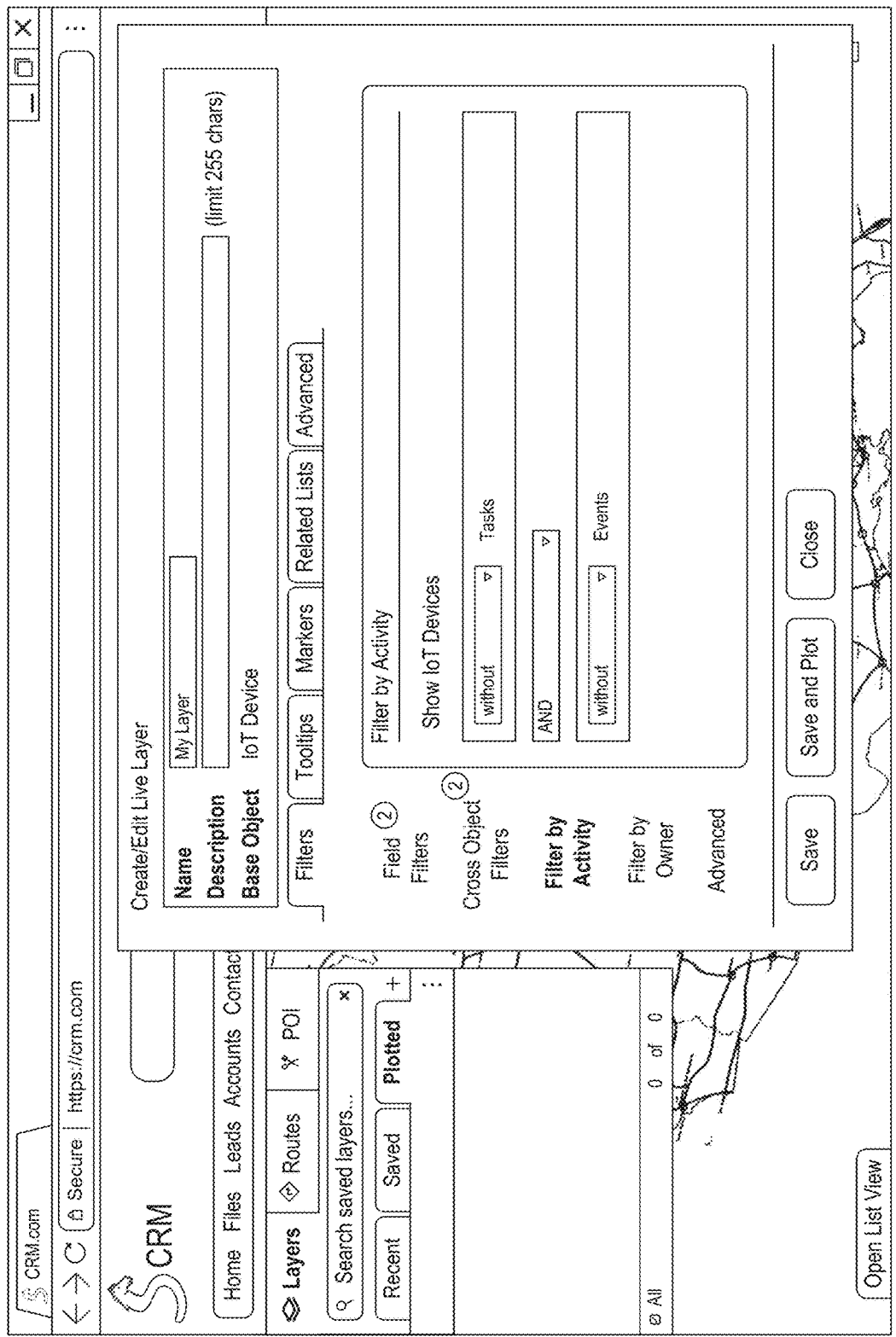

The filters tab preferably includes an activity filters interface element 327 which accesses an activity filters GUI 328 which allows a user to add or edit filters which filter by activity, as illustrated in FIG. 11. Preferably, an activity filters GUI 328 allows a user to filter base object instances based on whether the base object instances have tasks (e.g. activities to perform in the future) or events (e.g. activities performed in the past) associated with them, as illustrated in FIG. 11. Preferably, a user can filter based on the presence of tasks as illustrated in FIG. 12, filter based on the presence of events as illustrated in FIG. 13, filter on the presence of tasks and events as illustrated in FIG. 14, or filter on the presence of tasks or events, as illustrated in FIG. 15. A user can similarly filter for base object instances which do not have any tasks or events, as illustrated in FIG. 16, or some similar combination or variation to those illustrated in FIGS. 12-15.

Figure 17:
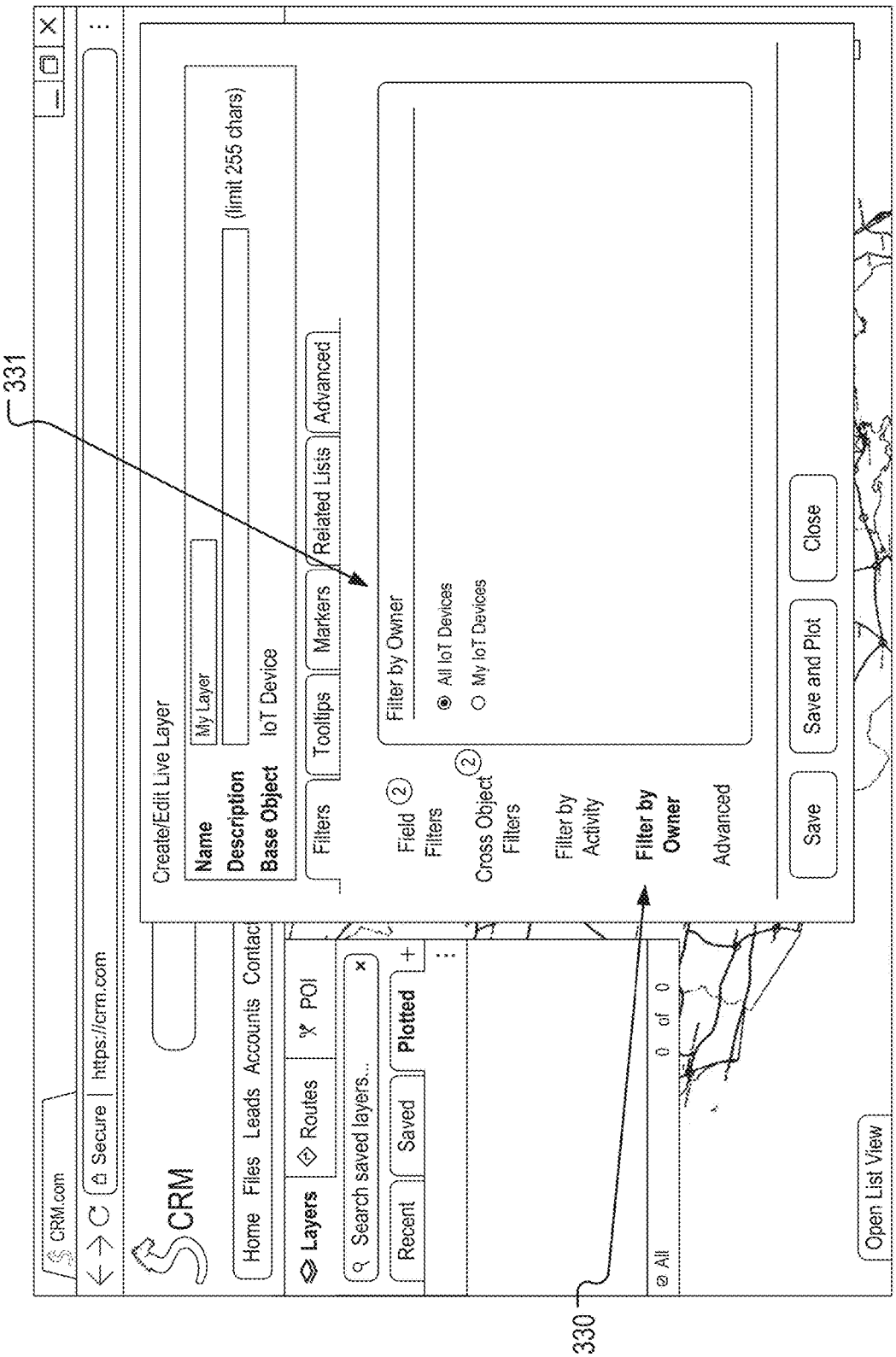
FIG. 17 illustrates an exemplary owner filter GUI configured to allow a user to specify configuration settings for a layer to be plotted on a map-based GUI.

The filters tab preferably includes an owner filter interface element 330 which accesses an owner filter GUI 331 which allows a user to specify whether to map only for base object instances assigned to the logged in user, or for all base object instances, as illustrated in FIG. 17.

Figure 18:
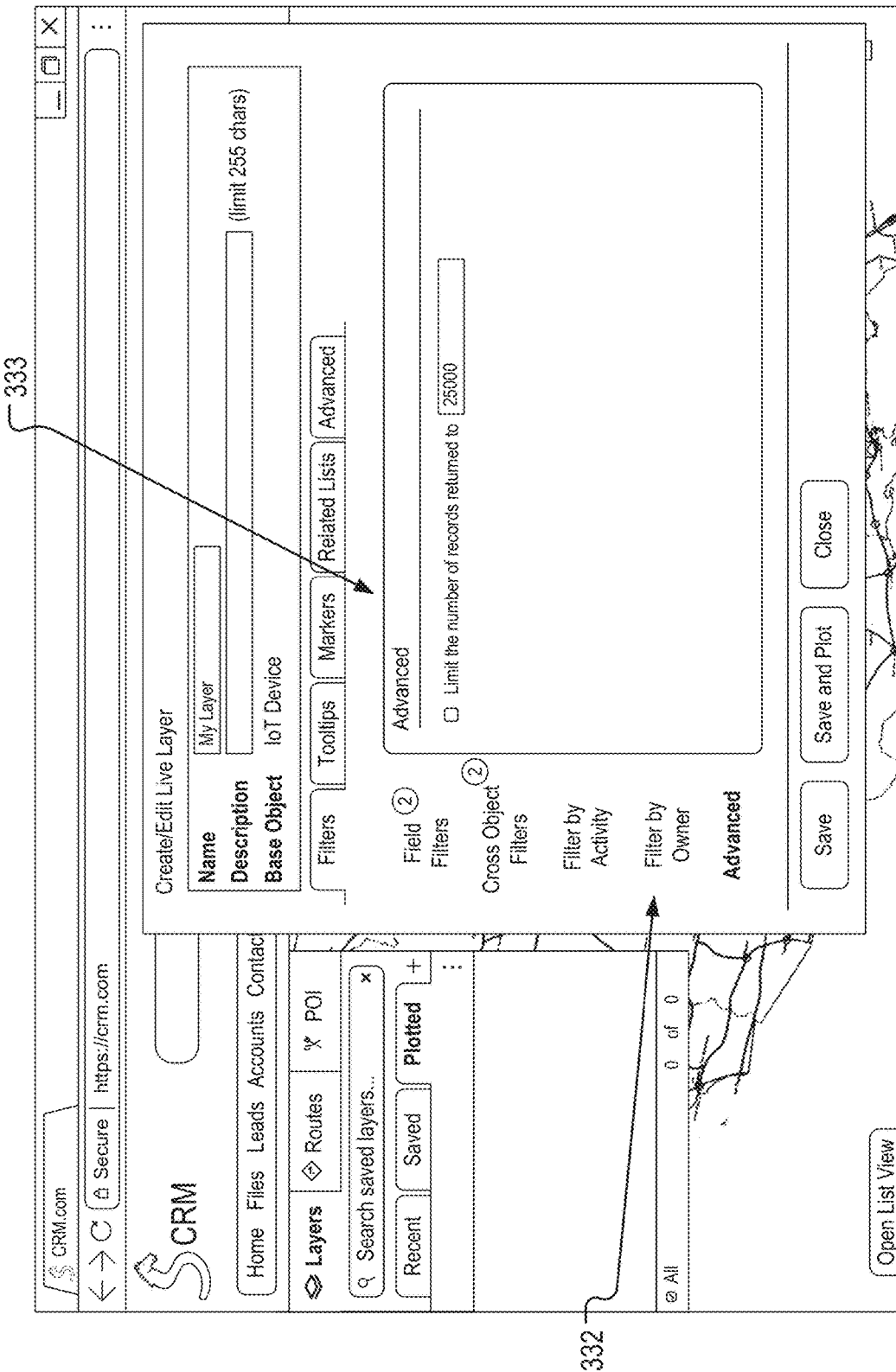
FIG. 18 illustrates an advanced filter GUI configured to allow a user to specify configuration settings for a layer to be plotted on a map-based GUI.

The filters tab preferably further includes an advanced filter interface element 332 which accesses an advanced filter GUI 333 which allows a user to additionally customize mapping for the layer. For example, preferably a user can utilize the advanced filter GUI 333 to indicate a maximum number of records (e.g. base object instances) which will be displayed as part of the layer on a map-based GUI when the layer is plotted, as illustrated in FIG. 18.

Figure 19A:
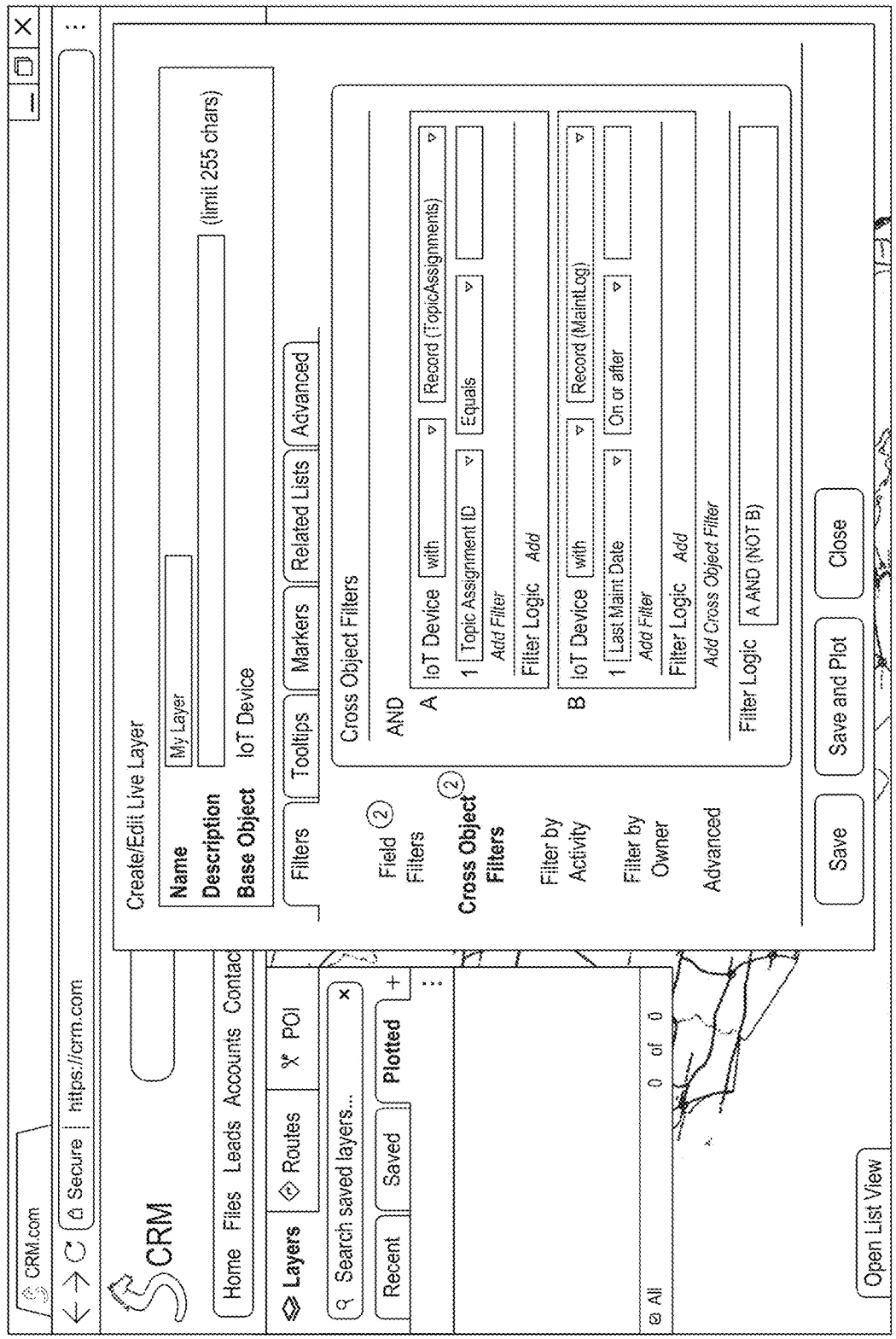
FIGS. 19A-B illustrate different methodologies which may be utilized for specification of different types of filters.
Figure 19B:
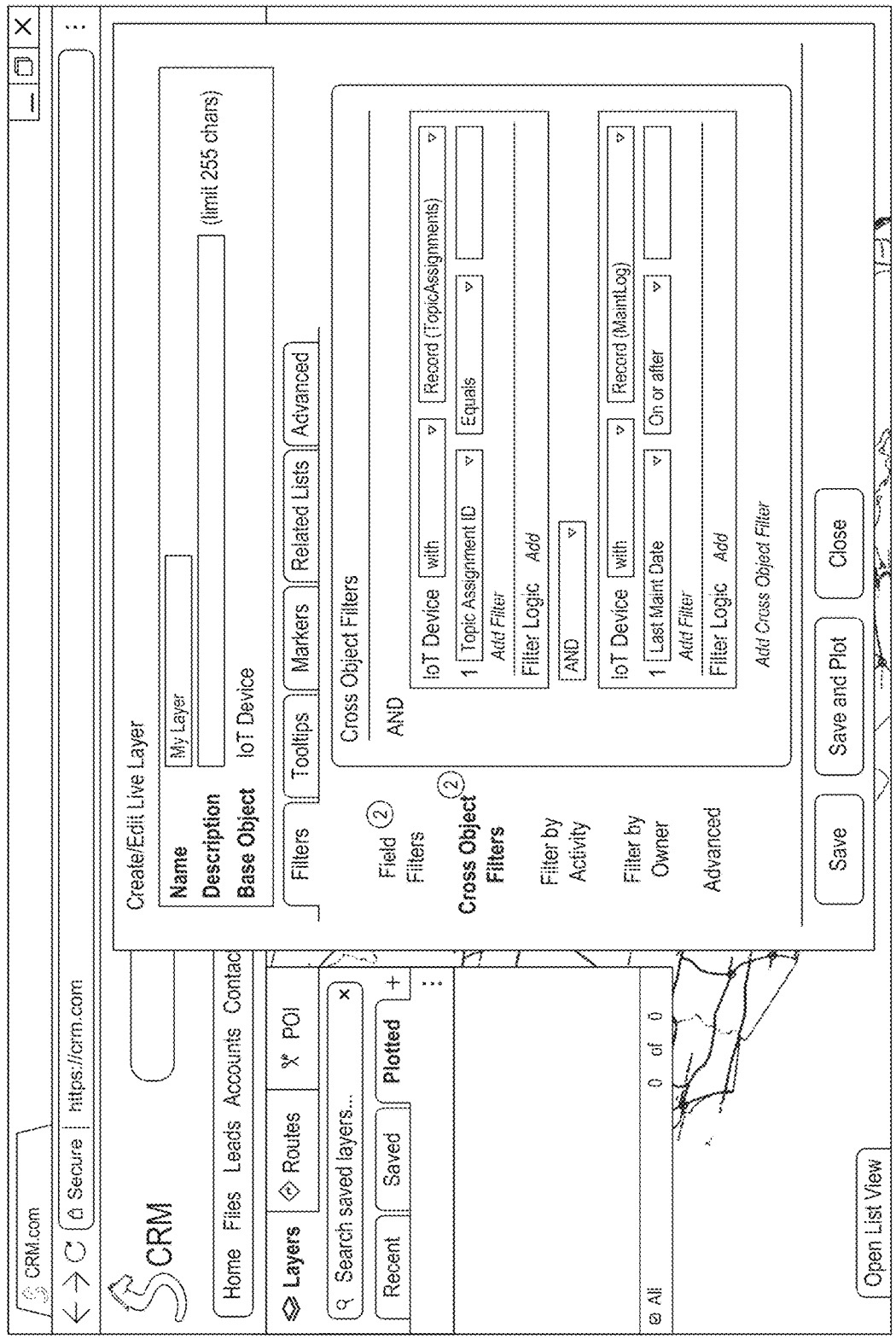

Various methodologies and interfaces have been described herein and illustrated in the accompanying drawings for specifying filters and filter logic. It will be appreciated that different methodologies may be utilized for specification of different types of filters, as illustrated, for example, in FIGS. 19A-B.

Figure 20:
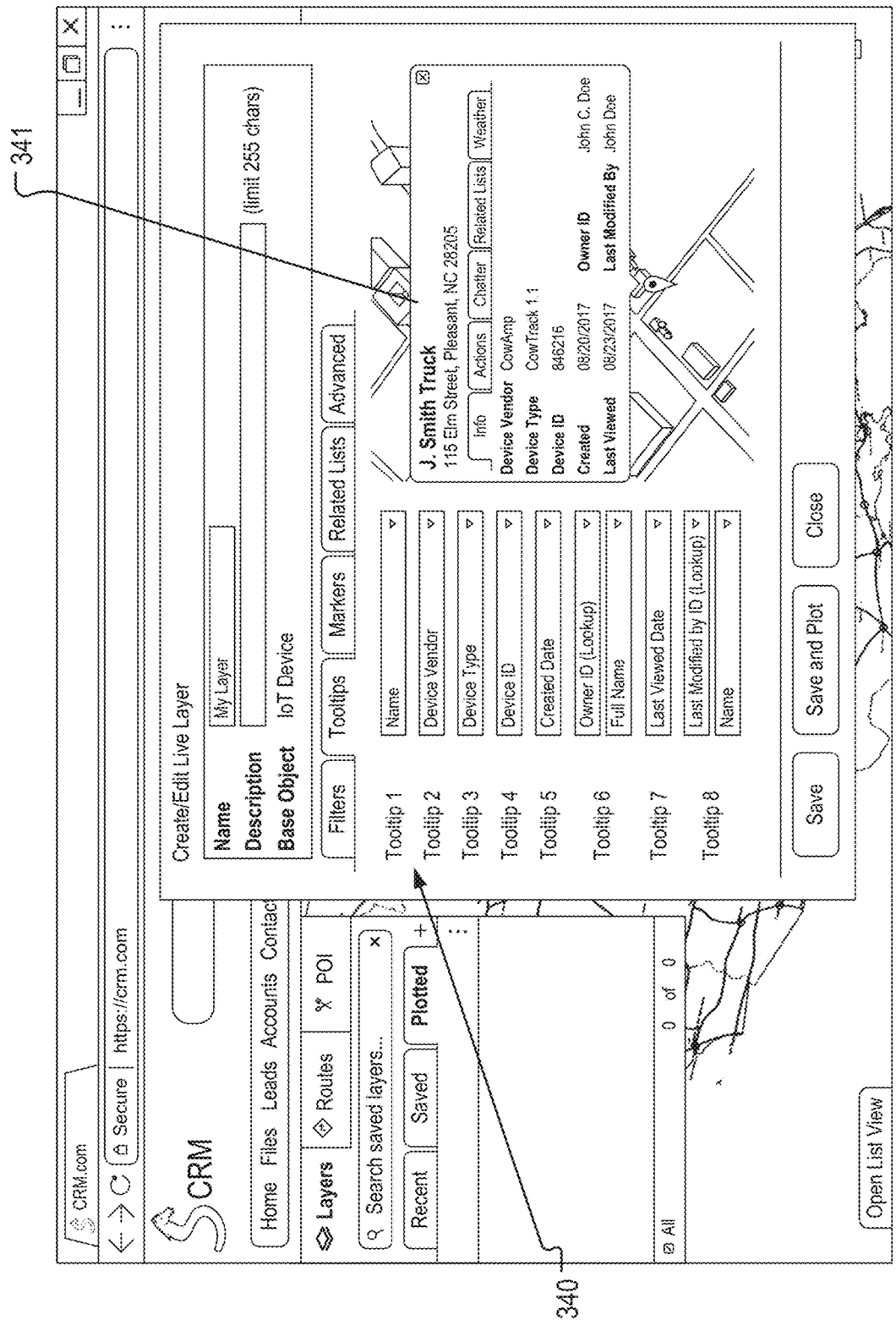
FIG. 20 illustrates an exemplary tooltips GUI configured to allow a user to specify configuration settings for a layer to be plotted on a map-based GUI.

A second tab of the middle section of the layer configuration GUI is a tooltips tab which displays a tooltips GUI 340 that allows a user to customize tooltips for markers displayed as part of the layer on a map-based GUI (e.g., customize tooltips for mapped base object instances). For example, a user can choose to display various fields of mapped base object instances in a tooltip, as illustrated in FIG. 20. Preferably, a user can select up to eight fields from the base object type to display, although it will be appreciated that more or less fields may be allowed to be selected for display in alternative embodiments. In accordance with one or more preferred implementations, a user may even be able to select a format for display of a particular field, as illustrated in FIG. 20 with respect to display of an Owner ID field and a Last Modified by ID field. In accordance with one or more preferred implementations, these fields may be lookup fields which look up, based on a reference to one or more other objects, a value for the field.

In accordance with one or more preferred implementations, such tooltips are displayed when a user hovers over, engages, clicks on, taps, or otherwise interacts with a marker on map-based GUI, while in accordance with one or more preferred implementations, such tooltips may always be displayed, or be configurable to be toggled on or off by a user. In accordance with one or more preferred implementations, a tooltips GUI 340 displays an exemplary tooltip, as illustrated in FIG. 20, in which an exemplary tooltip 341 is displayed.

A third tab of the middle section of the layer configuration GUI is a markers tab which displays a markers GUI 350 that allows a user to customize the display of markers displayed as part of the layer on a map-based GUI (e.g. markers representing mapped base object instances).

Figure 21:
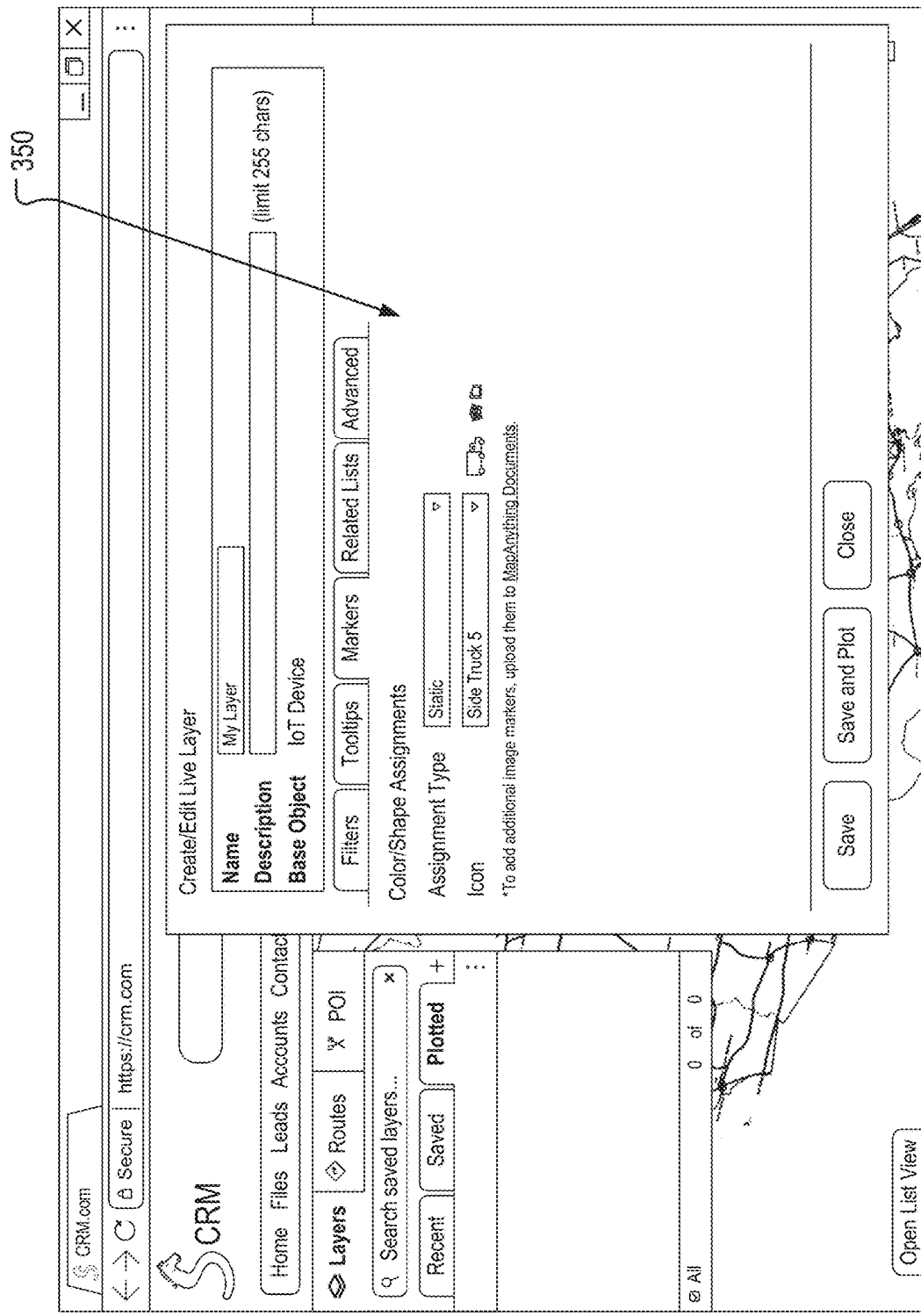
FIG. 21 illustrates an exemplary markers GUI configured to allow a user to specify configuration settings for a layer to be plotted on a map-based GUI.
Figure 22:
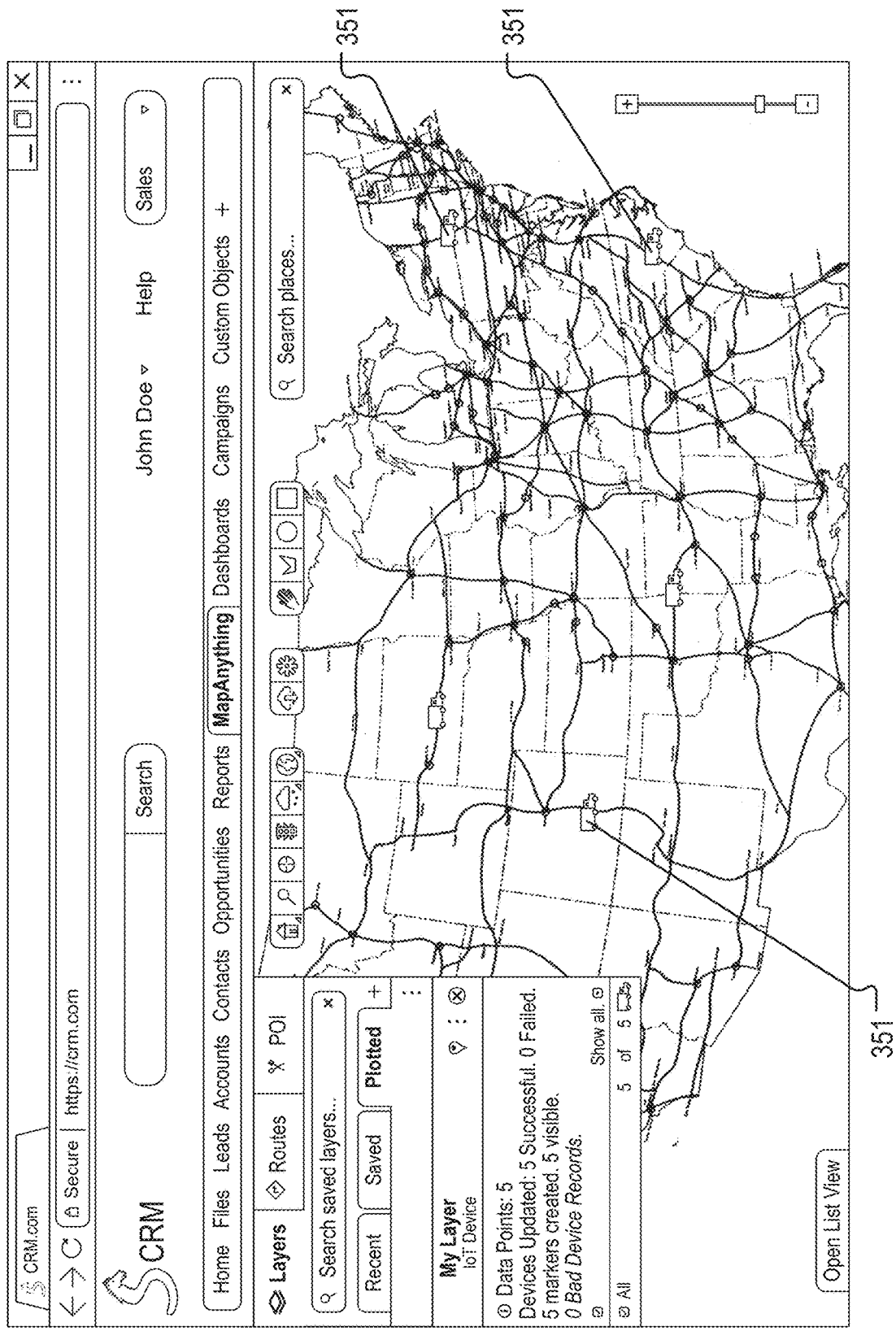
FIGS. 22-28 illustrate exemplary functionality for a markers GUI configured to allow a user to specify configuration settings for a layer to be plotted on a map-based GUI.

In accordance with one or more preferred implementations, a user may customize markers to be assigned in a static manner, and select an icon to be used for a marker for mapped base object instances, as illustrated in FIG. 21. In accordance with one or more preferred implementations, a user may select from existing icons, or upload custom icons. In accordance with one or more preferred implementations, a user may upload a custom icon via the markers GUI, or may elsewhere upload custom icons to an appropriate location which is accessed by the geo-analytical program. FIG. 22 illustrates an exemplary map-based GUI that utilizes statically assigned icons as markers 351 based on the selection illustrated in FIG. 21.

Figure 23:
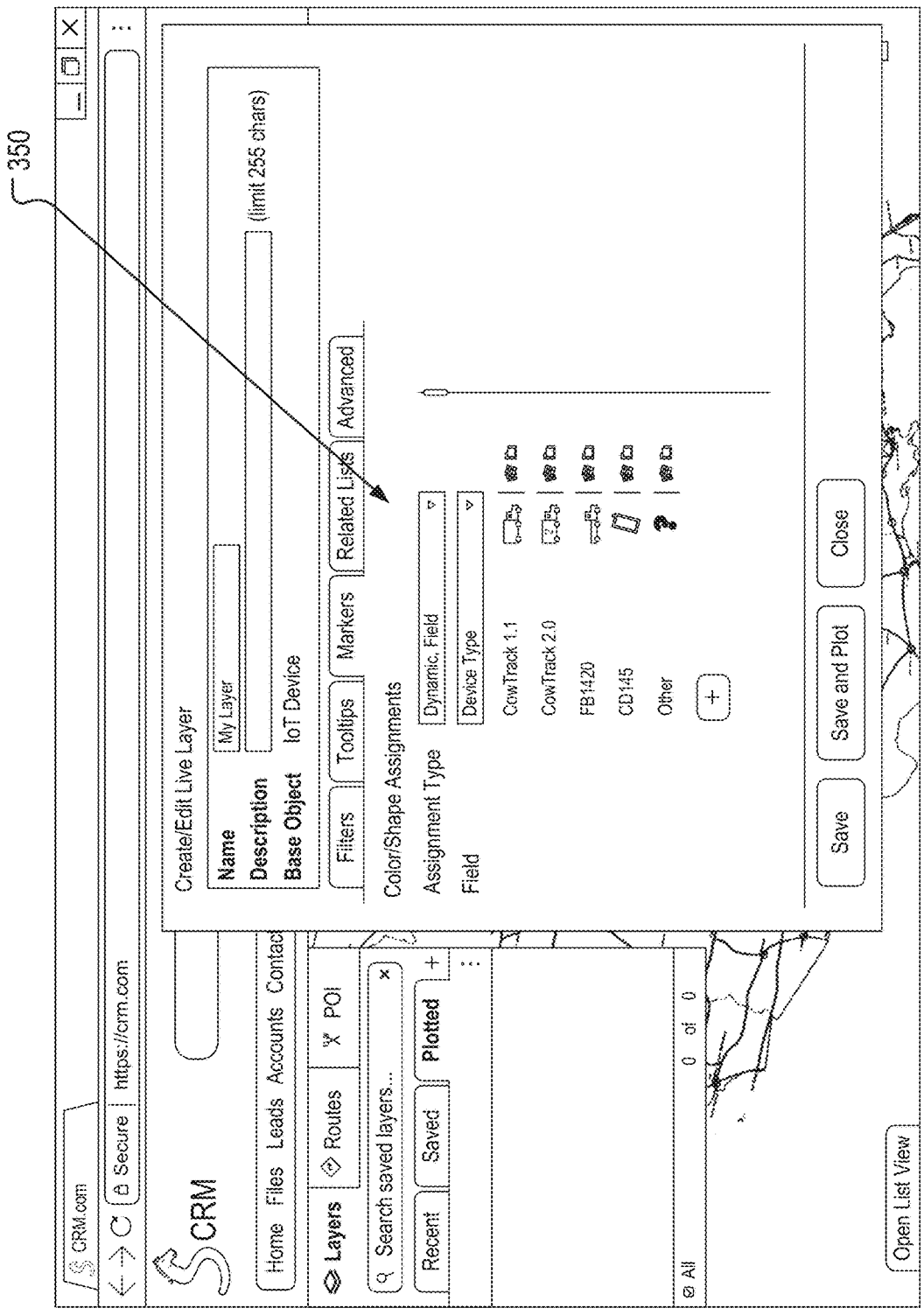
Figure 24:
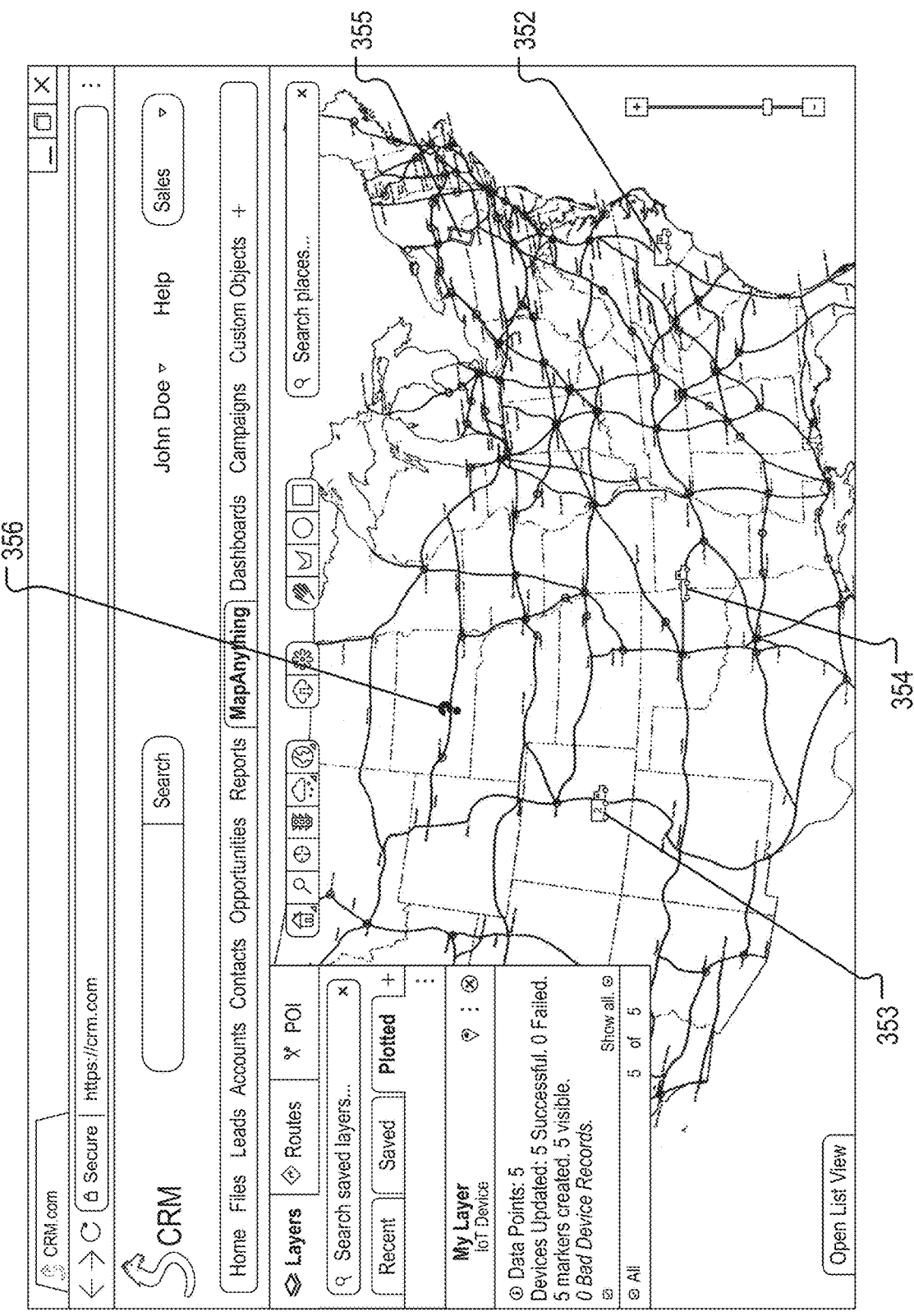

In accordance with one or more preferred implementations, a user may customize markers to be assigned dynamically based on a field value. To do so, a user first selects a field of the base object type to base assignment on, as illustrated in FIG. 23. Next, the user specifies one or more field values to assign an icon for, and selects a corresponding icon for each selected field value. As discussed above with respect to static assignment of markers, in accordance with one or more preferred implementations, a user may upload a custom icon via the markers GUI, or may elsewhere upload custom icons to an appropriate location which is accessed by the geo-analytical program. FIG. 24 illustrates an exemplary map-based GUI that utilizes dynamically assigned icons as markers 352, 353, 354, 355, 356 based on the selections illustrated in FIG. 23.

Figure 25:
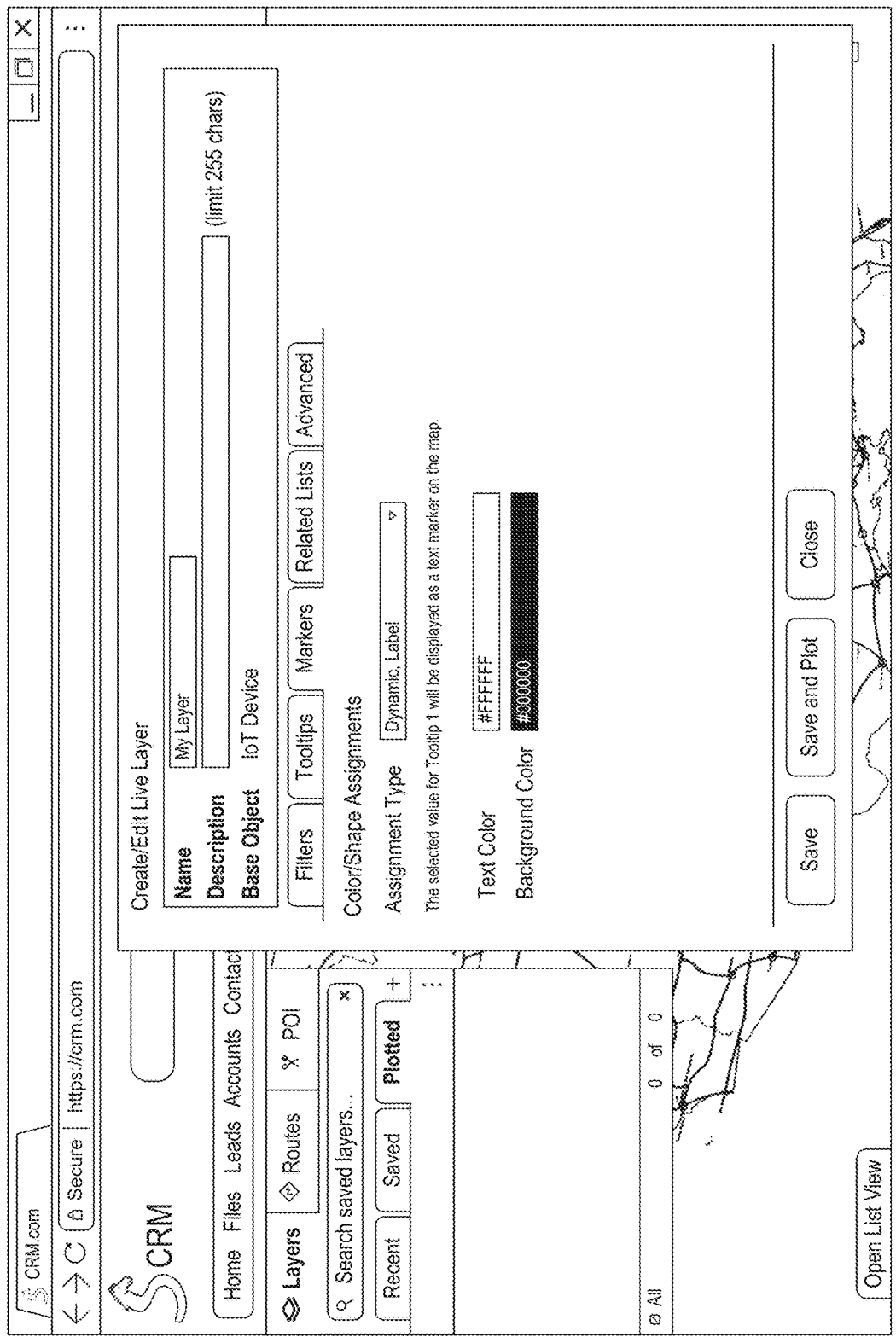
Figure 26:
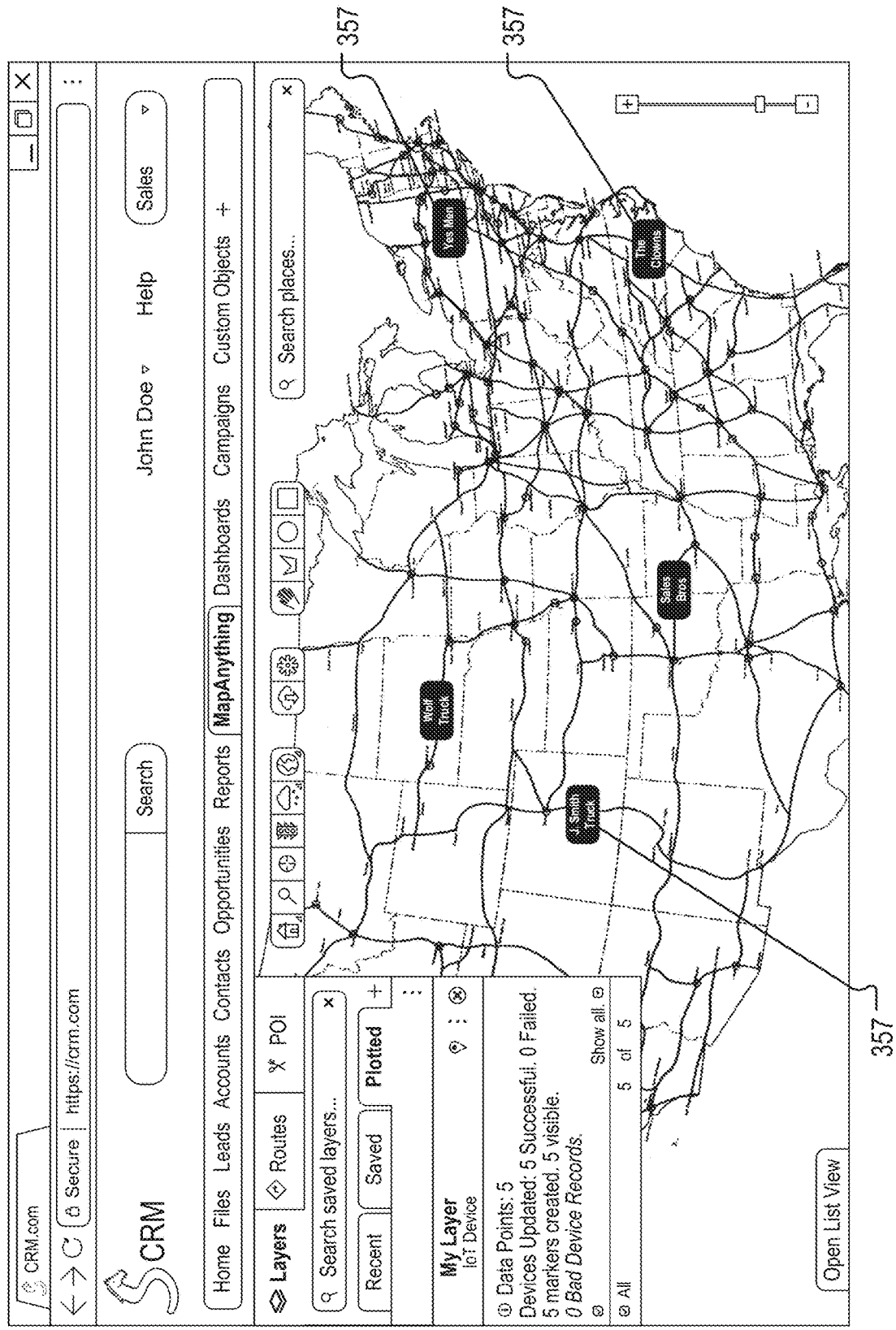

In accordance with one or more preferred implementations, a user may customize markers to be assigned dynamically as text labels. In accordance with one or more preferred implementations, a text marker utilizes the value for the field set as "Tooltip 1" under the tooltips tab, although in accordance with one or more other preferred implementations, a user may alternatively be able to select via the markers GUI a field to utilize as a dynamically assigned text label. In accordance with one or more preferred implementations, a user is able to set a text color and background color for a label, as illustrated in FIG. 25. FIG. 26 illustrates an exemplary map-based GUI that utilizes dynamic text labels as markers 357 based on the selections illustrated in FIG. 25.

Figure 27:
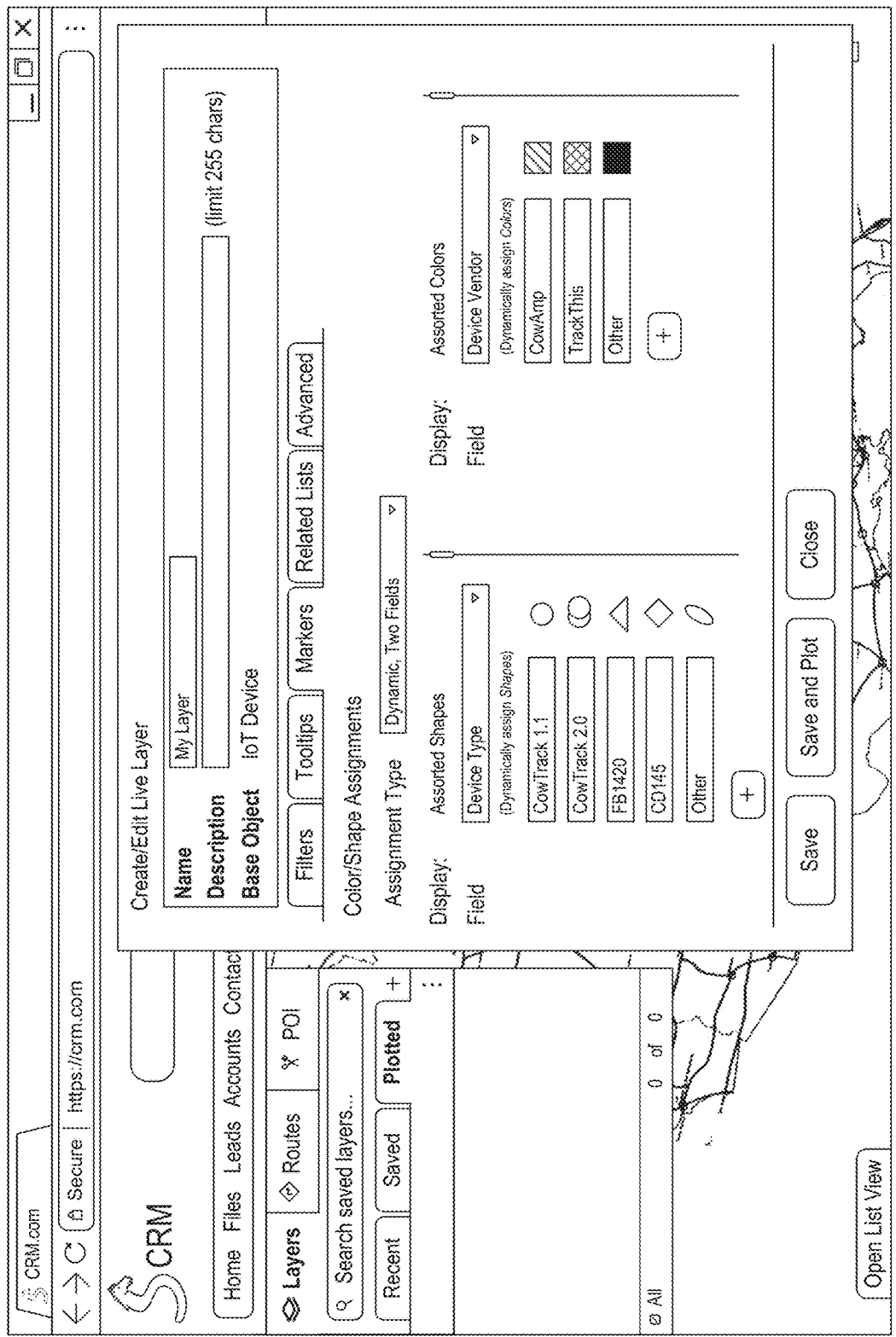
Figure 28:
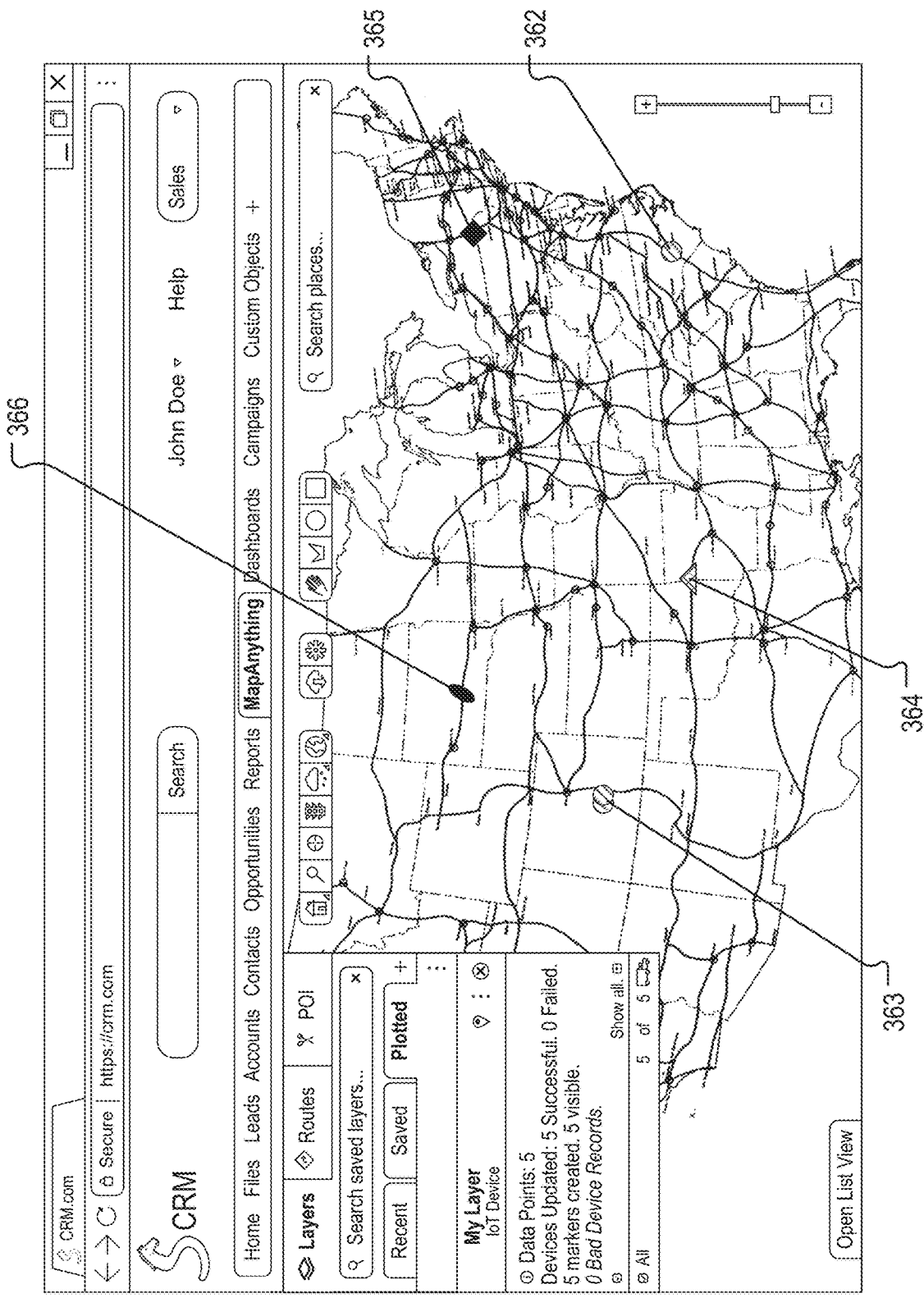

In accordance with one or more preferred implementations, a user may customize markers to be assigned dynamically based on two field values. In accordance with a preferred implementation, a user first selects a first field of the base object type to assign a shape based on, and next selects a second field of the base object type to assign a color based on, as illustrated in FIG. 27. Thus, for example, a user might assign markers a shape based on a "device type" field for an "IoT device" object instance, and assign markers a color based on a "device vendor" field for an "IoT device" object instance. In accordance with one or more preferred implementations, other various display schemes may be utilized for the simultaneous display of indications regarding multiple fields. FIG. 28 illustrates an exemplary map-based GUI that utilizes dynamic markers 352, 353, 354, 355, 356 based on the selections illustrated in FIG. 27.

Figure 29:
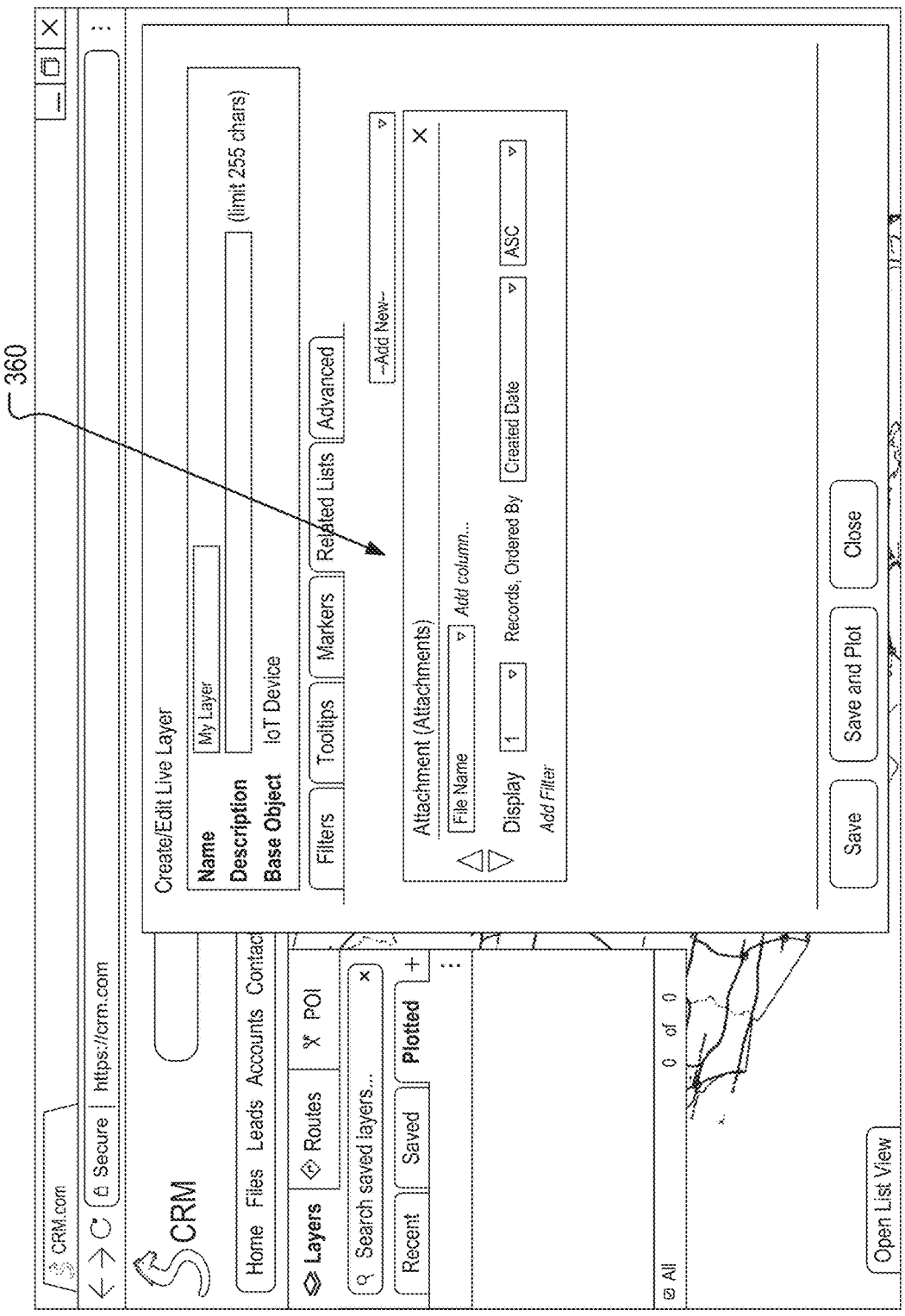
FIG. 29 illustrates an exemplary related lists GUI configured to allow a user to specify configuration settings for a layer to be plotted on a map-based GUI.

A fourth tab of the middle section of the layer configuration GUI is a related lists tab which displays a related lists GUI 360 that allows a user to customize related lists that enable the display of additional field data on data objects associated with the base object type. Preferably, a related lists GUI 360 allows a user to add new related lists, and configure existing related lists. Preferably, a user is able to select a data object type associated with the base object type to create a related list for, and select one or more fields to be displayed as columns in that related list, as illustrated in FIG. 29. Preferably, a user can even specify how a related list should be ordered, and add a filter for a related list. In accordance with one or more preferred implementations, defined related lists can be accessed via a tooltip for a marker.

Figure 30:
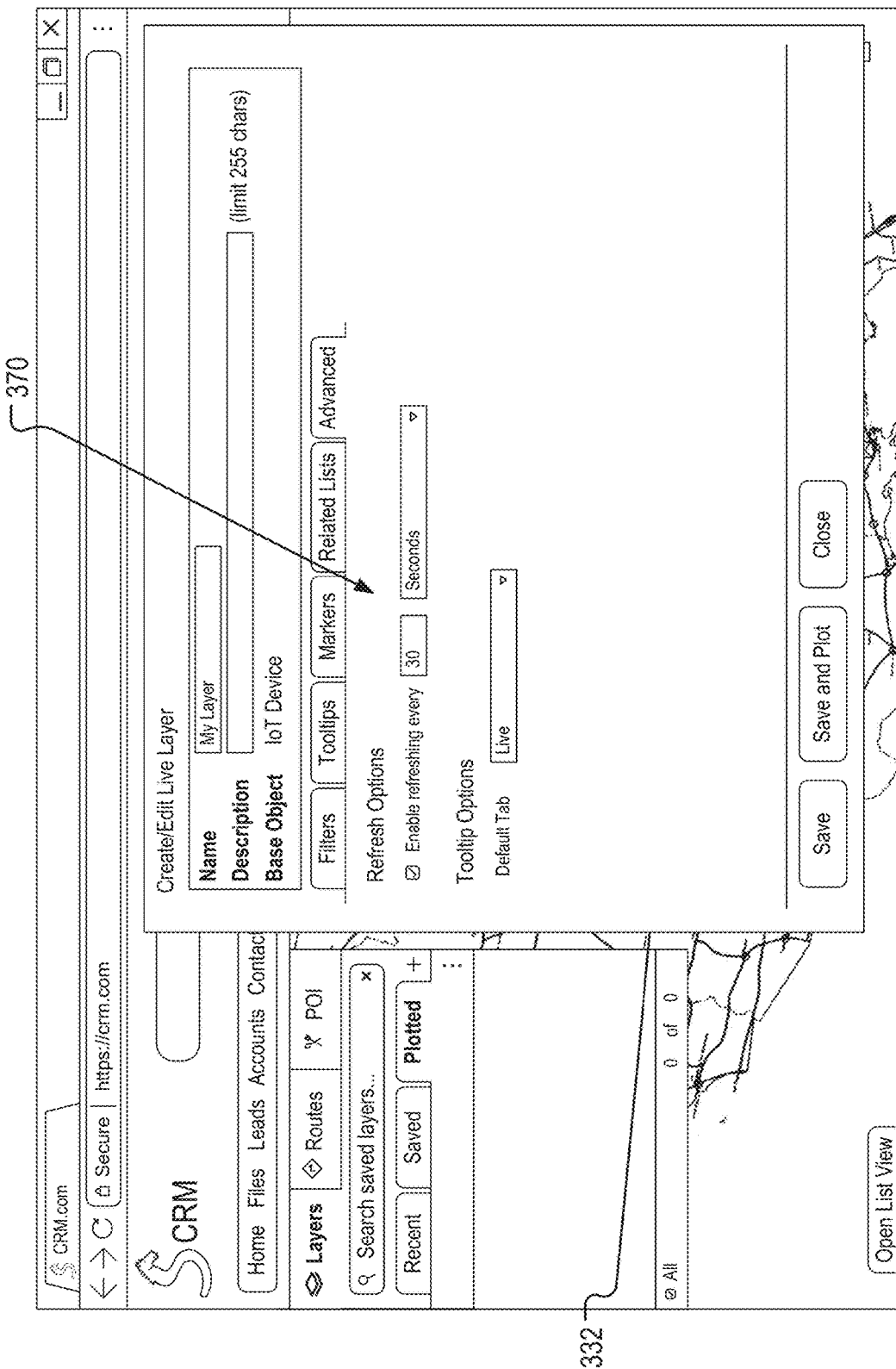
FIG. 30 illustrates an exemplary advanced settings GUI configured to allow a user to specify configuration settings for a layer to be plotted on a map-based GUI.

A fifth tab of the middle section of the layer configuration GUI is an advanced settings tab which displays an advanced settings GUI 370 that allows a user to customize advanced settings. In accordance with one or more preferred implementations, these advanced settings include a setting to specify how often the layer looks for location updates, as illustrated in FIG. 30. In accordance with one or more preferred implementation, these advanced settings include a setting to specify a default display tab.

A bottom section of the layer configuration GUI preferably includes a "Save" interface element, a "Save and Plot" interface element, and a "Close" interface element.

The "Save" interface element saves the layer configuration settings provided by the user. Preferably, these layer configuration settings are saved to a server or data store associated with a geo-analytical program or geospatial computer system, although in at least one or more preferred implementations the layer configuration settings may be saved to server or data store associated with a CRM computer system.

The "Save and Plot" interface element is similar to the "Save" interface element, but further returns to a map-based GUI and plots the defined layer based on the saved layer configuration settings.

The "Close" interface element closes the layer configuration GUI. Attempting to close the layer configuration GUI without saving preferably triggers a prompt querying a user whether he or she intended to close the layer configuration GUI without saving any defined layer configuration settings.

Figure 31:
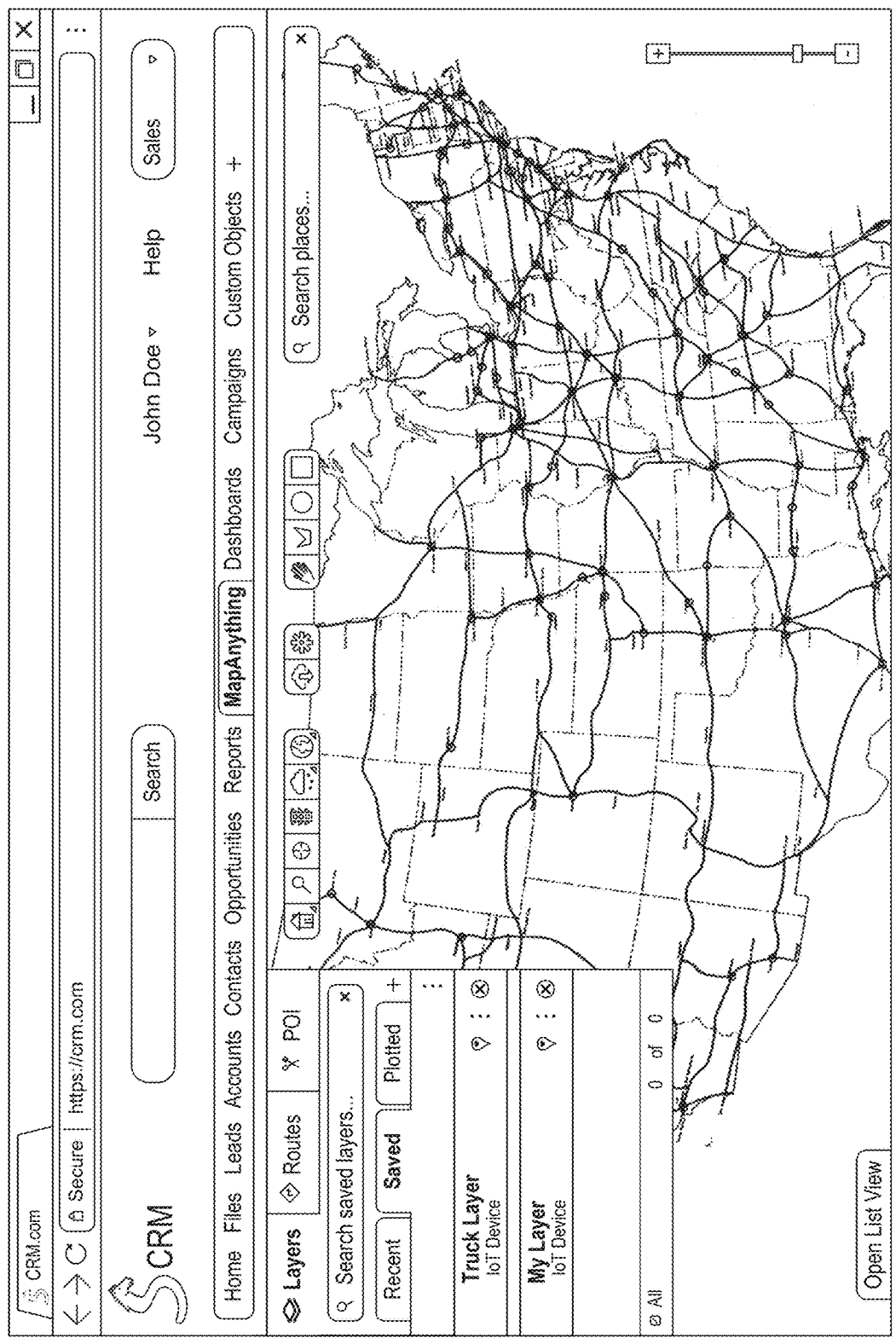
FIG. 31 illustrates display of saved layers for a map-based GUI.

In accordance with one or more preferred implementations, once configuration settings for a layer have been saved by a user, the user can subsequently load that layer via interface elements of a map-based GUI, as illustrated in FIG. 31.

Figure 32:
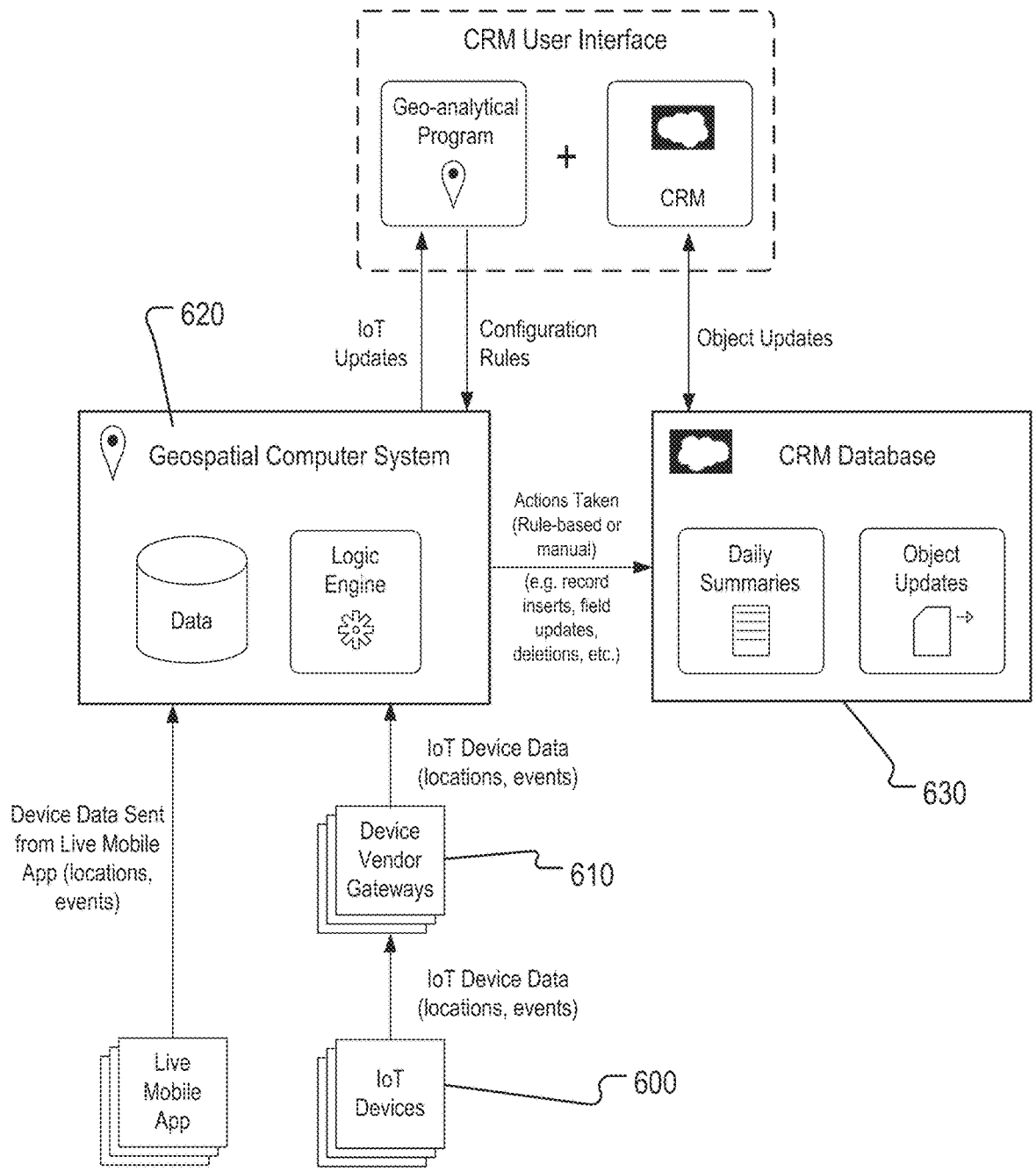
FIG. 32 illustrates an exemplary architecture for a system in accordance with one or more preferred implementations.

FIG. 32 illustrates an exemplary architecture for a system in accordance with one or more preferred implementations. The system includes a plurality of IoT devices 600 associated with different vendors which communicate location and event data to respective vendor gateways 610. The vendor gateways in turn communicate location and event data for the IoT devices to a geospatial computer system 620. The geospatial computer system 620, which may represent a geospatial computer system cloud, comprises one or more databases or data stores storing event data, as well as a logic engine. The geospatial computer system is configured to be able to push data to a CRM database 630 of a CRM computer system associated with a CRM application. A geo-analytical program utilizing the geospatial computer system 620 is integrated with and can be used within a graphical user interface of the CRM application. Layer configuration settings provided by a user via the geo-analytical program are saved at the geospatial computer system 620. Location updates based on location and event data received at the geospatial computer system 620 are communicated from the geospatial computer system 620 to the geo-analytical program, for use in plotting and updating map-based GUIs, e.g. map-based GUIs including one or more layers defined based on layer configuration settings. In accordance with one or more preferred implementations, a geo-analytical program is configured to periodically poll a geospatial computer system for updates based on a configuration setting specifying how often a layer looks for location updates.

Figure 33:
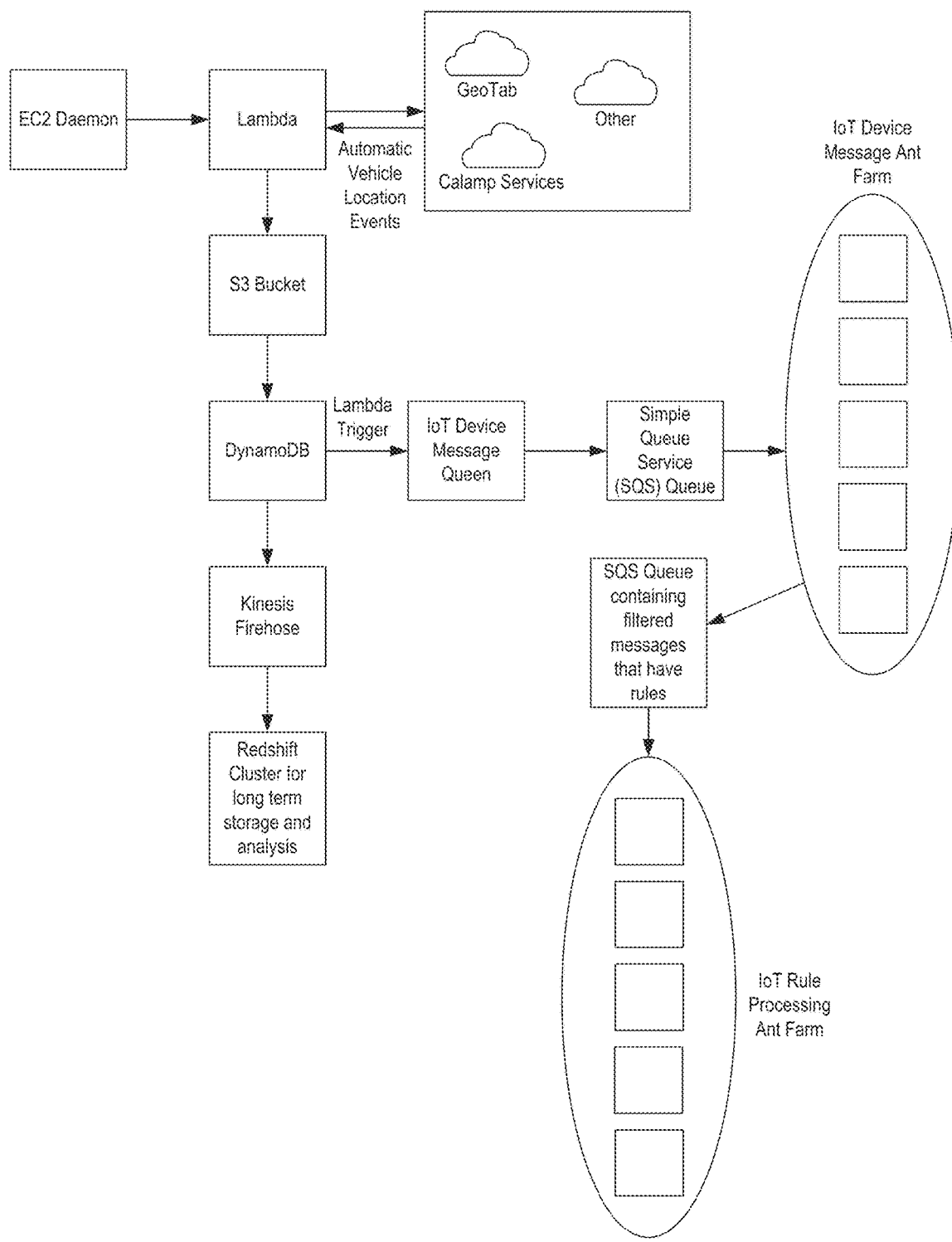
FIG. 33 illustrates exemplary technology for implementing systems and methods in accordance with one or more preferred implementations.

FIG. 33 illustrates exemplary technology for implementing systems and methods in accordance with one or more preferred implementations. Such exemplary technology may be utilized as part of a technology stack for implementing systems and methods in accordance with one or more preferred implementations.

Figure 34:
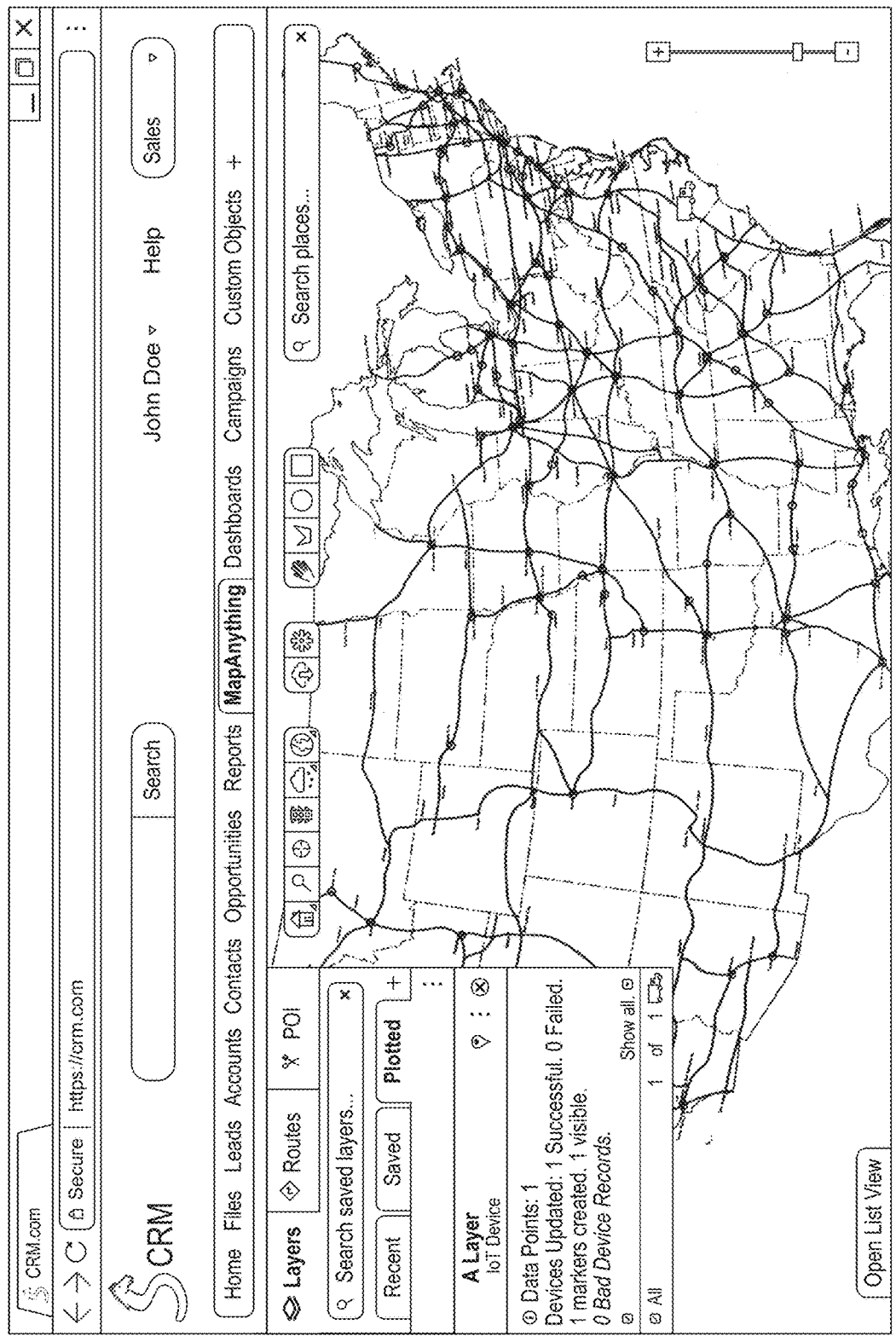
FIGS. 34-35 illustrate exemplary zoom functionality for a map-based GUI.
Figure 35:
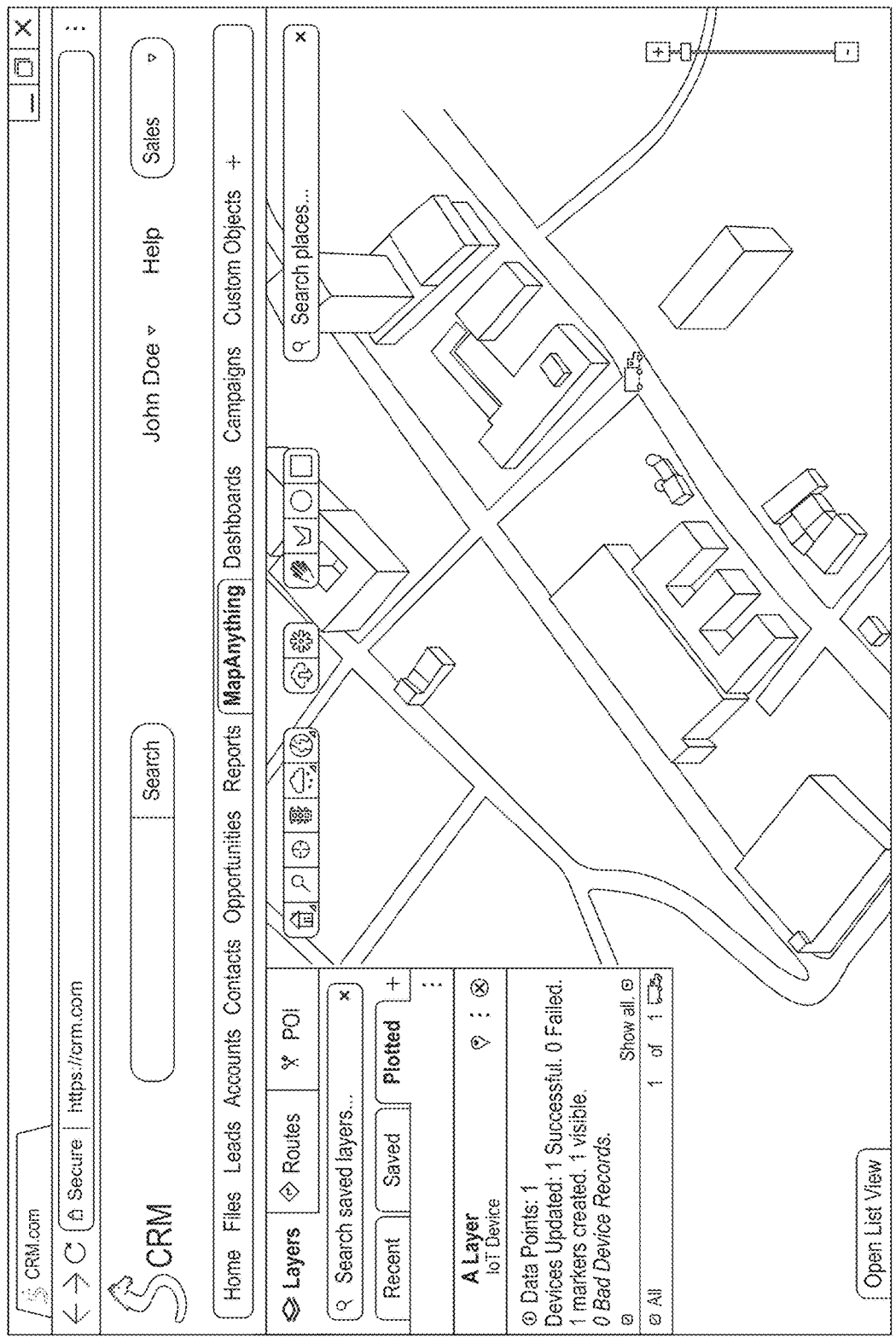

In accordance with one or more preferred implementations, multiple layers may be displayed on a map-based GUI at once. In accordance with one or more preferred implementations, multiple layers may each be capable of being toggled on or off by a user. In accordance with one or more preferred implementations, display of markers for one or more layers is configured for use with zooming in or out of a map-based GUI, as illustrated in FIGS. 34-35.

While the foregoing description has not explicitly included a discussion of accounts in a CRM computer system, it will be understood and appreciated that a CRM computer system is configured to store accounts comprising customer data, wherein each account generally corresponds to a business, wherein for each account one or more of the users are associated therewith, wherein layer configuration settings are associated with an account and/or users within an account, and the account and/or user association of layer configuration settings is communicated to, and stored in non-transient computer-readable medium by a geospatial computer system. The customer data of each account in the CRM computer system preferably comprises client contact info, client accounts, cases, work orders, leads, and sales opportunities of the business corresponding to the account.

Further in this regard, at least in one or more preferred commercial embodiments, GUIs that are generated by an add-on program in the form of a geo-analytical program are developed and maintained by a first party that is the provider of the geospatial computer system. In contrast, the CRM application is developed and is maintained by another party unaffiliated with the first party, which other party is the provider of the CRM computer system. In a preferred commercial implementation, the first party is MapAnything Inc. and the other party is Salesforce.com Inc. With further reference to such preferred commercial implementation, the users preferably are customers of Salesforce.com Inc., and more specifically, employees of businesses that are the customers of Salesforce.com Inc. The customers subscribe to use the CRM solution provided by Salesforce.com Inc., and also preferably subscribe under a separate subscription to use the geospatial computer system provided by MapAnything Inc. Alternatively, the provider of the CRM solution may be a customer of the provider of the geospatial computer system. In still yet another alternative, there is a single provider of both systems.

In accordance with one or more preferred implementations, users of a CRM application preferably have access to data in the geospatial computer system through the CRM application and, in particular, through an add-on program in the form of a geo-analytical program that integrates with or sits on top of the CRM application. Such access preferably is for analysis of the geospatial data and map-based GUIs and reports based at least in part thereon. It is further contemplated that access to the geospatial data and map-based GUIs and reports may be obtained directly using one or more programs that operate outside of a CRM application.

It will be appreciated that an advantage of one or more preferred implementations is an increase in business productivity through the use of automatically plotted map layers. Furthermore, it will be appreciated that using one or more preferred embodiments of the invention, users can easily view and assimilate business critical data. Indeed, one or more preferred embodiments provide automated asset mapping using real-time vehicle telematics or tracking app data in combination with CRM records and defined configuration settings, and enable real-time awareness of vehicle and human assets in conjunction with relevant CRM data such as accounts, cases and work orders.

Based on the foregoing description, it will be readily understood by those persons skilled in the art that the present invention has broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A computer-implemented method comprising:
   (a) displaying, to a user via an electronic display associated with an electronic device, a first graphical user interface (GUI) provided by geo-analytical software that is integrated into a customer relationship management (CRM) solution, the first GUI being accessible by users within the CRM solution, the first GUI being configured to allow the user to define layer configuration settings for a first layer for plotting on a map-based GUI accessible within the CRM solution, wherein
      (i) one or more defined data object types are defined in the CRM solution or the geo-analytical program,
      (ii) defined data object types can be defined to include one or more fields and can be defined to be associated with one or more other defined data object types,
      (iii) layer configuration settings for a respective layer comprise an indication of a data object type serving as a base object type for the respective layer, and
      (iv) the first GUI comprises one or more user interface elements configured to allow a user to specify filter settings for the first layer;
   (b) receiving from the user, via the first GUI, user input corresponding to specification of filter settings for the first layer;
   (c) displaying, to the user via the electronic display associated with the electronic device, an updated version of the first GUI which comprises one or more user interface elements configured to allow a user to specify marker settings for the first layer;
   (d) receiving from the user, via the first GUI, user input corresponding to specification of marker settings for the first layer;
   (e) storing in non-transitory computer readable medium user-defined configuration settings for the first layer including the specified filter settings, tooltip settings, and marker settings;
   (f) electronically receiving, at a geospatial computer system, geospatial data for a plurality of connected devices;
   (g) electronically receiving at the geo-analytical program, over the Internet from the geospatial computer system, real-time geospatial data for the plurality of connected devices; and
   (h) displaying, to the user via the electronic display, the map-based GUI, and utilizing, by the geo-analytical program, the user-defined layer configuration settings for the first layer to plot the first layer on the map-based GUI based on the received real-time geospatial data for the plurality of connected devices, wherein the plotted first layer plots a plurality of markers for objects of the base object type for the first layer, wherein
      (i) the plotted objects are filtered based on the specified filter settings for the first layer, and
      (ii) markers for the plotted objects are based on the specified marker settings for the first layer.

2. The method of claim 1, wherein the one or more user interface elements configured to allow a user to specify filter settings for the first layer include one or more GUI controls for defining a field filter for the first layer, the one or more GUI controls being configured to allow the user to indicate one or more fields of the base object type for the first layer to use for filtering; and wherein receiving from the user, via the first GUI, user input corresponding to specification of filter settings for the first layer comprises receiving, from the user via the one or more GUI controls for defining a field filter for the first layer, specification of a first field of the base object type for the first layer to use for filtering; and wherein the plotted objects are filtered based on field values for the first field.

3. The method of claim 1, wherein the one or more user interface elements configured to allow a user to specify filter settings for the first layer include one or more GUI controls for defining a cross object filter for the first layer, the one or more GUI controls being configured to allow the user to indicate a first object type associated with the base object type, and further indicate one more fields of the first object type for the first layer to use for filtering; wherein receiving from the user, via the first GUI, user input corresponding to specification of filter settings for the first layer comprises receiving, from the user via the one or more GUI controls for defining a cross object filter for the first layer, specification of (a) a first object type associated with the base object type; and (b) one more fields of the first object type for the first layer to use for filtering; and wherein the plotted objects are filtered based on the specified one or more fields of the first object type.

4. The method of claim 1, wherein the one or more user interface elements configured to allow a user to specify filter settings for the first layer include one or more GUI controls for defining an activity filter for the first layer, the one or more GUI controls being configured to allow the user to specify that filtering for the first layer is to be performed based on the presence or absence of tasks for a base object instance; and wherein receiving from the user, via the first GUI, user input corresponding to specification of filter settings for the first layer comprises receiving, from the user via the one or more GUI controls for defining an activity filter for the first layer, specification that filtering for the first layer is to be performed based on the presence of tasks for a base object instance; and wherein the plotted objects are filtered based on the presence of tasks for a base object instance.

5. The method of claim 1, wherein the one or more user interface elements configured to allow a user to specify filter settings for the first layer include one or more GUI controls for defining an activity filter for the first layer, the one or more GUI controls being configured to allow the user to specify that filtering for the first layer is to be performed based on the presence or absence of tasks for a base object instance; and wherein receiving from the user, via the first GUI, user input corresponding to specification of filter settings for the first layer comprises receiving, from the user via the one or more GUI controls for defining an activity filter for the first layer, specification that filtering for the first layer is to be performed based on the absence of tasks for a base object instance; and wherein the plotted objects are filtered based on the absence of tasks for a base object instance.

6. The method of claim 1, wherein the one or more user interface elements configured to allow a user to specify filter settings for the first layer include one or more GUI controls for defining an activity filter for the first layer, the one or more GUI controls being configured to allow the user to specify that filtering for the first layer is to be performed based on the presence or absence of events for a base object instance; wherein receiving from the user, via the first GUI, user input corresponding to specification of filter settings for the first layer comprises receiving specification that filtering for the first layer is to be performed based on the presence of events for a base object instance; and wherein the plotted objects are filtered based on the presence of events for a base object instance.

7. The method of claim 1, wherein the one or more user interface elements configured to allow a user to specify filter settings for the first layer include one or more GUI controls for defining an activity filter for the first layer, the one or more GUI controls being configured to allow the user to specify that filtering for the first layer is to be performed based on the presence or absence of events for a base object instance; wherein receiving from the user, via the first GUI, user input corresponding to specification of filter settings for the first layer comprises receiving specification that filtering for the first layer is to be performed based on the absence of events for a base object instance; and wherein the plotted objects are filtered based on the absence of events for a base object instance.

8. The method of claim 1, wherein the one or more user interface elements configured to allow a user to specify filter settings for the first layer include one or more GUI controls for defining an owner filter for the first layer, the one or more GUI controls being configured to allow the user to specify that filtering for the first layer is to be performed based on an owner of a base object instance; wherein receiving from the user, via the first GUI, user input corresponding to specification of filter settings for the first layer comprises receiving specification that filtering for the first layer is to be performed based on an owner of a base object instance; and wherein the plotted objects are filtered based on an owner of a base object instance.

9. The method of claim 1, wherein the one or more user interface elements configured to allow a user to specify filter settings for the first layer include one or more GUI controls for defining a maximum number of records to plot; wherein receiving from the user, via the first GUI, user input corresponding to specification of filter settings for the first layer comprises receiving specification of a maximum number of records to plot; and wherein the plotted objects are filtered based on the specified maximum number of records to plot.

10. The method of claim 1, wherein the one or more user interface elements configured to allow a user to specify marker settings for the first layer include one or more GUI controls for specifying static assignment of a single icon as a marker for display on the map-based GUI; wherein receiving from the user, via the first GUI, user input corresponding to specification of marker settings for the first layer comprises receiving specification of static assignment of a single icon as a marker for display on the map-based GUI; and wherein the one or more user interface elements configured to allow a user to specify marker settings for the first layer include one or more GUI controls for defining an icon for markers for display on the map-based GUI.

11. The method of claim 1, wherein the one or more user interface elements configured to allow a user to specify marker settings for the first layer include one or more GUI controls for specifying dynamic assignment of icons for markers for base object instances to be plotted on the map-based GUI; wherein receiving from the user, via the first GUI, user input corresponding to specification of marker settings for the first layer comprises receiving specification of dynamic assignment of icons for markers for base object instances to be plotted on the map-based GUI; wherein the one or more user interface elements configured to allow a user to specify marker settings for the first layer include one or more GUI controls for specifying a field of the base object instance which is used for the dynamic assignment, and for further specifying icons to be used for specified field values; wherein receiving from the user, via the first GUI, user input corresponding to specification of marker settings for the first layer comprises receiving specification of (a) a first field of the base object instance which is used for the dynamic assignment; and (b) icons to be used for specified field values; and wherein icons for use as markers for the plotted objects are determined based on a value of the specified first field.

12. The method of claim 1, wherein the one or more user interface elements configured to allow a user to specify marker settings for the first layer include one or more GUI controls for specifying dynamic assignment of shapes and colors for markers for base object instances to be plotted on the map-based GUI; wherein receiving from the user, via the first GUI, user input corresponding to specification of marker settings for the first layer comprises receiving specification of dynamic assignment of shapes and colors for markers for base object instances to be plotted on the map-based GUI.

13. The method of claim 12, wherein the one or more user interface elements configured to allow a user to specify marker settings for the first layer include one or more GUI controls for specifying
(a) a field of the base object instance which is used for the dynamic assignment of shapes;
(b) shapes to be used for specified field values;
(c) a field of the base object instance which is used for the dynamic assignment of colors; and
(d) colors to be used for specified field values.

14. The method of claim 13, wherein receiving from the user, via the first GUI, user input corresponding to specification of marker settings for the first layer comprises receiving specification of
(a) a first field of the base object instance which is used for the dynamic assignment of shapes;
(b) shapes to be used for specified field values for the first field;
(c) a second field of the base object instance which is used for the dynamic assignment of colors; and
(b) colors to be used for specified field values for the second field;
and wherein a shape of markers for the plotted objects is determined based on a value of the specified first field and a color of markers for the plotted objects is determined based on a value of the specified second field.

15. A computer-implemented method comprising:
(a) displaying, to a user via an electronic display associated with an electronic device, a first graphical user interface (GUI) provided by geo-analytical software that is integrated into a customer relationship management (CRM) solution, the first GUI being accessible by users within the CRM solution, the first GUI being configured to allow the user to define layer configuration settings for a first layer for plotting on a map-based GUI accessible within the CRM solution, wherein
  (i) one or more defined data object types are defined in the CRM solution or the geo-analytical program,
  (ii) defined data object types can be defined to include one or more fields and can be defined to be associated with one or more other defined data object types,
  (iii) layer configuration settings for a respective layer comprise an indication of a data object type serving as a base object type for the respective layer, and
  (iv) the first GUI comprises one or more user interface elements configured to allow a user to specify filter settings for the first layer;
(b) receiving from the user, via the first GUI, user input corresponding to specification of filter settings for the first layer;
(c) displaying, to the user via the electronic display associated with the electronic device, an updated version of the first GUI which comprises one or more user interface elements configured to allow a user to specify tooltip settings for the first layer;
(d) receiving from the user, via the first GUI, user input corresponding to specification of tooltip settings for the first layer;
(e) displaying, to the user via the electronic display associated with the electronic device, an updated version of the first GUI which comprises one or more user interface elements configured to allow a user to specify marker settings for the first layer;
(f) receiving from the user, via the first GUI, user input corresponding to specification of marker settings for the first layer;
(g) storing in non-transitory computer readable medium user-defined configuration settings for the first layer including the specified filter settings, tooltip settings, and marker settings;
(h) electronically receiving, at a geospatial computer system, geospatial data for a plurality of connected devices;
(i) electronically receiving at the geo-analytical program, over the Internet from the geospatial computer system, real-time geospatial data for the plurality of connected devices; and
(j) displaying, to the user via the electronic display, the map-based GUI, and utilizing, by the geo-analytical program, the user-defined layer configuration settings for the first layer to plot the first layer on the map-based GUI based on the received real-time geospatial data for the plurality of connected devices, wherein the plotted first layer plots a plurality of markers for objects of the base object type for the first layer, wherein
  (i) the plotted objects are filtered based on the specified filter settings for the first layer, and
  (ii) markers for the plotted objects are based on the specified marker settings for the first layer;
(k) wherein the one or more user interface elements configured to allow a user to specify tooltip settings for the first layer include one or more GUI controls for defining tooltips for markers for display on a map-based GUI, wherein the one or more GUI controls are configured to allow a user to indicate one or more fields of the base object type for display in a tooltip;
(l) wherein receiving from the user, via the first GUI, user input corresponding to specification of tooltip settings for the first layer comprises receiving specification of first and second fields of the base object type for display in a tooltip on the map-based GUI; and;
(m) wherein the method comprises displaying a tooltip for a plotted marker for an object that includes values for the first and second fields of that object.

16. A computer-implemented method comprising:
(a) displaying one or more graphical user interfaces (GUIs) provided by software that forms part of a customer relationship management (CRM) solution, the one or more GUIs being accessible by users within the CRM solution, by which GUIs users are able to define layer configuration settings for one or more layers for plotting on a map-based GUI accessible within the CRM solution, the GUIs comprising one or more windows, pages, or the like, each comprising one or more GUI controls by which layer configuration settings are defined by the user, wherein
  (i) one or more defined data object types are defined in the CRM solution or the geo-analytical program,
  (ii) defined data object types can be defined to include one or more fields and can be defined to be associated with one or more other defined data object types, and
  (iii) layer configuration settings for a respective layer comprise an indication of a data object type serving as a base object type for the respective layer;
(b) receiving from a user, via the one or more GUIs, user-defined configuration settings for a first layer;
(c) storing in non-transitory computer readable medium the user-defined configuration settings for the first layer;
(d) electronically receiving, at a geospatial computer system, geospatial data for a plurality of connected devices;
(d) electronically communicating over the Internet from the geospatial computer system to the software that forms part of the CRM solution, real-time geospatial data for the plurality of connected devices; and
(e) displaying the map-based GUI, and utilizing, by the software that forms part of the CRM solution, the user-defined layer configuration settings for the first layer to plot the first layer on the map-based GUI based on the communicated real-time geospatial data for the plurality of connected devices.

17. The method of claim 16, wherein the one or more GUI controls by which layer configuration settings are defined include one or more GUI controls for defining a cross object filter for a layer, the one or more GUI controls being configured to allow a user to indicate a first object type associated with the base object type, and further indicate one more fields of the first object type for a layer to use for filtering.

18. The method of claim 16, wherein the one or more GUI controls by which layer configuration settings are defined include one or more GUI controls for specifying dynamic assignment of icons for markers for base object instances to be plotted on a map-based GUI; and wherein the one or more GUI controls by which layer configuration settings are defined include one or more GUI controls for specifying a field of the base object instance which is used for the dynamic assignment, and for further specifying icons to be used for specified field values.

19. The method of claim 16, wherein the one or more GUI controls by which layer configuration settings are defined include one or more GUI controls for specifying dynamic assignment of shapes and colors for markers for base object instances to be plotted on a map-based GUI; wherein the one or more GUI controls by which layer configuration settings are defined include one or more GUI controls for specifying a first field of the base object instance which is used for the dynamic assignment of shapes, and for further specifying shapes to be used for specified field values; and wherein the one or more GUI controls by which layer configuration settings are defined include one or more GUI controls for specifying a second field of the base object instance which is used for the dynamic assignment of colors, and for further specifying colors to be used for specified field values.

20. The method of claim 16, wherein the connected devices comprise a plurality of telematic devices, and the geospatial data for the connected devices comprises geospatial data acquired by the plurality of telematic devices; and wherein the telematic devices are attached to vehicles.

* * * * *